United States Patent
Komiya et al.

(10) Patent No.: US 9,293,984 B2
(45) Date of Patent: Mar. 22, 2016

(54) ILLUMINATION APPARATUS AND POWER SUPPLY CIRCUIT

(75) Inventors: Kenji Komiya, Osaka (JP); Takeshi Shiomi, Osaka (JP); Yoshifumi Yaoi, Osaka (JP); Masaru Nomura, Osaka (JP); Kohichiroh Adachi, Osaka (JP); Yoshiji Ohta, Osaka (JP); Hiroshi Iwata, Osaka (JP)

(73) Assignee: SHARP KABUSHIKI KAISHA, Osaka-Shi (JP)

( * ) Notice: Subject to any disclaimer, the term of this patent is extended or adjusted under 35 U.S.C. 154(b) by 114 days.

(21) Appl. No.: 13/598,363

(22) Filed: Aug. 29, 2012

(65) Prior Publication Data
US 2013/0049620 A1 Feb. 28, 2013

(30) Foreign Application Priority Data

Aug. 29, 2011 (JP) .................................. 2011-185896
Aug. 29, 2011 (JP) .................................. 2011-185901
Sep. 16, 2011 (JP) .................................. 2011-202592

(51) Int. Cl.
*H02H 7/125* (2006.01)
*H02M 1/42* (2007.01)
*H05B 33/08* (2006.01)
*H02M 3/158* (2006.01)

(52) U.S. Cl.
CPC ......... *H02M 1/4225* (2013.01); *H05B 33/0815* (2013.01); *H02M 3/1582* (2013.01); *H02M 2001/4291* (2013.01); *Y02B 20/346* (2013.01); *Y02B 70/126* (2013.01)

(58) Field of Classification Search
CPC ... H02M 7/062; H02M 7/219; H02M 1/4225; H02M 3/1588; H02M 3/157; H05B 37/029
USPC .......... 315/201; 363/53, 81, 89; 323/224, 283
See application file for complete search history.

(56) References Cited

U.S. PATENT DOCUMENTS

| | | | |
|---|---|---|---|
| 5,235,504 A | * | 8/1993 | Sood ................................ 363/53 |
| 2008/0303502 A1 | * | 12/2008 | Haiplik ........................ 323/283 |
| 2011/0132899 A1 | | 6/2011 | Shimomugi et al. |
| 2014/0320059 A1 | | 10/2014 | Shimomugi et al. |

FOREIGN PATENT DOCUMENTS

| | | |
|---|---|---|
| CN | 102138278 | 7/2011 |
| JP | 11-98825 | 4/1999 |
| JP | 2004-135372 | 4/2004 |
| JP | 2010-268590 | 11/2010 |
| JP | 2010-273501 | 12/2010 |

* cited by examiner

*Primary Examiner* — Douglas W Owens
*Assistant Examiner* — Syed M Kaiser
(74) *Attorney, Agent, or Firm* — Morrison & Foerster LLP

(57) ABSTRACT

In order to offer a power supply circuit that can minimize the drop in efficiency by reducing losses during voltage conversion, in an improved-power factor circuit, a control circuit performs a step-up operation in which a control signal for turning on a first switching element (Tr1) and switching a second switching element (Tr2) is output, and a step-down operation in which a control signal for turning off the second switching element (Tr2) and switching the first switching element (Tr1) is output.

15 Claims, 44 Drawing Sheets

ILLUMINATION APPARATUS AND POWER SUPPLY CIRCUIT

This application is based on Japanese Patent Application No. 2011-185896 filed on Aug. 29, 2011, Japanese Patent Application No. 2011-185901 filed on Aug. 29, 2011, and Japanese Patent Application No. 2011-202592 filed on Sep. 16, 2011, the contents of which are hereby incorporated by reference.

BACKGROUND OF THE INVENTION

1. Field of the Invention

The present invention concerns a power supply circuit to be employed in a power supply device that supplies a constant voltage to electronic equipment, LED lighting, or the like.

2. Description of Related Art

In the past, power supply circuits that rectify and convert alternating current voltage, and output direct current voltage, have been employed as power supply devices for supplying constant electrical current to electronic equipment, LED lighting, and the like. For example, in the case of a power supply device for outputting 100 V alternating current as 100 V direct current, after initial conversion to approximately 380 V direct current by a PFC circuit, the current is stepped down to 100 V by a DC-DC converter(DC-DC converter), and output.

In this sort of power supply device, because the current passes through the PFC circuit and the DC-DC converter, losses occur during passage through the respective circuits, and the total loss is considerable. Moreover, due to the provision of two circuits, i.e., the PFC circuit and the DC-DC converter circuit, the circuit configuration is larger, and production cost is correspondingly higher.

Japanese Patent Application No. 2004-135372 discloses an improved-power factor converter provided with first and second switching elements connected in series between the outputs of a full-wave rectifier circuit; third and fourth switching elements connected in series between output terminals; and a reactor (coil) connected between the node of the first and second switching elements and the node of the third and fourth switching elements, whereby the input voltage is stepped down or stepped up through synchronous on/off control (switching control) of the first to fourth switching elements.

A power supply circuit is disclosed in Japanese Patent Application No. 11-98825 as well. In this power supply circuit, a step-up converter and a step-down converter are arranged in series, and when the input voltage is less than a predetermined voltage, a step-up operation is performed, or when the input voltage is greater than a predetermined voltage, a step-down operation is performed through synchronous control of a switching element included in the step-up converter and a switching element included in the step-down switching converter.

Japanese Patent Application No. 2010-273501 discloses a switching power supply circuit configured by connecting a well-known step-up converter circuit and step-down converter circuit. In the switching power supply circuit, switching control of the switching element included in the step-up converter circuit and of the switching element included in the step-down converter circuit is carried out independently, and a voltage that is higher or lower than the input voltage is output.

Japanese Patent Application No. 2010-273501 also discloses a switching power supply circuit of a configuration provided with three diodes, two coils, two capacitors, and one switching element. By varying the on/off ratio (duty ratio) of the switching element, this switching power supply circuit can be utilized as a step-up converter for stepping up an input voltage, or as a step-down converter for stepping down an input voltage.

Japanese Patent Application No. 2010-268590, proposes a switching power supply circuit in which a coil is employed in common by both a step-up converter circuit and a step-down converter circuit.

Nevertheless, the configuration of the improved-power factor converter disclosed in Japanese Patent Application No. 2004-135372 involves synchronous switching of at least two of the four switching elements, while the power supply circuit disclosed in Japanese Patent Application No. 11-98825 involves synchronous switching of two switching elements during step-down operation, and the efficiency falls because of this switching. Moreover, due to the configuration involving synchronous switching of two switching elements, it is necessary to employ an element for high-speed driving of a control circuit that transmits a control signal to the two switching elements, or to add a processing circuit (element) for signal processing of the control signal, thereby increasing the cost of the power supply circuit.

In the switching power supply circuit shown in Japanese Patent Application No. 2010-273501, coils are necessary for both the step-up converter circuit and the step-down converter circuit, resulting in a greater number of parts. Moreover, because the coils are components that are difficult to make compact and thin, it is difficult to make the switching power supply circuit compact and thin. Further, the use of two coils, which are expensive components, increases the production cost of the switching power supply circuit.

Further, in the switching power supply circuit shown in Japanese Patent Application No. 2010-268590, the connection terminals (in the case of a transistor, the source or emitter) of the first switching element and the second switching element differ in potential (the potential that serves as reference for driving). Therefore, for each of the switching elements, it is necessary to furnish the control circuit with means (for example, a bootstrap circuit) for obtaining a reference potential to drive the first switching element and the second switching element, making the configuration of the switching power supply circuit rather complicated. Moreover, control by means of a control circuit is complicated as well, and therefore it is not easy to reduce production cost.

SUMMARY OF THE INVENTION

It is accordingly an object of the present invention to offer a compact, low-cost power supply circuit that can reduce losses during voltage conversion and minimize declines in efficiency.

It is moreover an object of the present invention to offer a compact, low-cost voltage conversion device that can step up or step down an input voltage and output a desired voltage.

To achieve the object described above, the present invention is a power supply circuit provided with rectification means for rectification of alternating current and conversion thereof to direct current; a step-down section for stepping down the direct current voltage converted by the rectification means, the step-down section including a first switching element, a coil, and a first diode; a step-up section for stepping up the direct current voltage converted by the rectification means, the step-up section including a second switching element, the coil, and a second diode; and control means for on/off control of the first switching element and the second switching element; the circuit converts alternating current to direct current of any output voltage, the control means comparing the rectified direct current voltage rectified by the rectification means to a given target voltage, and when the rectification voltage is lower than the target voltage, outputting a control signal to turn on the first switching element and switch the second switching element, or when then rectification voltage is higher than the target voltage, outputting a control signal to turn off the second switching element and switch the first switching element.

Compared with a configuration like that of a conventional power supply circuit, in which step-up to high voltage is followed by step-down to obtain direct current of the desired voltage, this configuration obviates the need for a circuit for stepping up to high voltage. Moreover, the losses involved during step-up to high voltage can be reduced. Additionally, because the rectification voltage is stepped up when low or stepped down when high, the occurrence of harmonic current can be reduced, and the power factor can be improved as well.

In the configuration described above, the control means acquires the output voltage, and makes the target voltage the output voltage.

In the configuration described above, the first switching element is arranged between the anode of the first diode and the terminal connected to the low-voltage side of the rectification means; and one output-side electrode of the first switching element and one output-side electrode of the second switching element are connected to a common node.

I In the configuration described above, the first diode is replaced by a third switching element, and the second diode is replaced by a fourth switching element; the control means sends a control signal to the first switching element, the second switching element, the third switching element, and the fourth switching element; and the control means, when switching the first switching element, outputs a control signal to turn on the fourth switching element, and turn on and off the third switching element in alternation with the first switching element, and when switching the second switching element, outputs a control signal to turn off the third switching element, and turn on and off the fourth switching element in alternation with the second switching element.

In the configuration described above, there is provided a capacitor that is charged by the output voltage, and a switching element for toggling the capacitor between discharging and charging.

As a device using the power supply circuit discussed above, there can be cited, for example, a lighting device provided with an LED or other light source that emits light from direct current.

According to the present invention, there can be offered a power supply circuit that can suppress declines in efficiency, and minimize declines in efficiency during voltage conversion.

DETAILED DESCRIPTION OF PREFERRED EMBODIMENTS

The embodiments of the present invention are described below making reference to the drawings.

First Embodiment

Figure 1:
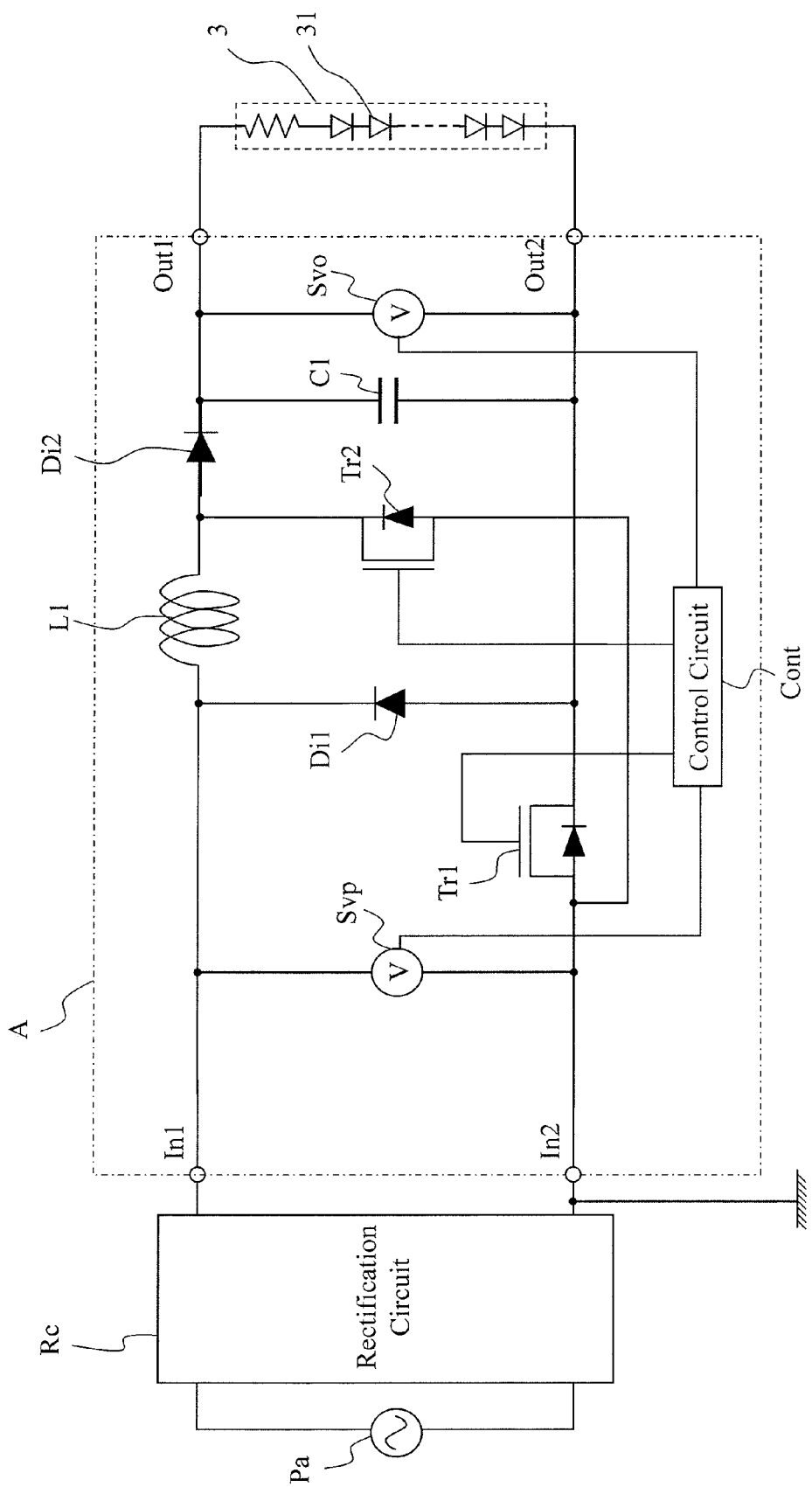
FIG. 1 is a diagram showing an example of a power supply circuit according to the present invention.

FIG. 1 is a diagram showing an example of a power supply circuit according to the present invention. As shown in FIG. 1, the power supply circuit A includes a first input terminal In1, a second input terminal In2, a first output terminal Out1, and a second output terminal Out2. An alternating current power supply Pa is connected, via a rectification circuit Rc (rectification means) to the first input terminal In1 and the second input terminal In2 of the power supply circuit A. Alternating current from the alternating current power supply Pa is converted to direct current pulses by the rectification circuit Rc, and is input to the first input terminal In1 and the second input terminal In2. The high-voltage side of the rectification circuit Rc is connected to the first input terminal In1, and the low-voltage side is connected to the second input terminal In2. Herein, a circuit that performs full-wave rectification has been adopted as the rectification circuit Rc.

An LED lamp 3 of 25 LEDs 31 connected in series is connected as a load to the first output terminal Out1 and the second output terminal Out2. The first output terminal Out1 is connected to the plus terminal of the LED lamp 3 (the anode of an LED 31), and the second output terminal Out2 to the minus terminal of the LED lamp 3 (the cathode of an LED 31), respectively. The second input terminal In2 and the low-voltage side of the rectification circuit Rc are connected to a ground line (the second input terminal In2 need not be connected to the ground line).

The power supply circuit A includes a first switching element Tr1, a first diode Di1, a coil L1, a second switching element Tr2, a second diode Di2, a capacitor C1, and a control circuit Cont (control means). The first switching element Tr1 and the second switching element Tr2 are n-type MOSFETs. In some cases, a bipolar transistor may be employed as a switching circuit, and in such cases, the source shown below would be replaced by an emitter, the gate by a base, and the drain by a collector.

The source of the first switching element Tr1 is connected to the second input terminal In2. The drain of the first switching element Tr1 is connected to the anode of the first diode Di1. The connection point of the drain of the first switching element Tr1 and the anode of the first diode Di1 is connected to the second output terminal Out2. The cathode of the first diode Di1 is connected to one end of the coil L1, and the connection point of the cathode of the first diode Di1 and the coil L1 is connected to the first input terminal In1.

The other end of the coil L1 is connected to the drain of the second switching element Tr2 and to the anode of the second diode Di2. The cathode of the second diode Di2 is then connected to one of the terminals of the capacitor C1, and the connection point thereof is further connected to the first output terminal Out1. The other terminal of the capacitor C1 is connected to the second output terminal Out2. That is, the other terminal of the capacitor C1, the minus terminal of the LED lamp 3, the drain of the first switching element Tr1, and the anode of the first diode Di1 are connected to the second output terminal Out2. The source of the second switching element Tr2 is then connected to the second input terminal In2. Specifically, to the second input terminal In2 are connected the source of the first switching element Tr1 and the source of the second switching element Tr2.

In the power supply circuit A, the first switching element Tr1, the first diode Di1, and the coil L1 constitute a step-down converter, while the second switching element Tr2, the second diode Di2, and the coil L1 constitute a step-up converter. A control signal from the control circuit Cont is input to the gates of the first switching element Tr1 and the second switching element Tr2, and on/off toggling thereof is controlled by the control signal. To describe in more detail, the first switching element Tr1 and the second switching element Tr2 turn on when the voltage of the signal from the control circuit Cont is High level, and turn off when it is Low level.

The first switching element Tr1, the first diode Di1, and the coil L1 constitute a step-down converter for stepping down and outputting an input voltage. The second switching element Tr2, the second diode Di2, and the coil L1 constitute a step-up converter for stepping up an input voltage. Specifically, the power supply circuit A is configured such that a single coil L1 is shared by the step-down converter and the step-up converter.

When the second switching element Tr2 is normally off, the power supply circuit A functions as a step-down converter. Specifically, in a state in which the control circuit Cont has transmitted a Low level control signal to the gate of the second switching element Tr2 and turned off the second switching element Tr2, the first switching element Tr1 is toggled on and off (switching) for a short period of time, whereby the voltage (rectification voltage Vpfc) rectified by the rectification circuit Rc that is connected to the first input terminal In1 and the second input terminal In2 is stepped down and output from the first output terminal Out1 and the second output terminal Out2.

When the first switching element Tr1 is normally on, the power supply circuit A functions as a step-up converter. Specifically, in a state in which the control circuit Cont has transmitted a High level control signal to the gate of the first switching element Tr1 and turned on the first switching element Tr1, the second switching element Tr2 is switched, whereby the voltage rectified by the rectification circuit Rc that is connected to the first input terminal In1 and the second input terminal In2 is stepped up and output from the first output terminal Out1 and the second output terminal Out2.

The circuit shown in FIG. 1 includes the capacitor C1, which is connected to the first output terminal Out1 and the second output terminal Out2. By attaching this capacitor C1, the voltage output by the coil L1 (either during step-down or step-up) can be smoothed, so a smoothed voltage can be applied to the LED lamp 3.

As shown in FIG. 1, in the power supply circuit A, the second input terminal In2 is connected to both the source of the first switching element Tr1 and the source of the second switching element Tr2 (the source of the first switching element Tr1 and the source of the second switching element Tr2 are shorted; furthermore, the second input terminal In2 is shorted as well).

Because the source of the first switching element Tr1 and the source of the second switching element Tr2 are shorted, the voltage at each source is the same.

Moreover, as shown in FIG. 1, the power supply circuit A has a rectification voltage detector Svp for detecting the voltage (rectification voltage Vpfc) between the first input terminal In1 and the second input terminal In2; and an output voltage detector Svo for detecting the voltage (output voltage Vo) between the first output terminal Out1 and the second output terminal Out2. The rectification voltage Vpfc detected by the rectification voltage detector Svp and the output voltage Vo detected by the output voltage detector Svo are input to the control circuit Cont.

The control circuit Cont is a circuit that drives the power supply circuit A as a step-down converter or a step-up converter. The control circuit Cont performs on/off control of the first switching element Tr1 and the second switching element Tr2 with reference to voltage values of the rectification voltage Vpfc and the output voltage Vo, and causes step-down operation or step-up operation of the power supply circuit A.

Figure 2:
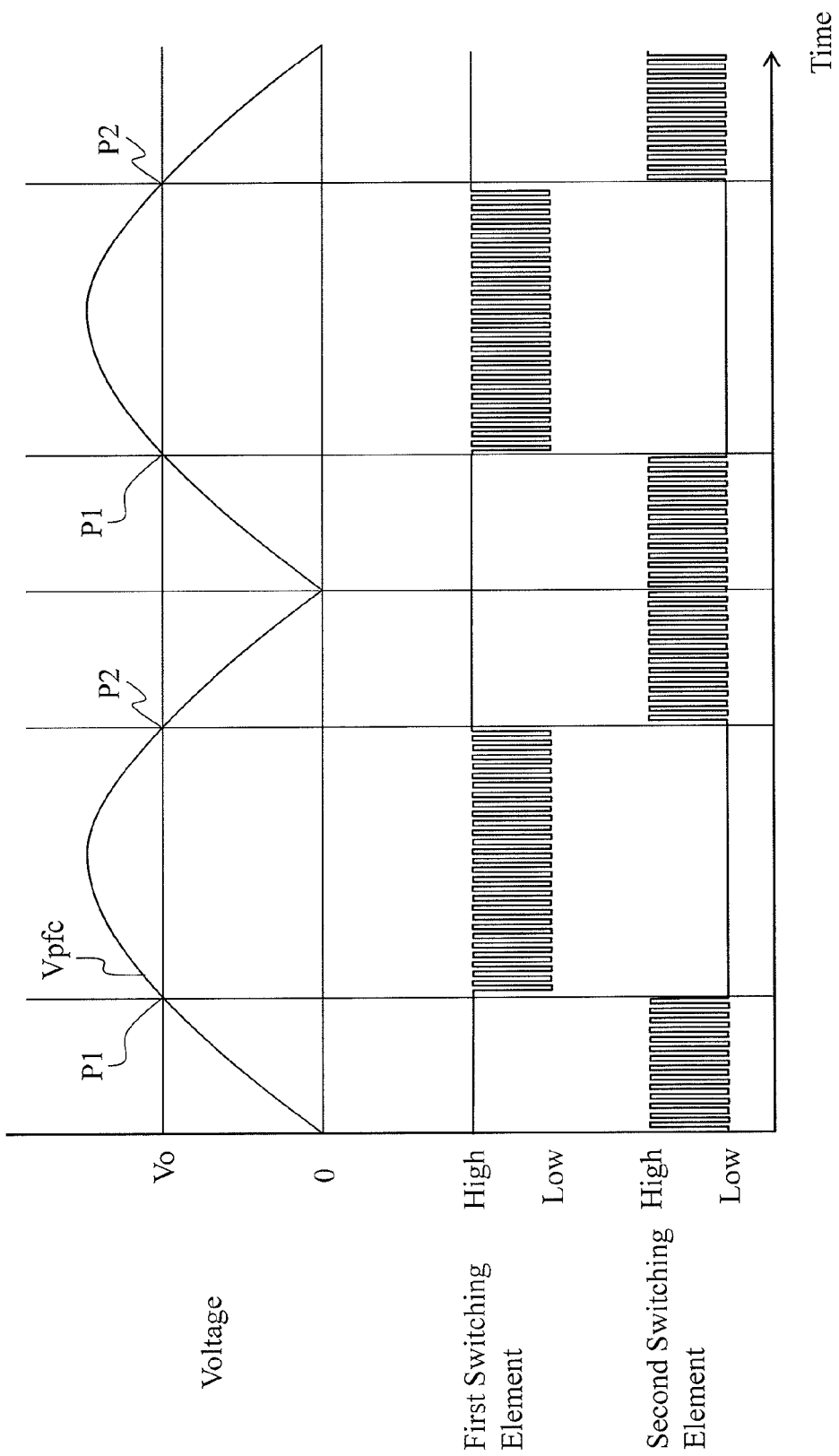
FIG. 2 is a diagram showing control of the power supply circuit shown in FIG. 1.
Figure 3:
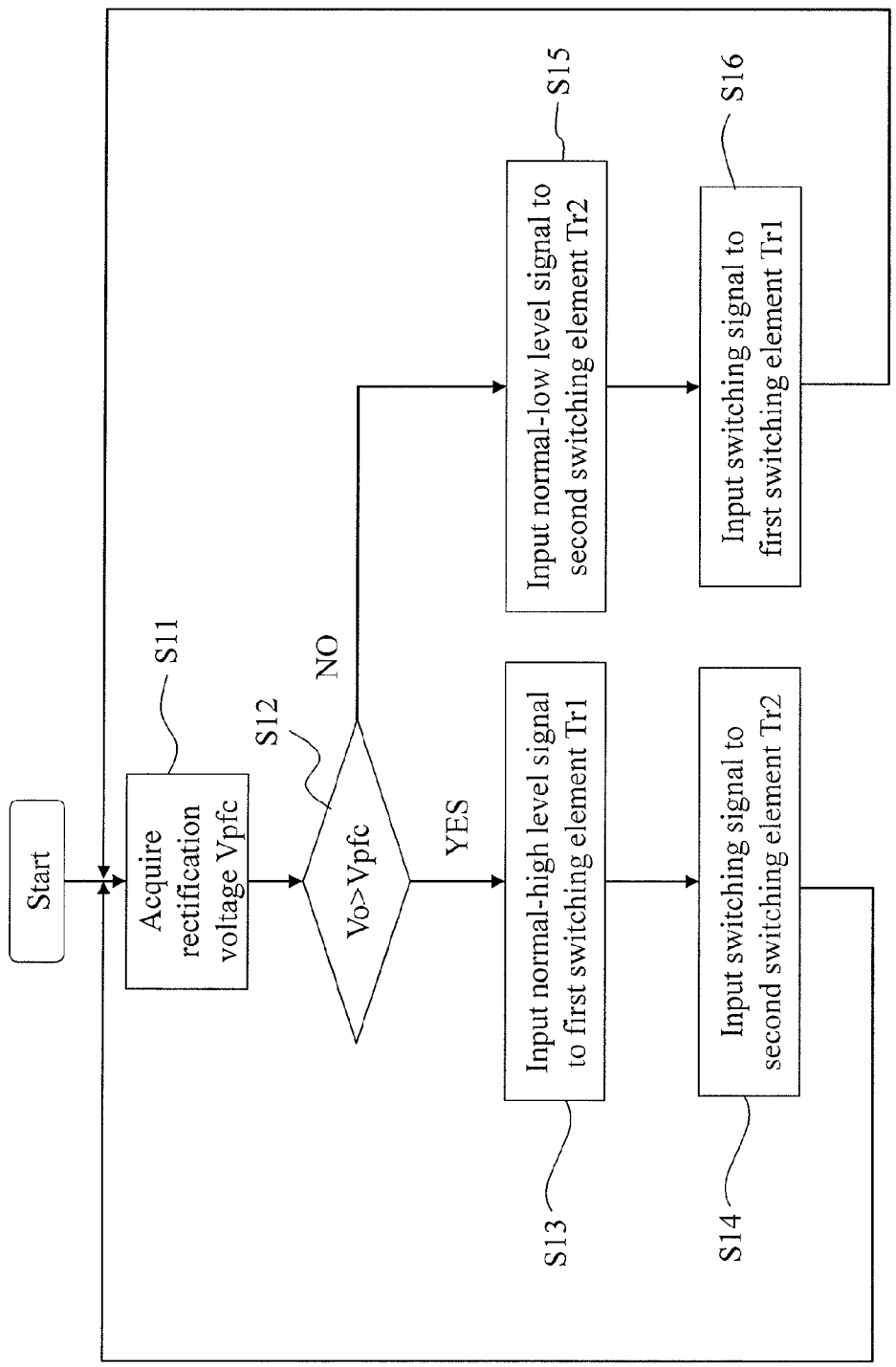
FIG. 3 is a flowchart showing control operation by the control circuit.

The operation of the control circuit is described below with reference to the drawings. FIG. 2 is a diagram showing control of the rectification circuit shown in FIG. 1, and FIG. 3 is a flowchart showing a control operation by the control circuit. In FIG. 2, the rectification voltage Vpfc and the output voltage Vo are displayed. In FIG. 2, the half-wave of the rectification voltage Vpfc is described in terms of intersection points thereof with the output voltage Vo, denoted as P1 and P2 in order from the left.

As shown in FIG. 2, from 0 V to the intersection point P1 of the rectification voltage Vpfc, the rectification voltage Vpfc is lower than the output voltage Vo; from the intersection point P1 to the intersection point P2, the rectification voltage Vpfc is higher than the output voltage Vo; and after the intersection point P2, the rectification voltage Vpfc is lower than the output voltage Vo. In FIG. 2, the control signals input to the gate of the first switching element Tr1 and to the second switching element Tr2 are shown as well.

As shown in FIG. 3, the control circuit Cont acquires the rectification voltage Vpfc detected by the rectification voltage detector Svp (Step S11). The control circuit Cont compares this with the preset output voltage Vo (Step S12). When the rectification voltage Vpfc is lower than the output voltage Vo (YES in Step S12), the control circuit Cont transmits a normal High level signal to the gate of the first switching element Tr1 (Step S13), and inputs a signal (switching signal) that toggles between High level and Low level for a short time to the gate of the second switching element Tr2 (Step S14). Thereafter, returning to Step S11, the rectification voltage Vpfc is acquired. The power supply circuit A thereby operates as a step-up converter.

When the rectification voltage Vpfc is higher than the output voltage Vo (NO in Step S12), the control circuit Cont transmits a normal Low level signal to the gate of the second switching element Tr2 (Step S15), and inputs a signal (switching signal) that toggles between High level and Low level for a short time to the gate of the first switching element Tr1 (Step S16). Thereafter, returning to Step S11, the rectification voltage Vpfc is acquired. The power supply circuit A is thereby operated as a step-down converter.

The control circuit Cont returns to Step S11, acquires the rectification voltage Vpfc detected by the rectification voltage detector Svp, and operates the power supply circuit A as a step-up converter or a step-down converter.

In the power supply circuit A, by stepping up the voltage in sections in which the rectification voltage Vpfc is lower than the output voltage Vo, while stepping down the voltage in sections in which the rectification voltage Vpfc is higher than the output voltage Vo, the waveform of the current value flowing to the first input terminal In1 can be shaped to conform to the waveform of the rectification voltage Vpfc, the occurrence of harmonic current can be reduced, and the power factor can be improved.

Moreover, because it suffices simply to switch only the first switching element Tr1 or the second switching element, the loss associated with switching of the switching elements can be reduced. Additionally, because synchronous switching of the two switching elements is not required, there is no need for high speed operation by the control circuit, and the configuration of the control circuit can be simplified to a commensurate extent, making possible reduction in cost. In the present embodiment, toggling between step-down operation and step-up operation takes place with reference to the relative magnitude of the rectification voltage Vpfc and the output voltage Vo; however, there is no limitation thereto, and the rectification voltage Vpfc may be compared with a target voltage given in advance, and toggling between step-down operation and step-up operation may take place with reference to the relative magnitude thereof.

Second Embodiment

Another example of the power supply circuit according to the present invention will now be described. The circuit configuration of the power supply circuit is the same as in the first embodiment, except for a different control method by the control circuit Cont. Therefore, a detailed description of the circuit configuration is omitted. In the first embodiment, the control circuit Cont toggles the switching elements with reference to the relative magnitude of the rectification voltage Vpfc and the output voltage Vo. Apart from this, by having the control circuit Cont divide the half-wave of the rectification voltage Vpfc into a plurality of regions (three in this case) for toggling the switching elements, it is possible to improve the power factor in analogous fashion. An example of switching control according to region by the control circuit Cont is described below with reference to the drawings.

Figure 4:
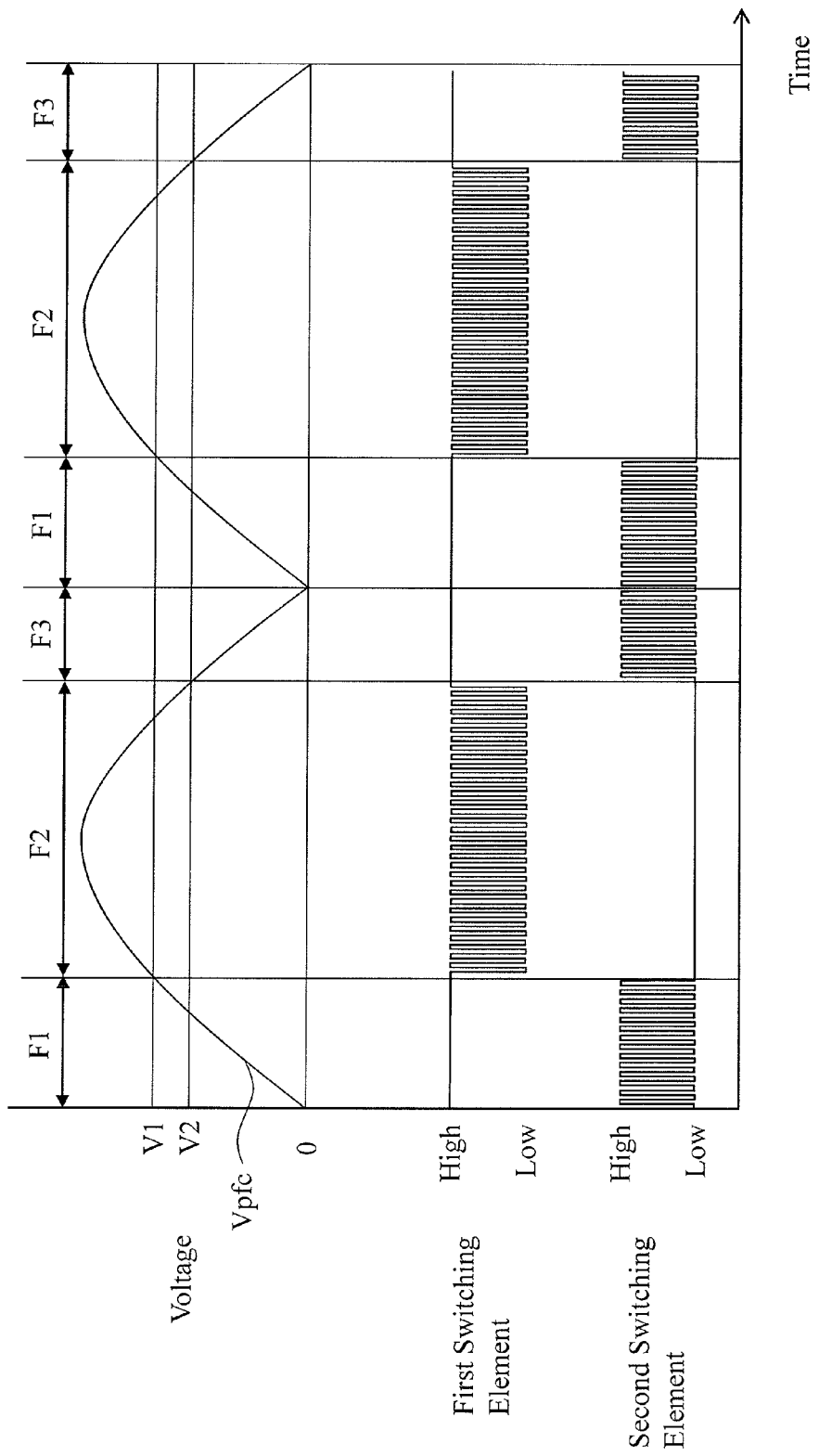
FIG. 4 is a timing chart showing control by the control circuit shown in FIG. 1.

The operation of the control circuit is described below with reference to the drawings. FIG. 4 is a timing chart showing another example of control by the control circuit shown in FIG. 1. As shown in FIG. 4, the rectification voltage Vpfc output by the rectification circuit Rc has the shape of a series of the ≥0 V half-waves of a sine wave.

A half-wave (one peak) of the rectification voltage Vpfc shown in FIG. 4 is described as being divided into a first region F1 extending from the section intersecting 0 V to a first voltage V1, a second region F2 extending from V1 through the maximum voltage to reach a second voltage V2, and a third region F3 extending from the second voltage until the rectification voltage Vpfc again reaches 0 V. The control signals input to the gate of the first switching element Tr1 and to the second switching element Tr2 are shown at bottom in FIG. 4.

As shown in FIG. 4, in the first region F1, the rectification voltage Vpfc is lower than the voltage V1, and therefore the power supply circuit A is prompted to perform a step-up operation. That is, the control circuit Cont inputs a normal High level signal to the first switching element Tr1, and at the same time inputs a signal (switching signal) that toggles between High level and Low level for a short time to the second switching element Tr2. That is, the first switching element Tr1 is turned on, and switching control of the second switching element Tr2 is performed. The power supply circuit A thereby steps up the rectification voltage Vpfc for output by the first output terminal Out1.

In the second region F2, the rectification voltage Vpfc is higher than the voltage V2, and therefore the power supply circuit A is made to perform a step-down operation. That is, the control circuit Cont inputs a normal Low level signal to the second switching element Tr2, and at the same time inputs a signal (switching signal) that toggles between High level and Low level for a short time to the first switching element Tr1. That is, the second switching element Tr2 is turned off, and switching control of the first switching element Tr1 is performed. The power supply circuit A thereby steps down the rectification voltage Vpfc for output by the first output terminal Out1.

As shown in FIG. 4, in the third region F3, the rectification voltage Vpfc is lower than the voltage V2. In the third region F3, the power supply circuit A is made to perform a step-up operation. The control circuit Cont inputs a normal High level signal to the first switching element Tr1, and at the same time inputs a signal (switching signal) that toggles between High level and Low level for a short time to the second switching element Tr2. That is, the first switching element Tr1 is turned on, and switching control of the second switching element Tr2 is performed. The power supply circuit A thereby steps up the rectification voltage Vpfc for output by the first output terminal Out1.

In the power supply circuit A, by stepping up the voltage in the regions in which the rectification voltage Vpfc is lower than the voltage V1 or the voltage V2 (the first region F1 and the third region F3), while stepping down the voltage in the region in which the rectification voltage Vpfc is higher than the voltage V2 (the second region F2), the waveform of the current value flowing to the first input terminal In1 can be shaped to conform to the waveform of the rectification voltage Vpfc, and the power factor can be improved.

Moreover, because it suffices simply to switch only the first switching element Tr1 or the second switching element, the loss associated with switching of the switching elements can be reduced. Additionally, because synchronous switching of the two switching elements is not required, there is no need for high speed operation by the control circuit, and the configuration of the control circuit can be commensurately simplified, making possible reduction in cost.

By determining two voltages in this manner, it is possible to output an output voltage of good accuracy, despite fluctuations in the frequency and amplitude of the alternating current voltage from the alternating current power supply Pa. Namely, because the output voltage can be adjusted through appropriate variation of the first voltage V1 and the second voltage V2, it is possible to output a desired output voltage through simple control, despite fluctuations in the frequency and amplitude of the alternating current voltage from the alternating current power supply Pa.

Figure 5:
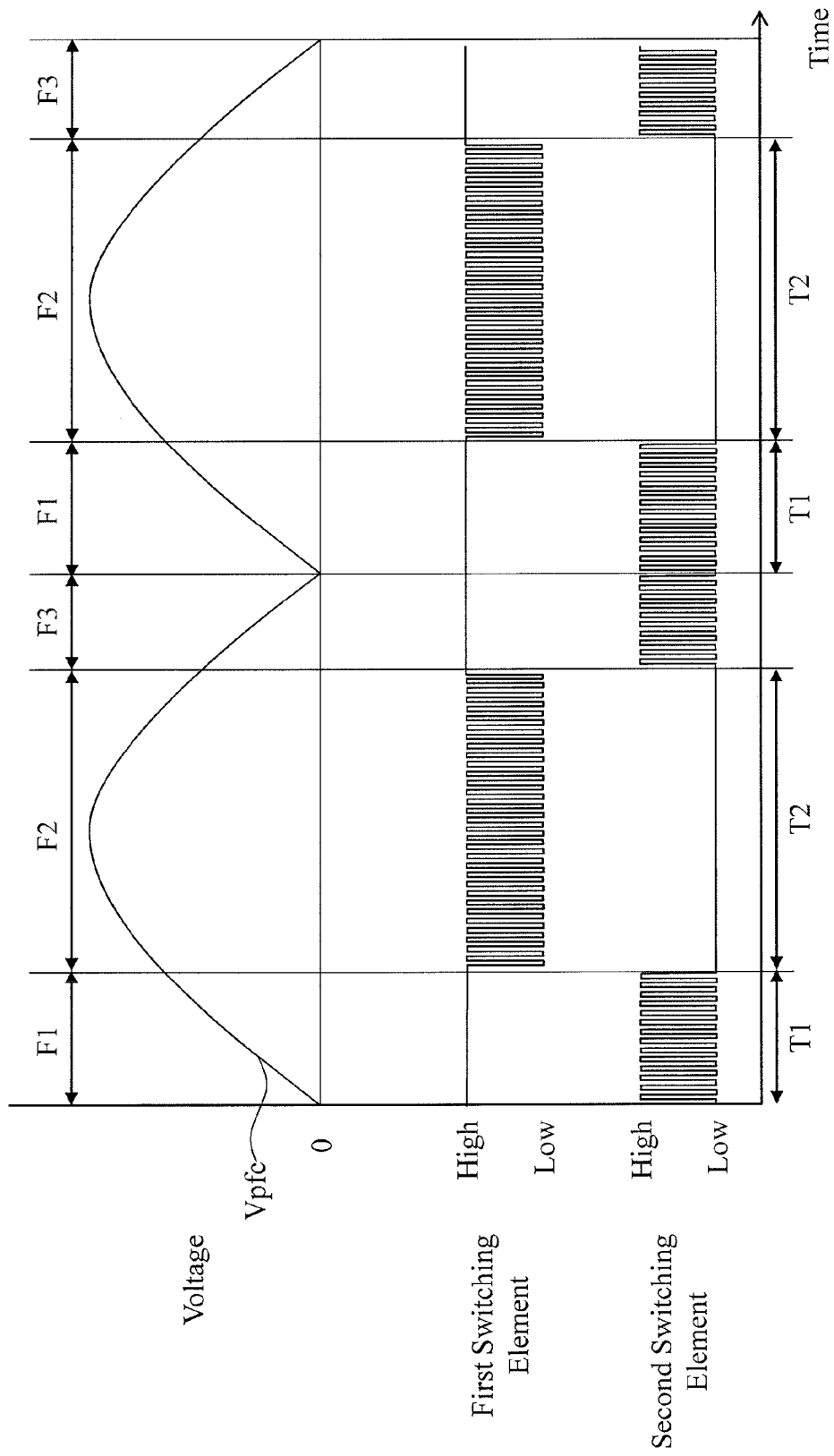
FIG. 5 is a timing chart showing control by the control circuit, in a case of control by a different control method employing the power supply circuit shown in FIG. 1.

FIG. 5 is a timing chart showing control by the control circuit, in a case of control by a different control method than the control method shown in FIG. 4. In the timing chart shown in FIG. 5, timing is managed based on time periods wherein the timing for toggling between the first region F1 and the second region F2 is set to a point in time subsequent to elapse of a time period T1 after the rectification voltage Vpfc has begun to rise from 0 V, and the timing for toggling between the second region F2 and the third region F3 is set to a point in time subsequent to elapse of a time period T2 following toggling to the second region F2.

As discussed previously, the power supply circuit A performs a step-up operation in the first region and the third region, and performs a step-down operation in the second region. By toggling between step-up operations and step-down operations on a time period basis in this way, toggling can take place with accurate timing. Moreover, because it suffices to simply adjust the time periods, it is possible to simplify control by the control circuit Cont.

This method of toggling between step-up operations and step-down operations by time period-based management in this manner is suited to cases in which the alternating current power supply Pa supplies alternating current having minimal fluctuations in frequency and amplitude, and cases in which there is a substantially unvarying load.

Specifically, when the power supply circuit according to the present invention is employed with precise input voltages or in circuits supplying power to a minimally fluctuating load, the size of data employed for control can be reduced, making possible more compact size and simpler design. Moreover, by toggling between step-up operations and step-down operations based on time periods, control is simplified.

In the present embodiment, the first region, the second region, and the third region are fixed regions; however, by establishing a fixed first region or third region (in other words, one or the other timing for switching between step-up operation and step-down operation) while varying the other, it is possible to vary the output voltage. Control of output voltage may be facilitated thereby. Further, in a case in which the load does not vary, such as with an LED lamp, a look-up table for each voltage can be utilized, and the size of the data in the table necessary for control can be smaller by a commensurate extent.

Third Embodiment

Figure 6:
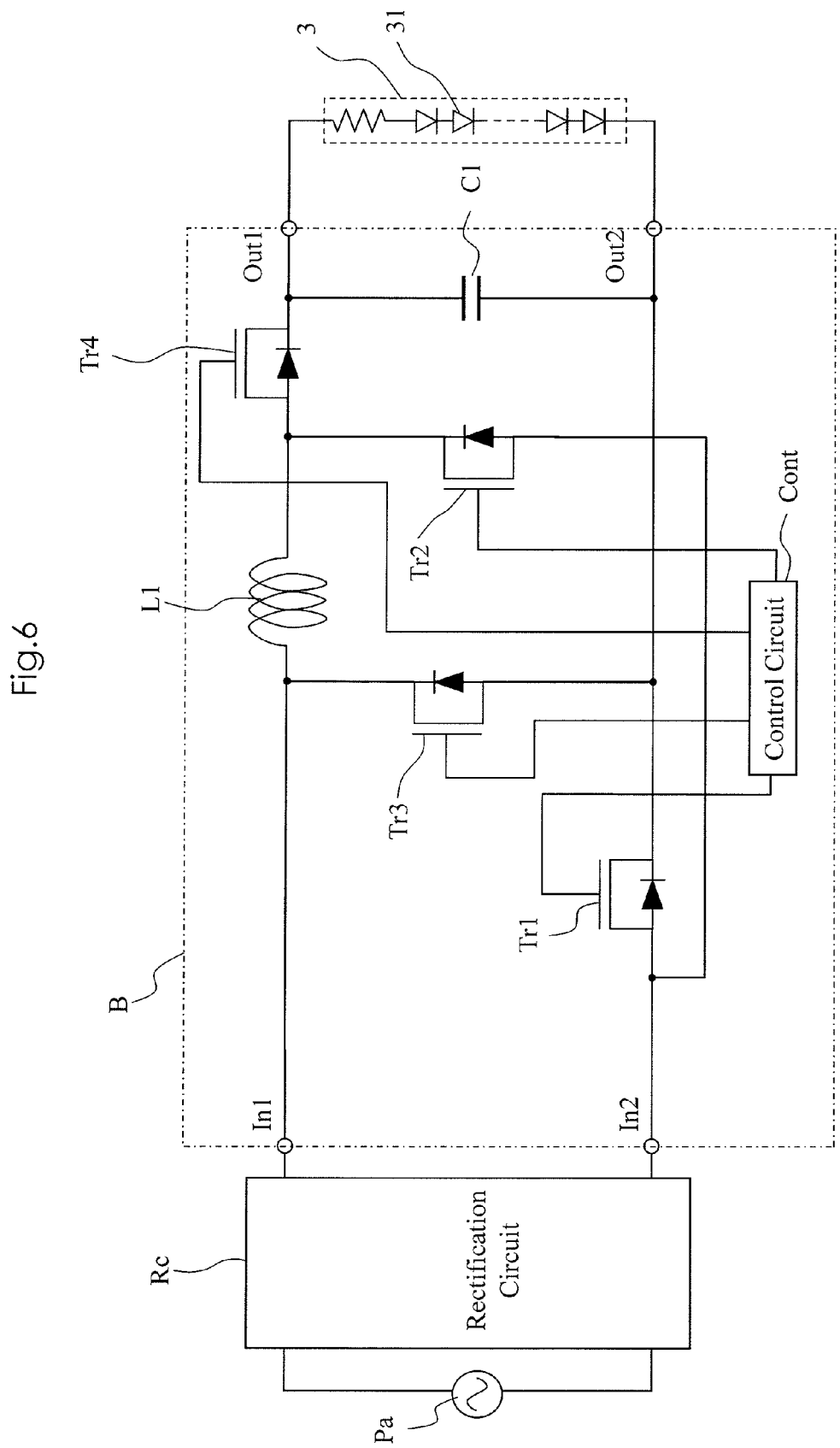
FIG. 6 is a diagram showing another example of a power supply circuit according to the present invention.

Another example of the power supply circuit according to the present invention will be described with reference to the drawings. FIG. 6 is a diagram showing another example of a power supply circuit according to the present invention. As shown in FIG. 6, a power supply circuit B has a configuration like that of the power supply circuit A shown in FIG. 1, but with the first diode Di1 replaced by a third switching element Tr3, and the second diode Di2 replaced by a fourth switching element Tr4. Furthermore, in this configuration, the control circuit Cont transmits a control signal to the third switching element Tr3 and the fourth switching element Tr4 as well. In other respects, the configuration is the same as that of the power supply circuit A, and portions thereof that are substantially identical are assigned like reference symbols, and detailed description of these identical portions are omitted.

As mentioned above, the power supply circuit B is provided with a third switching element Tr3 and a fourth switching element Tr4, in addition to the first switching element Tr1 and the second switching element Tr2.

In a state in which the first switching element Tr1 has been turned on and the third switching element Tr3 has been turned off, the second switching element Tr2 and the fourth switching element Tr4 are turned on/off in alternating fashion to operate the power supply circuit B as a step-up converter.

Figure 7:
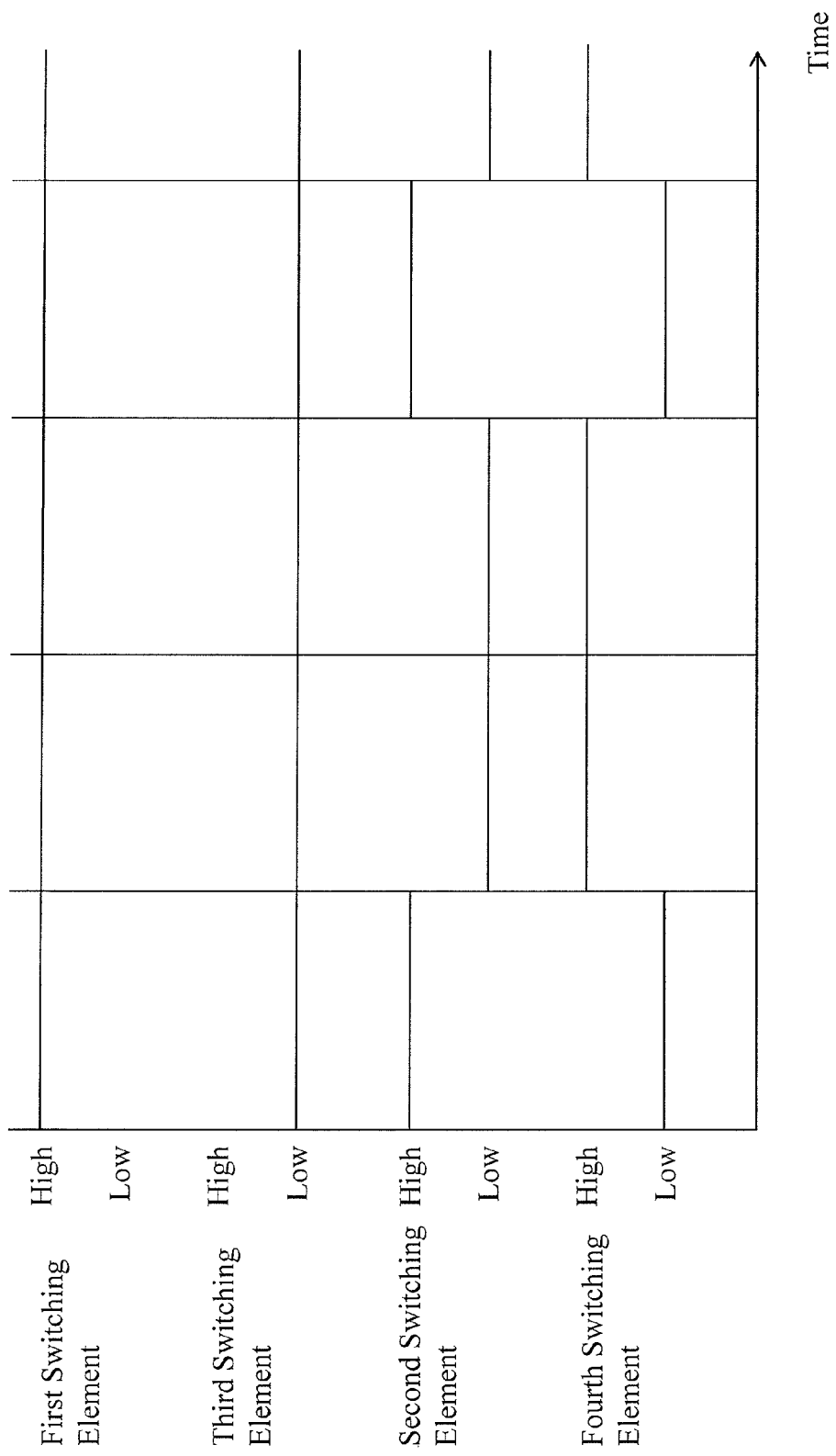
FIG. 7 shows control signals during step-up operation of the power supply circuit shown in FIG. 6.

The control signals supplied to each of the switching elements at this time will be described with reference to the drawings. FIG. 7 shows control signals during step-up operation of the power supply circuit shown in FIG. 6. As shown in FIG. 7, a normal High level control signal is input to the first switching element Tr1, and a normal Low level control signal is input to the third switching element Tr3, by the control circuit Cont. The first switching element Tr1 is thereby normally-on, and the third switching element Tr3 is normally-off.

In this state, when a High level control signal is input to the second switching element Tr2, a Low level control signal is input to the fourth switching element Tr4. Conversely, when a Low level control signal is input to the second switching element Tr2, a High level control signal is input to the fourth switching element Tr4. That is, the second switching element Tr2 and the fourth switching element Tr4 are driven in such a way that when one is on, the other is off, and when one is off, the other is on (synchronous switching).

In a state in which the second switching element Tr2 has been turned off and the fourth switching element Tr4 has been turned on, the first switching element Tr1 and the third switching element T3 are turned on/off in alternating fashion to operate the power supply circuit B as a step-down converter.

Figure 8:
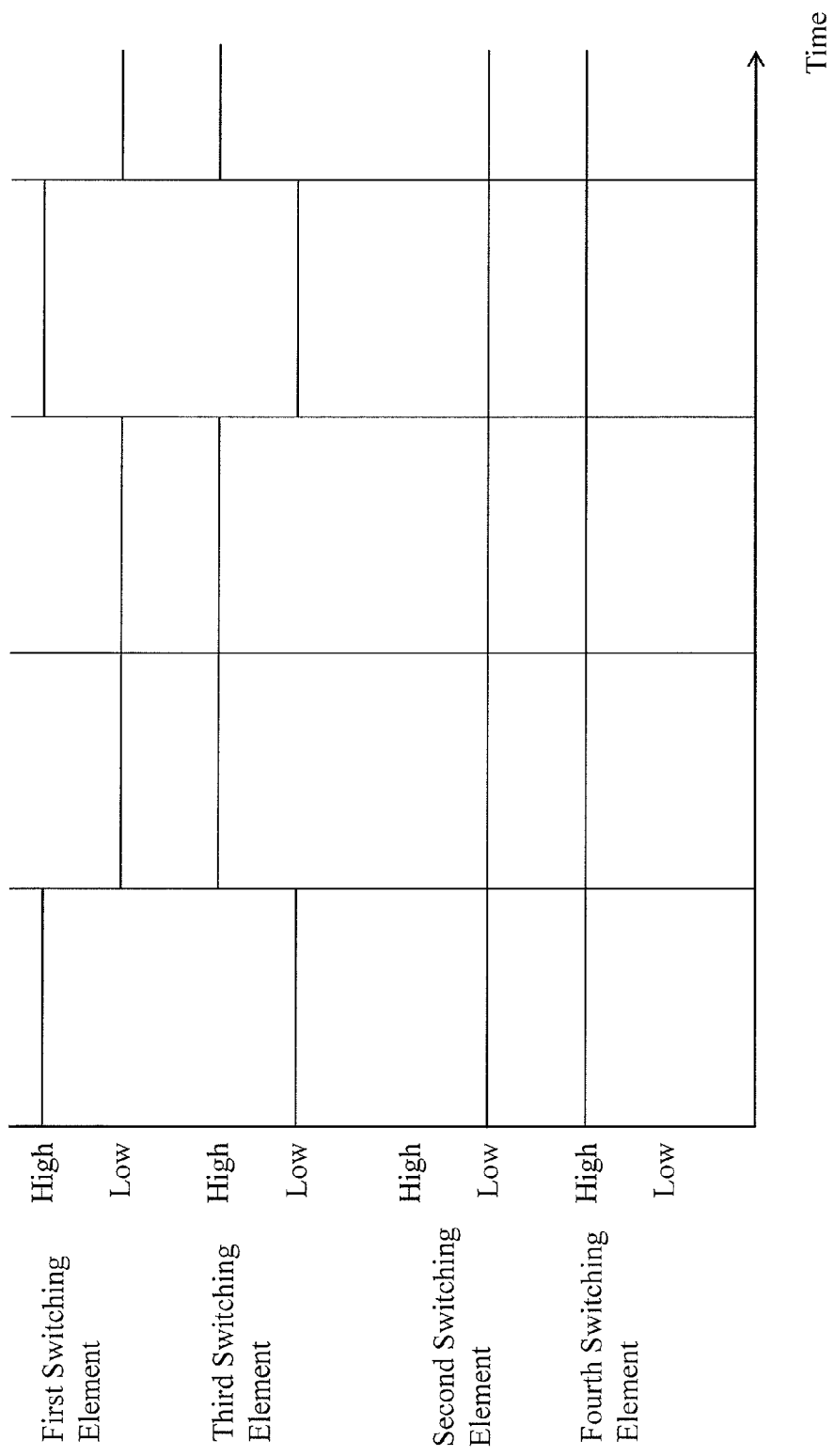
FIG. 8 shows control signals during step-down operation of the power supply circuit shown in FIG. 6.

The control signals supplied to each of the switching elements at this time will be described with reference to the drawings. FIG. 8 shows control signals during step-down operation of the power supply circuit shown in FIG. 6. As shown in FIG. 8, a normal Low level control signal is input to the second switching element Tr2, and a normal High level control signal is input to the fourth switching element Tr4, by the control circuit Cont. The second switching element Tr2 is thereby normally-off, and the fourth switching element Tr4 is normally-on.

In this state, when a High level control signal is input to the first switching element Tr1, a Low level control signal is input to the third switching element Tr3. Conversely, when a Low level control signal is input to the first switching element Tr1, a High level control signal is input to the third switching element Tr3. That is, the first switching element Tr1 and the third switching element Tr3 are driven in such a way that when one is on, the other is off, and when one is off, the other is on (synchronous switching).

When the rectification voltage Vpfc, which is the output voltage of the rectification circuit Rc, is lower than the output voltage Vo, the control circuit Cont of the power supply circuit B transmits control signals for performing a step-up operation, as shown in FIG. 7, to the first to fourth switching elements Tr1-Tr4. When the rectification voltage Vpfc is higher than the output voltage Vo, the control circuit Cont transmits control signals for performing a step-down operation, as shown in FIG. 8, to the first to fourth switching elements Tr1-Tr4. In so doing, the power factor can be improved in a manner analogous to the first embodiment.

In the first region and the second region shown in FIG. 4 or 5, the control circuit Cont of the power supply circuit B transmits control signals for performing a step-up operation, as shown in FIG. 7, to the first to fourth switching elements Tr1-Tr4. In the second region, the control circuit Cont transmits control signals for performing a step-down operation, as shown in FIG. 8, to the first to fourth switching elements Tr1-Tr4. In so doing, the power factor can be improved in a manner analogous to the second embodiment.

In so doing, the power factor can be improved, and when performing a step-up operation or a step-down operation, it suffices simply to turn one of two switching elements on and the other off, and in this state, to perform synchronous switching of the remaining two switching elements. Because of the smaller number of synchronous switching elements, it is possible to simplify the control circuit Cont by a commensurate extent.

Fourth Embodiment

Figure 9:
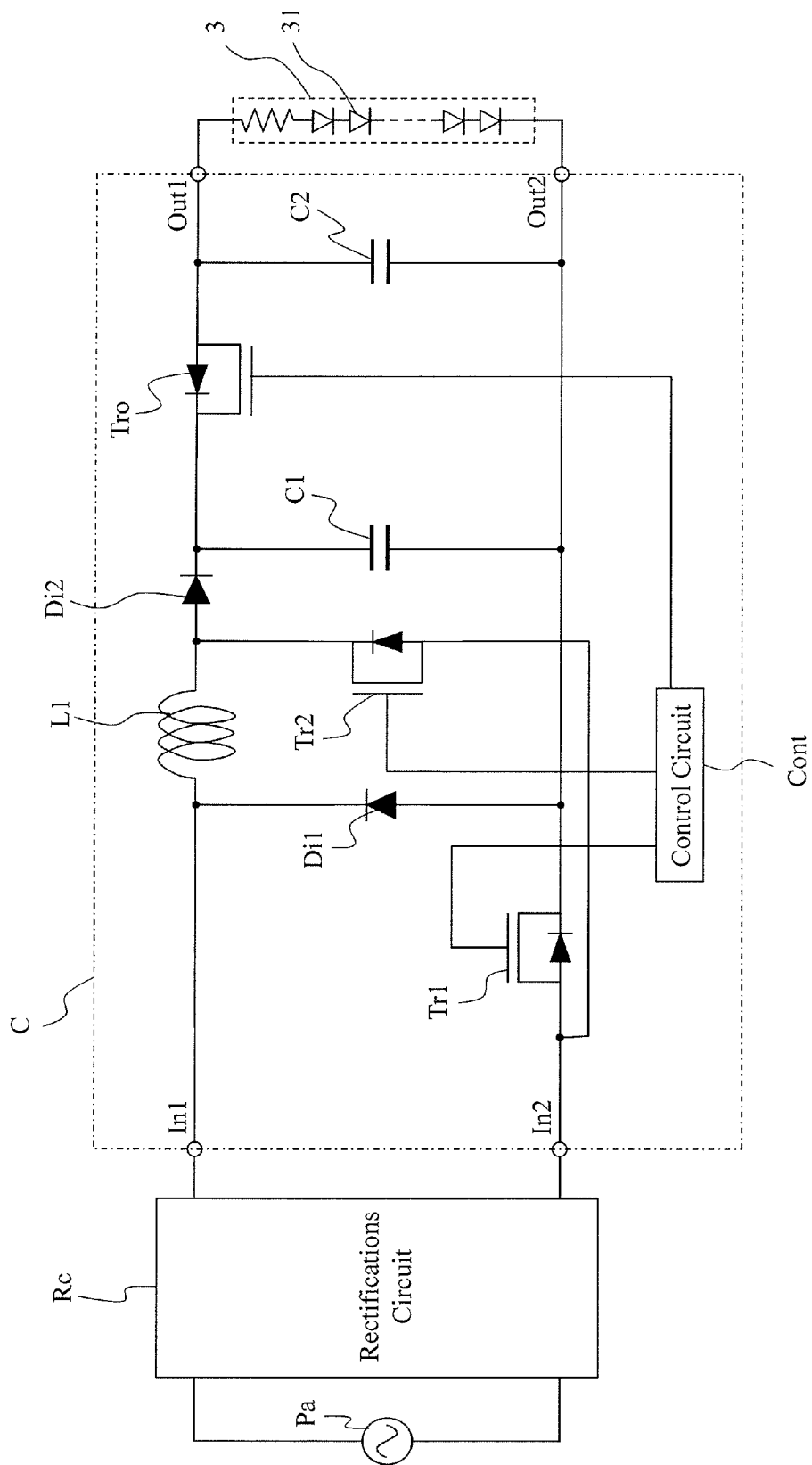
FIG. 9 is a diagram showing yet another example of a power supply circuit according to the present invention.

Yet another example of the power supply circuit according to the present invention will be described with reference to the drawings. FIG. 9 is a diagram showing yet another example of a power supply circuit according to the present invention. A power supply circuit C shown in FIG. 9 is provided on the output side thereof with an anti-flicker capacitor C2 and an anti-flicker switching element Tro. Other portions have the same configuration as the power supply circuit A shown in FIG. 1, and portions that are substantially identical are assigned like reference symbols, omitting detailed description of these identical portions.

The power supply circuit C is a circuit that converts alternating current to direct current for output. Within Japan, alternating current frequency is 50 Hz in eastern Japan, and 60 Hz in western Japan, so the output of the power supply circuit is direct current, but wavers between 50 Hz and 60 Hz. When the LED lamp 3 is lit by wavering direct current, the LED lamp 3 (LED 31) will flicker. While it is possible to eliminate such flicker in the power supply circuit A by increasing the capacity of the capacitor C1, increasing the capacity of a capacitor also increases its volume, and cost is higher as well, thereby hampering attempts to reduce size and cost.

Accordingly, in order to minimize such flicker of the LCD 31, in the power supply circuit C shown in FIG. 9, the anti-flicker capacitor C2 is connected in such a way as to couple the first output terminal Out1 and the second output terminal Out2, specifically, so as to be in parallel with the load LED lamp 3. Furthermore, the anti-flicker switching element Tro is provided between the cathode of the second diode Di2 and one terminal of the anti-flicker capacitor C2. As shown in FIG. 9, the anti-flicker capacitor C2 is attached to the output side from the capacitor C1. Moreover, the anti-flicker switching element Tro is arranged between one terminal of the capacitor C1 and one terminal of the anti-flicker capacitor C2.

Here, the method by which the power supply circuit C minimizes flicker will be described. When the output (the electrical current value of the output electrical current) of the power supply circuit C wavers between 50 Hz and 60 Hz, the emission brightness of the LED 31 also wavers between 50 Hz and 60 Hz. When emission brightness toggles at a frequency of 60 Hz or below, the human eye perceives the toggling as flicker. Accordingly, by toggling the anti-flicker switching element Tro at high speed, the electrical current supplied to the LED lamp 3 is made constant for a very brief time period. Flicker can be reduced by adopting a frequency such that flicker is not noticeable to the human eye (about 200 Hz) or above as the operating frequency of the anti-flicker switching element Tro. On/off control of the anti-flicker switching element Tro is accomplished with a signal from the control circuit Cont. When the anti-flicker switching element Tro is switched at 1 MHz or above, switching loss is considerable, and control becomes complicated, so switching takes place at 1 MHz or less.

Moreover, as it suffices for the operating frequency of the anti-flicker switching element Tro to be high and to supply constant electrical current for a very brief time period, the LED lamp 3 can be supplied with the electrical current needed to light up, even when the capacities of the capacitor C1 and the anti-flicker capacitor C2 are small.

From the above, with the power supply circuit C, as with the power supply circuit A, the power factor can be improved, and loss due to switching of the switching elements can be reduced. Additionally, because synchronous switching of two switching elements is not required, there is no need for high speed operation by the control circuit, and the configuration of the control circuit can be simplified to a commensurate extent, making possible reduction in cost. Furthermore, LED flicker can be prevented without employing large-capacity capacitors, or utilizing special circuitry.

Moreover, whereas in the present embodiment, the anti-flicker switching element Tro has been arranged on the first output terminal Out1 side (the LED lamp 3 anode side), a power supply circuit that performs an analogous operation is also possible when the anti-flicker switching element Tro is arranged on the second output terminal Out2 side (the LED lamp 3 cathode side).

Control of the first switching element Tr1 and the second switching element Tr2 may be accomplished in a manner analogous to the first embodiment, specifically, by toggling between step-up control and step-down control with reference to the relative magnitude of the rectification voltage Vpfc and a predetermined voltage (for example, the output voltage Vo). Moreover, in a manner analogous to the second embodiment, the period of the half-wave of the rectification voltage Vpfc may be divided, toggling between step-up control and step-down control for each period.

Fifth Embodiment

The power supply circuits shown in the preceding first to fourth embodiments are power supply circuits that convert alternating current to direct current; however, it is possible as well to utilize a power supply circuit having an analogous configuration, as a power supply circuit for converting direct current to direct current.

Figure 10:
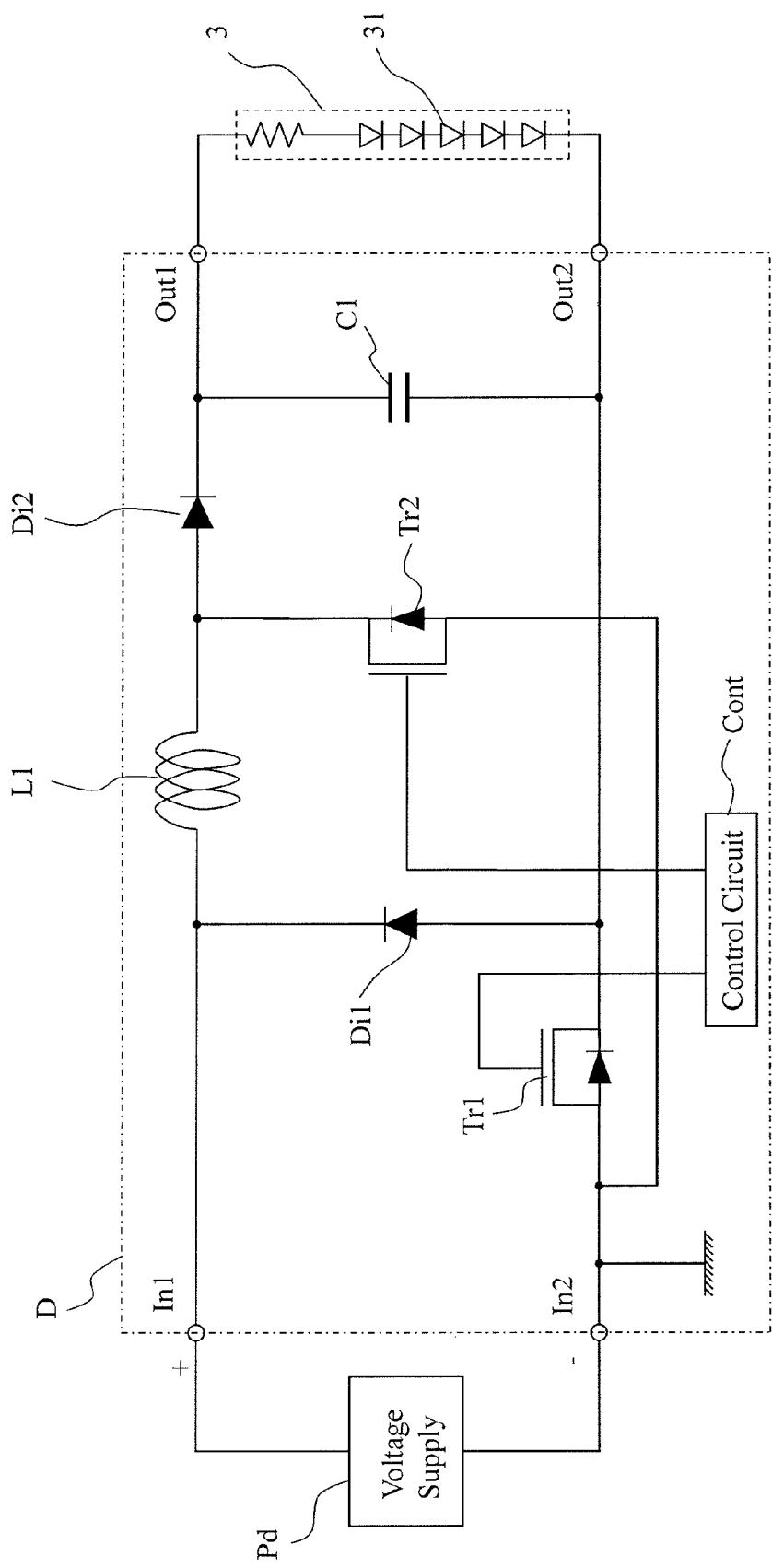
FIG. 10 is a diagram showing an example of a power supply circuit according to the present invention.

FIG. 10 is a circuit diagram showing yet another example of a power supply circuit according to the present invention. As shown in FIG. 10, a power supply circuit D has the same configuration as the power supply circuit A, except that the rectification voltage detector Svp and the output voltage detector Svo are not provided, and the circuit is connected to a direct current voltage supply Pd; portions thereof that are substantially identical are assigned like reference symbols, and detailed description of these identical portions is omitted.

When the second switching element Tr2 is normally-off, the power supply circuit D functions as a step-down converter. Specifically, in a state in which the control circuit Cont has transmitted a Low level control signal to the gate of the second switching element Tr2 and turned off the second switching element Tr2, the first switching element Tr1 is toggled on and off (switched) for a short period of time, whereby the voltage from the direct current power supply Pd that is connected to the first input terminal In1 and the second input terminal In2 is stepped down, and is output from the first output terminal Out1 and the second output terminal Out2.

When the first switching element Tr1 is normally-on, the power supply circuit D functions as a step-up converter. Specifically, in a state in which the control circuit Cont has transmitted a High level signal to the gate of the first switching element Tr1 and turned on the first switching element Tr1, the second switching element Tr2 is switched, whereby the voltage from the direct current power supply Pd that is connected to the first input terminal In1 and the second input terminal In2 is stepped up, and is output from the first output terminal Out1 and the second output terminal Out2.

Next, the connection of the first switching element Tr1 and the second switching element Tr2, which is a feature of the power supply circuit according to the present invention, will be described in detail. As shown in FIG. 10, in the power supply circuit D, the source of the first switching element Tr1 and the source of the second switching element Tr2 are both connected to the second input terminal In2 (shorted) and grounded.

The switching elements are n-type MOSFETs, and by applying a voltage to the gates thereof, electrical current is caused to flow between drain and source. That is, the switching element is turned on by applying to the gate a voltage such that the source-gate voltage is constant.

Because the source of the first switching element Tr1 and the source of the second switching element Tr2 are shorted, the source voltage of the first switching element Tr1 is at the same voltage as the source voltage of the second switching element Tr2. It is sufficient for the voltage applied to the gates to be such that the differential thereof with respect to the source voltage is constant. A High level voltage value and a Low level voltage value of the control signal input to the gates of the first switching element Tr1 and the second switching element Tr2 can be used as a common voltage value. In the power supply circuit D shown in FIG. 10, the second input terminal In2 is grounded, and therefore the source voltage of the first switching element Tr1 and the source voltage of the second switching element Tr2 are 0 V.

As a result, there is no need to provide a circuit (for example, a bootstrap circuit) for the control circuit Cont to independently acquire a reference voltage (source voltage) for the first switching element Tr1 and a reference voltage (source voltage) for the second switching element Tr2, respectively, and the configuration of the power supply circuit D can be simplified to a commensurate extent.

Figure 11:
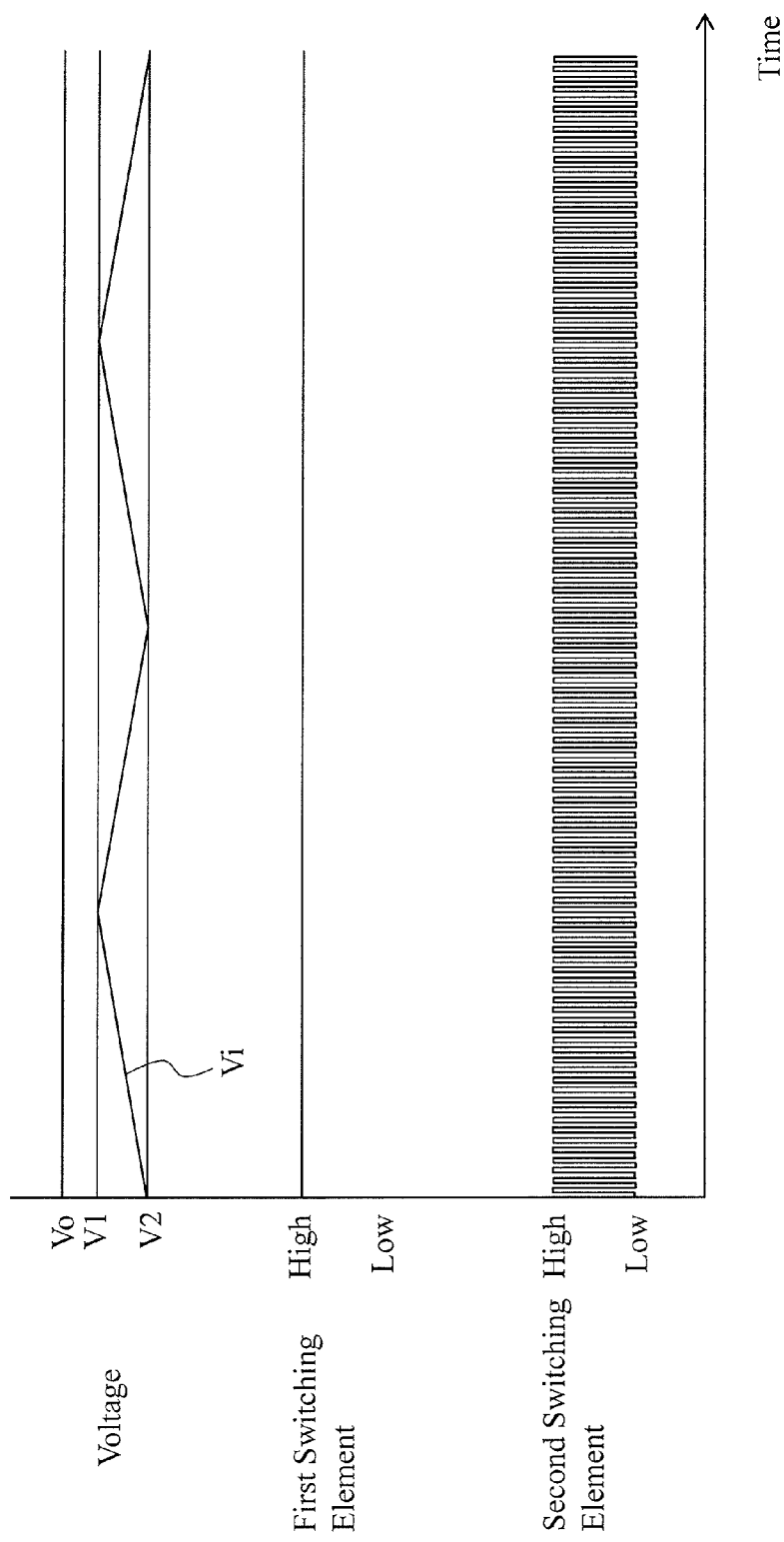
FIG. 11 is a timing chart showing signals input to a first switching element and a second switching element.
Figure 12:
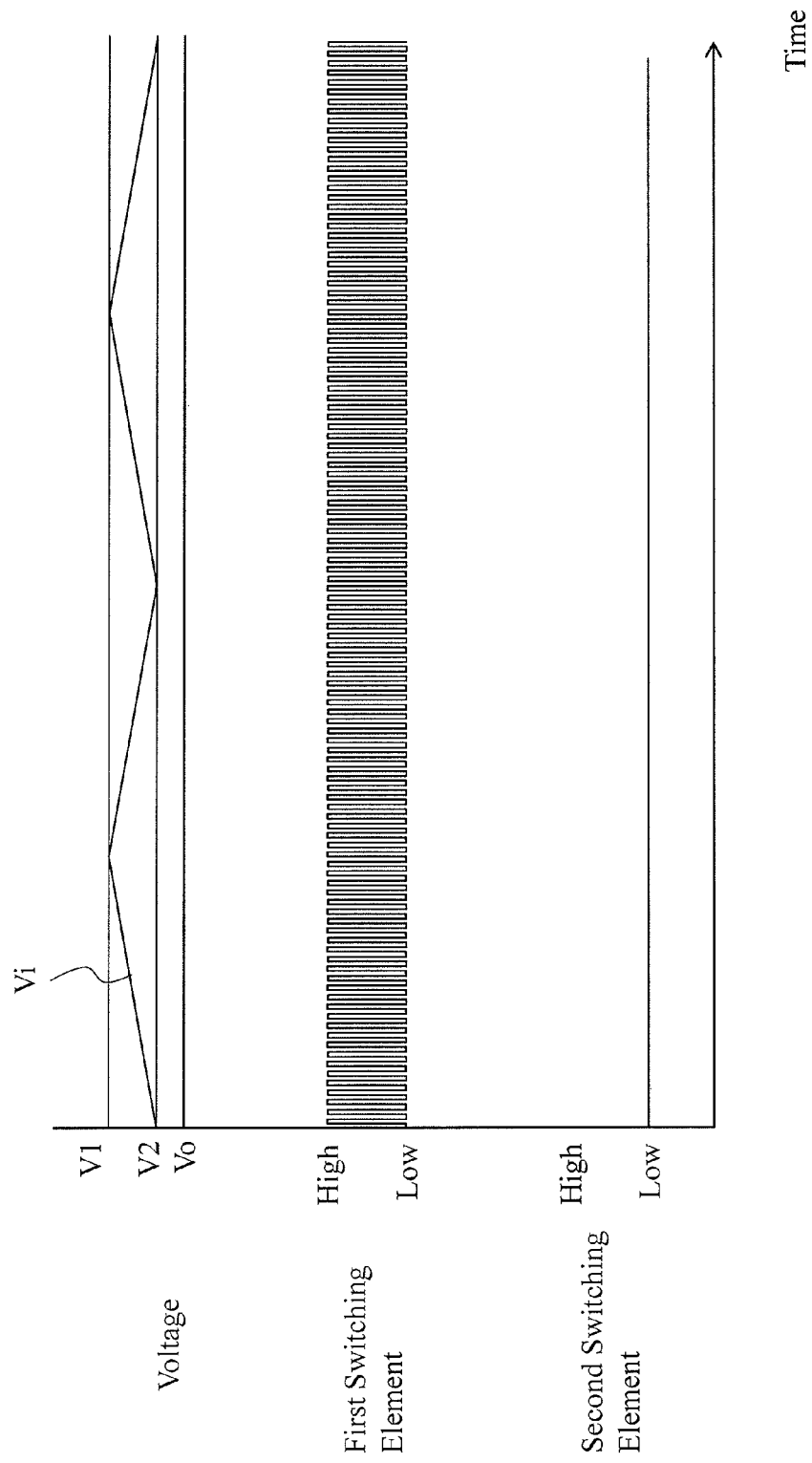
FIG. 12 is a timing chart showing signals input to a first switching element and a second switching element.
Figure 13:
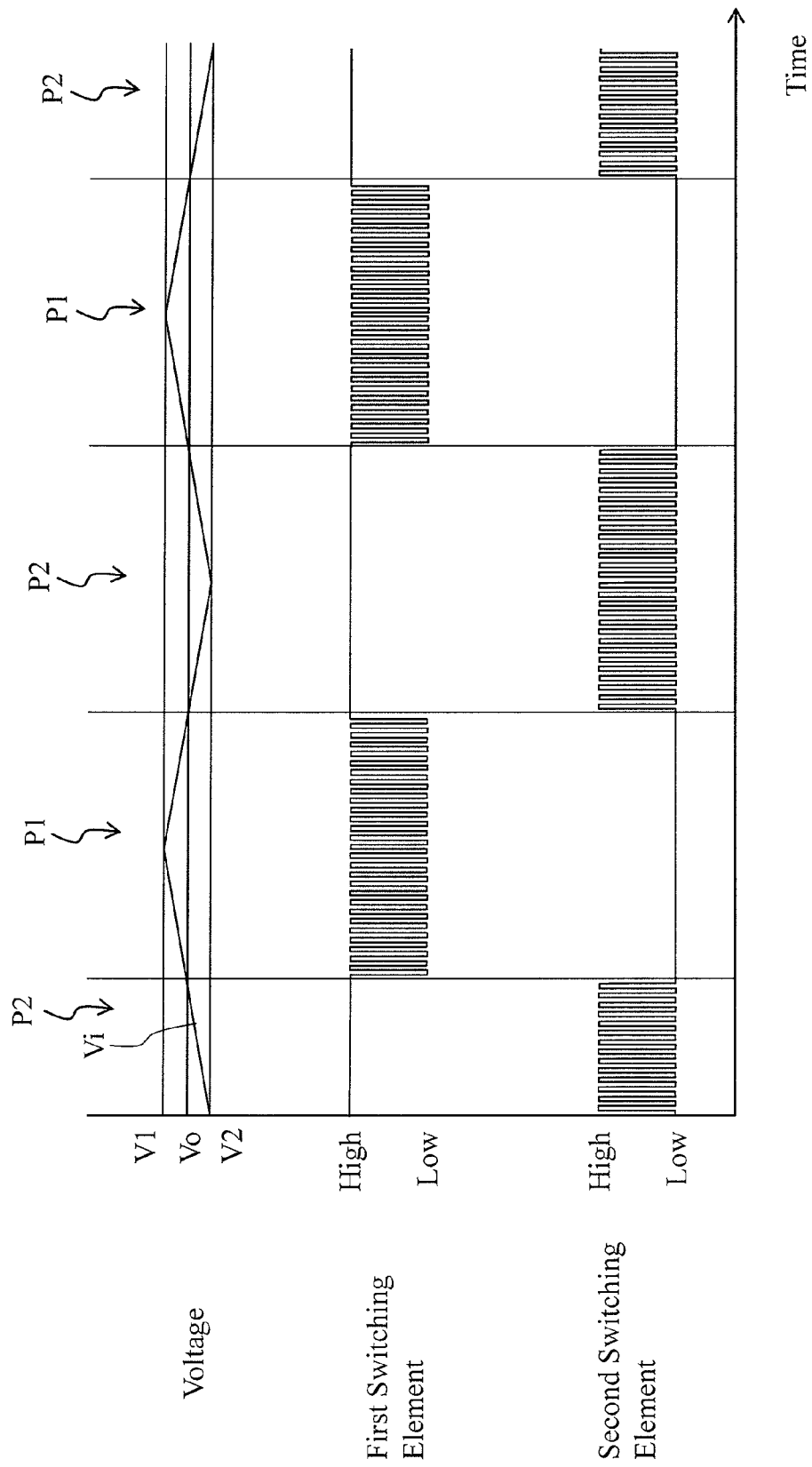
FIG. 13 is a timing chart showing signals input to a first switching element and a second switching element.

Next, the operation of the power supply circuit D will be described in detail with reference to the drawings. FIGS. 11 to 13 are timing charts showing signals input to the first switching element and the second switching element.

As shown in FIG. 10, the direct current power supply Pd is connected to the input terminals In1, In2 of the power supply circuit D, and the LED lamp 3 is connected to the output terminals Out1, Out2. In many cases, the direct current power supply Pd is a storage cell, and in such cases, the voltage when fully charged will differ from that when discharged. Moreover, in a case in which a load such as the LED lamp 3 is presented with constant electrical current by the direct current power supply Pd, in many cases, the input voltage input to the power supply circuit D by the direct current power supply Pd fluctuates.

For example, in a case in which the input voltage Vi from the direct current power supply Pd changes from V1 to V2 (V1>V2), output of the output voltage Vo for application to the LED lamp 3 is supplied in the following manner by the power supply circuit A.

When the output voltage Vo is greater than a maximum value V1 of the input voltage, because the output voltage Vo is always greater than the input voltage, the power supply circuit D steps up the input voltage Vi and outputs it as the output voltage Vo. Specifically, as shown in FIG. 11, in a state in which the control circuit Cont has sent out a High level signal to the gate of the first switching element Tr1 and turned on the first switching element Tr1, a signal that toggles between High level and Low level for a short time period (switching signal) is input to the gate of the second switching element Tr2. In so doing, the input voltage Vi is stepped up to the output voltage Vo.

In a case in which the output voltage Vo is less than a minimum value V2 of the input voltage, because the output voltage Vo is always less than the input voltage Vi, the power supply circuit D steps down the input voltage Vi and outputs it as the output voltage Vo. Specifically, as shown in FIG. 12, in a state in which the control circuit Cont has sent out a Low level signal to the gate of the second switching element Tr2 and turned off the second switching element Tr2, a signal that toggles between High level and Low level for a short time period (switching signal) is input to the gate of the first switching element Tr1. In so doing, the input voltage Vi is stepped down to the output voltage Vo.

In some cases, the output voltage Vo is less than the maximum value V1 but greater than the minimum value V2 of input voltage. Specifically, the output voltage Vo may be higher or lower than the input voltage Vi due to fluctuation of the input voltage Vi. Accordingly, the power supply circuit D will detect the input voltage Vi, and perform different control depending on whether the input voltage Vi is greater than or less than the output voltage Vo.

As shown in FIG. 13, when it is detected that the input voltage Vi is higher than the output voltage Vo, the control circuit Cont transmits a Low level signal to the gate of the second switching element Tr2, and inputs a switching signal to the gate of the first switching element Tr1 (the portion of region P1 in FIG. 13). In so doing, the power supply circuit D acts as a step-down converter.

When the voltage of the direct current power supply Pd fluctuates, the input voltage Vi is lower than the output voltage Vo in some instances. At such times, the control circuit Cont transmits a High level signal to the gate of the first switching element Tr1, and inputs a switching signal to the gate of the second switching element Tr2 (the portion of region P2 in FIG. 13). In so doing, the power supply circuit D acts as a step-up converter.

The control circuit Cont detects the input voltage Vi, and compares this voltage to the output voltage Vo, to thereby operate the power supply circuit D as a step-up converter or a step-down converter, so that even in cases in which the input voltage Vi fluctuates, a constant output voltage Vo can be output with high precision.

In so doing, by employing the power supply circuit D as a portion of the power supply circuit for the LED lamp 3 as shown in FIG. 10, a constant output voltage Vo can be applied with high precision to the LED lamp 3, and therefore flickering of the LED lamp 3 can be minimized.

As discussed above, through control that involves the control circuit Cont fixing either the first switching element Tr1 or the second switching element Tr2 on or off, while switching the other, output voltage of constant voltage can be output, therefore making it possible to simplify the configuration of the control circuit Cont.

Sixth embodiment

Figure 14:
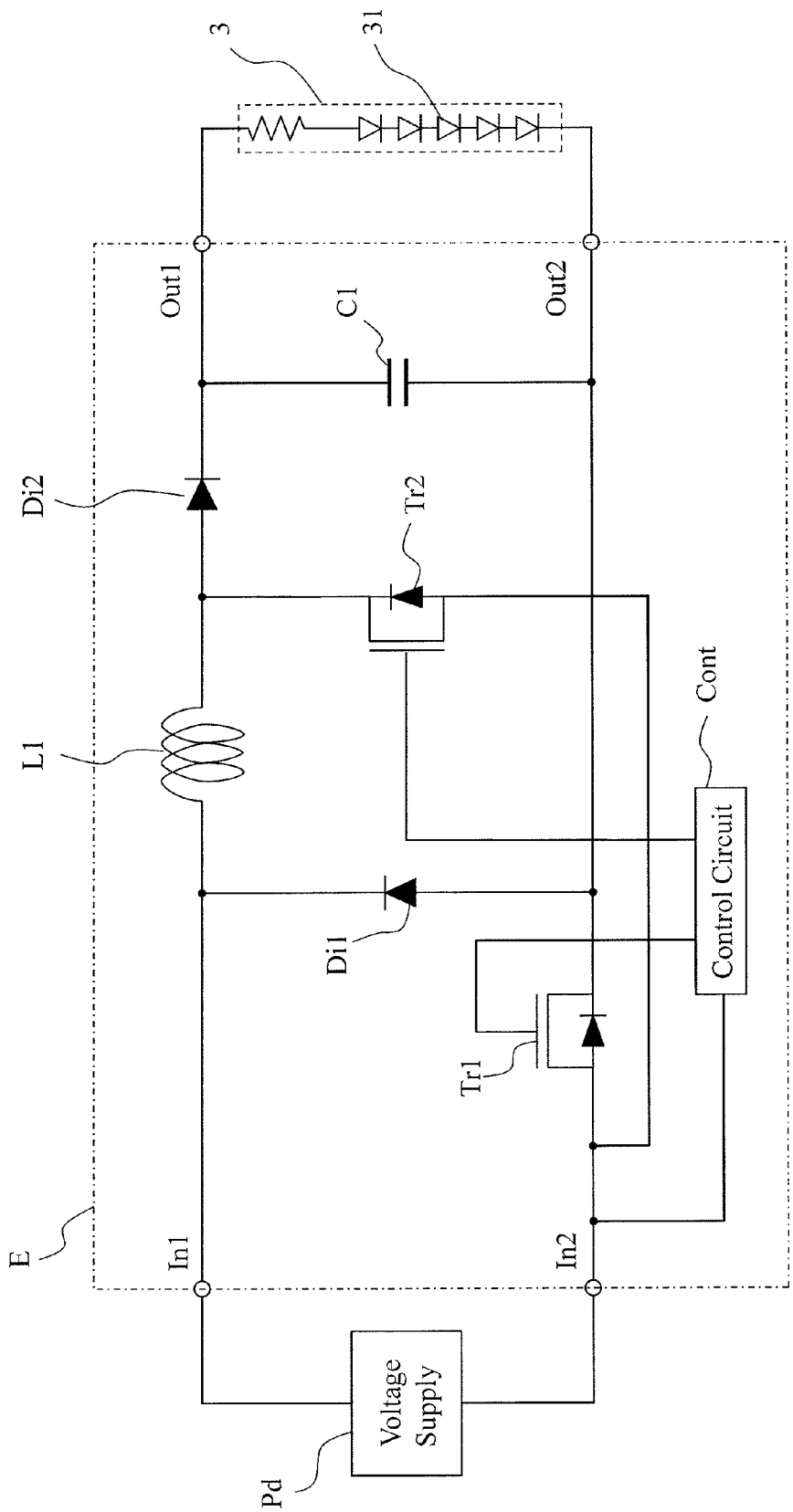
FIG. 14 is a diagram showing another example of a power supply circuit according to the present invention.

Another example of the power supply circuit according to the present invention will be described with reference to the drawings. FIG. 14 is a diagram showing another example of a power supply circuit according to the present invention. A power supply circuit E shown in FIG. 14 has the same configuration as the power supply circuit D shown in FIG. 10, except that the control circuit Cont is connected to the second input terminal In2; portions thereof that are substantially identical are assigned like reference symbols, omitting detailed description of these identical portions.

As shown in FIG. 14, the power supply circuit E is configured such that the control circuit Cont detects the voltage of the second input terminal In2. Like the power supply circuit D, in the power supply circuit E, the source of the first switching element Tr1 and the source of the second switching element Tr2 are connected to the second input terminal In2 (the source of each of the switching elements is shorted), and therefore, by detecting the voltage of the second input terminal In2, the control circuit Cont can acquire the source voltage (reference voltage) of the first switching element Tr1 and the second switching element Tr2.

Because the source voltage of the first switching element Tr1 and the source voltage of the second switching element Tr2 are equal, like the power supply circuit D, in the power supply circuit E, common High level and Low level voltages can be adopted for the control signals transmitted to the gate of the first switching element Tr1 and the gate of the second switching element Tr2. In so doing, there is no need for the control circuit Cont to respectively acquire the source voltage of the first switching element Tr1 and the source voltage of the second switching element Tr2, making possible a simpler circuit configuration.

The control circuit Cont of the power supply circuit E is the same as the control circuit Cont of the power supply circuit D, apart from the fact that the High level and Low level voltage values of the control signals differ, and it is possible by the same operation to output highly precise constant voltage. Moreover, whereas in the power supply circuit E the second input terminal In2 is not grounded, a grounded configuration may be adopted. In this case, where the ground terminal of the control circuit Cont is connected to the second input terminal In2, even in a case in which, for example, grounding is insufficient due to a wiring defect of the grounding wire or the like, control signals of the proper voltage can be supplied to the first switching element Tr1 and the second switching element Tr2.

EXAMPLES

First Example

Figure 15:
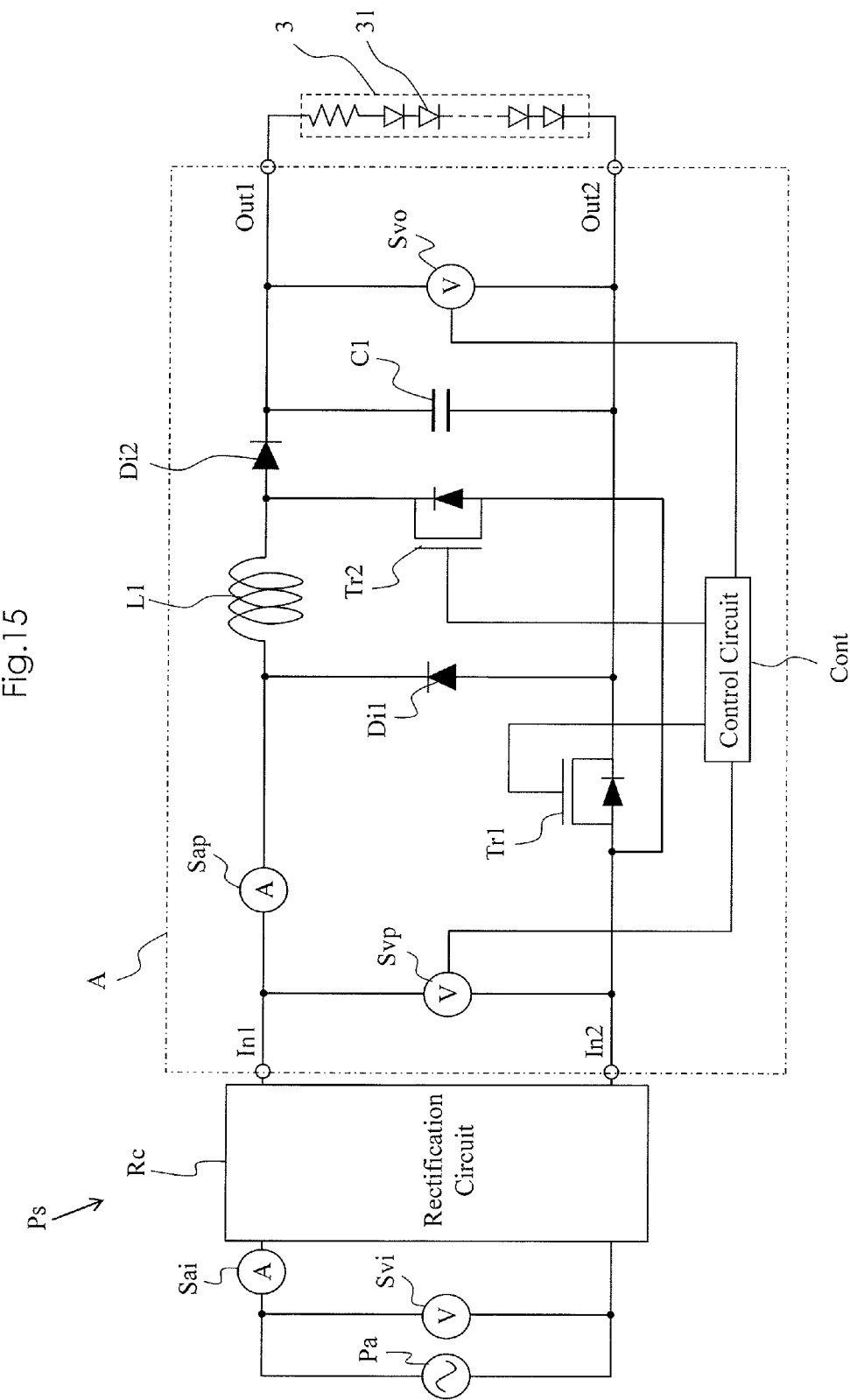
FIG. 15 is a diagram of a power supply device employing the power supply circuit shown in FIG. 1.

An example that employs the power supply circuit according to the present invention as shown hereinabove will be described with reference to the drawings. FIG. 15 is a diagram of a power supply device employing the power supply circuit according to the present invention. As shown in FIG. 15, a power supply device Ps includes a power supply circuit A, an alternating current power supply Pa, an input voltage detector Svi for detecting an input voltage Vin from the alternating current power supply Pa, an input electrical current detector Sai for detecting an input electrical current Iin from the alternating current power supply Pa, a rectification circuit Rc for full-wave rectification of alternating current from the alternating current power supply Pa, a rectification voltage detector Svp for detecting a rectification voltage Vpfc rectified by the rectification circuit Rc, a rectified electrical current detector Sap for detecting a rectified electrical current Ipfc flowing to a first input terminal In1, and an output voltage detector Svo for detecting an output voltage Vout of the power supply circuit.

Figure 16:
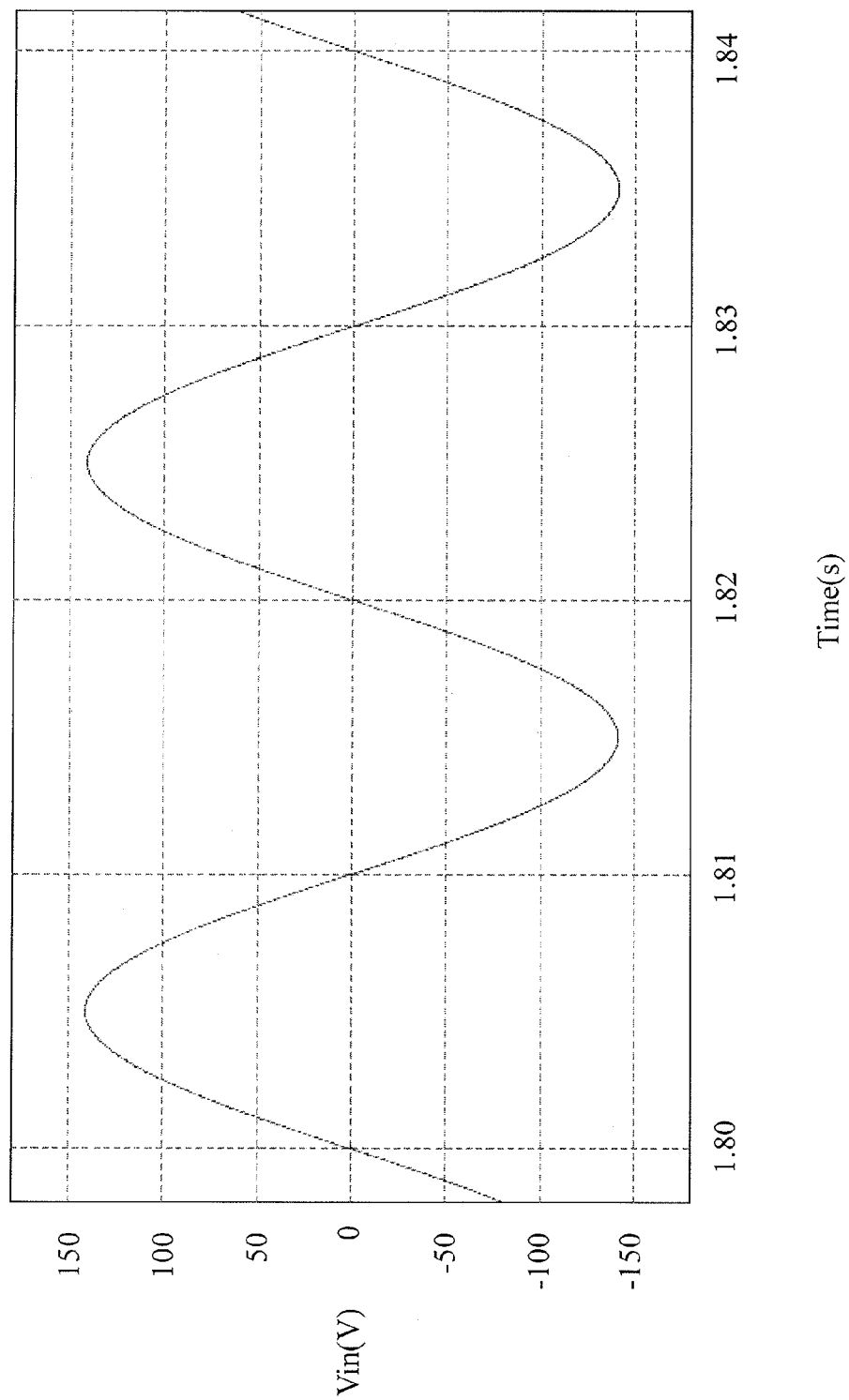
FIG. 16 is a diagram showing input voltage.
Figure 17:
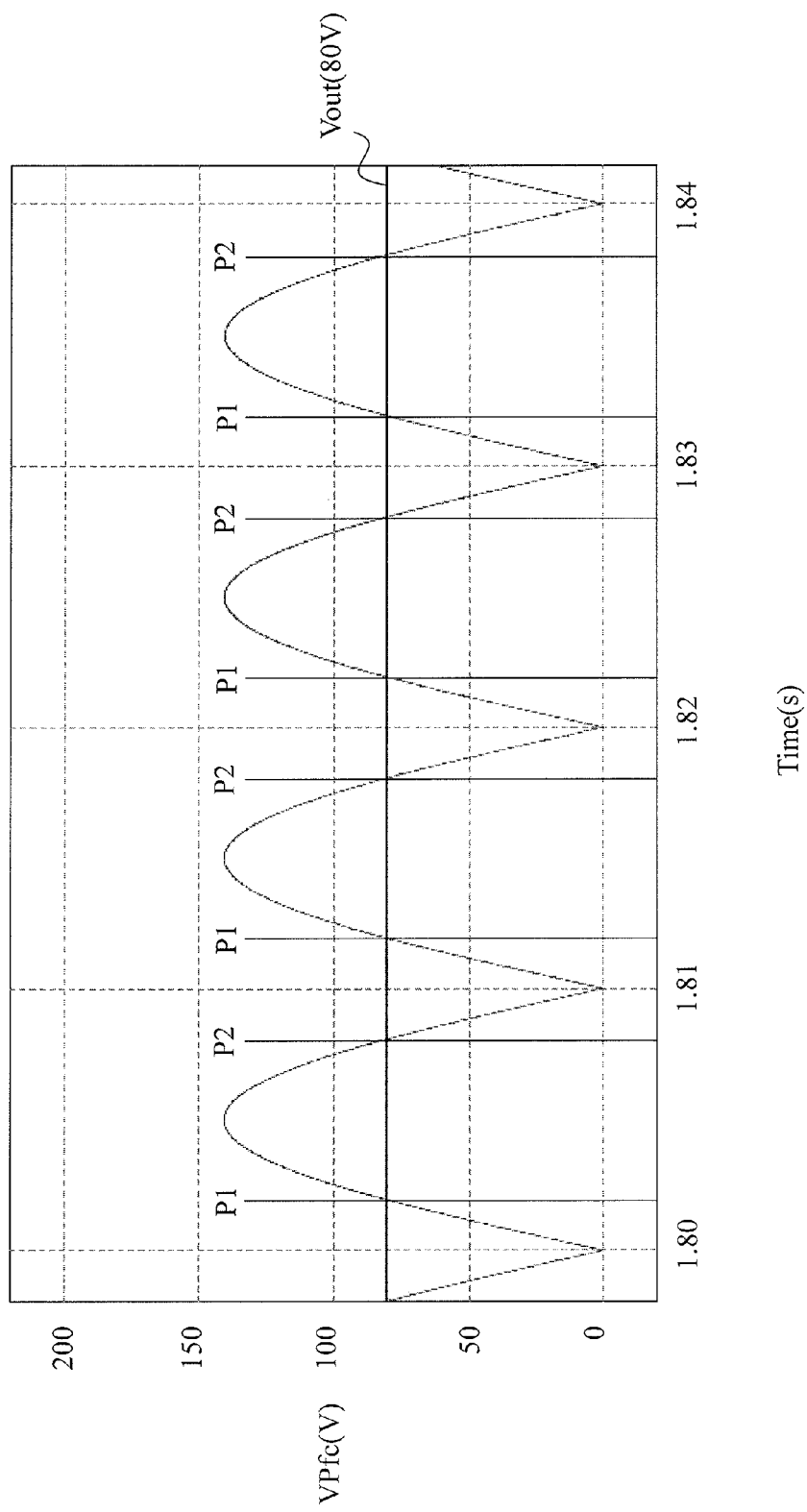
FIG. 17 is a diagram showing rectification voltage.
Figure 18:
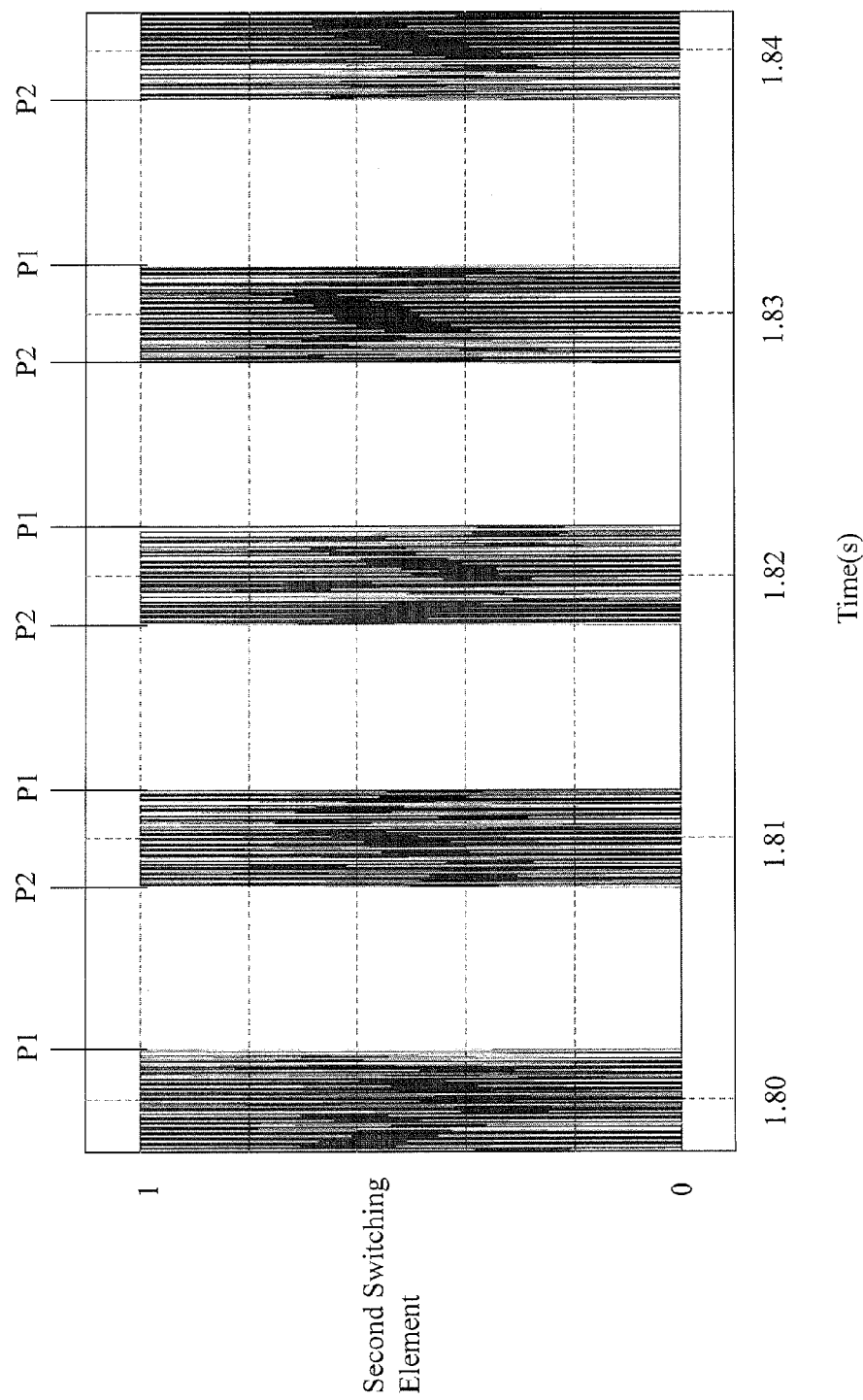
FIG. 18 is a control signal input to the gate of a second switching element included in the power supply circuit shown in FIG. 15.
Figure 19:
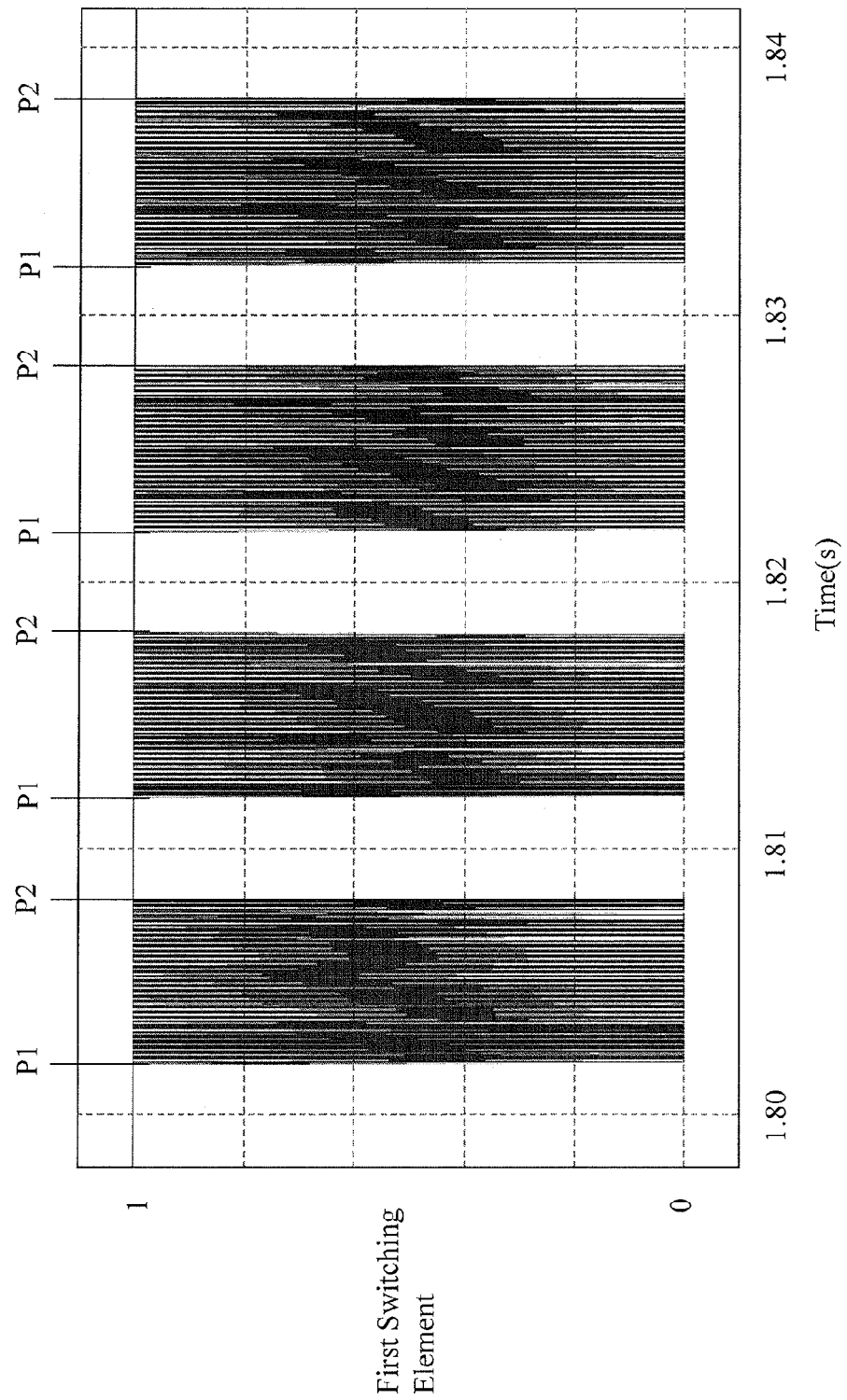
FIG. 19 is a control signal input to the gate of a first switching element included in the power supply circuit shown in FIG. 15.
Figure 20:
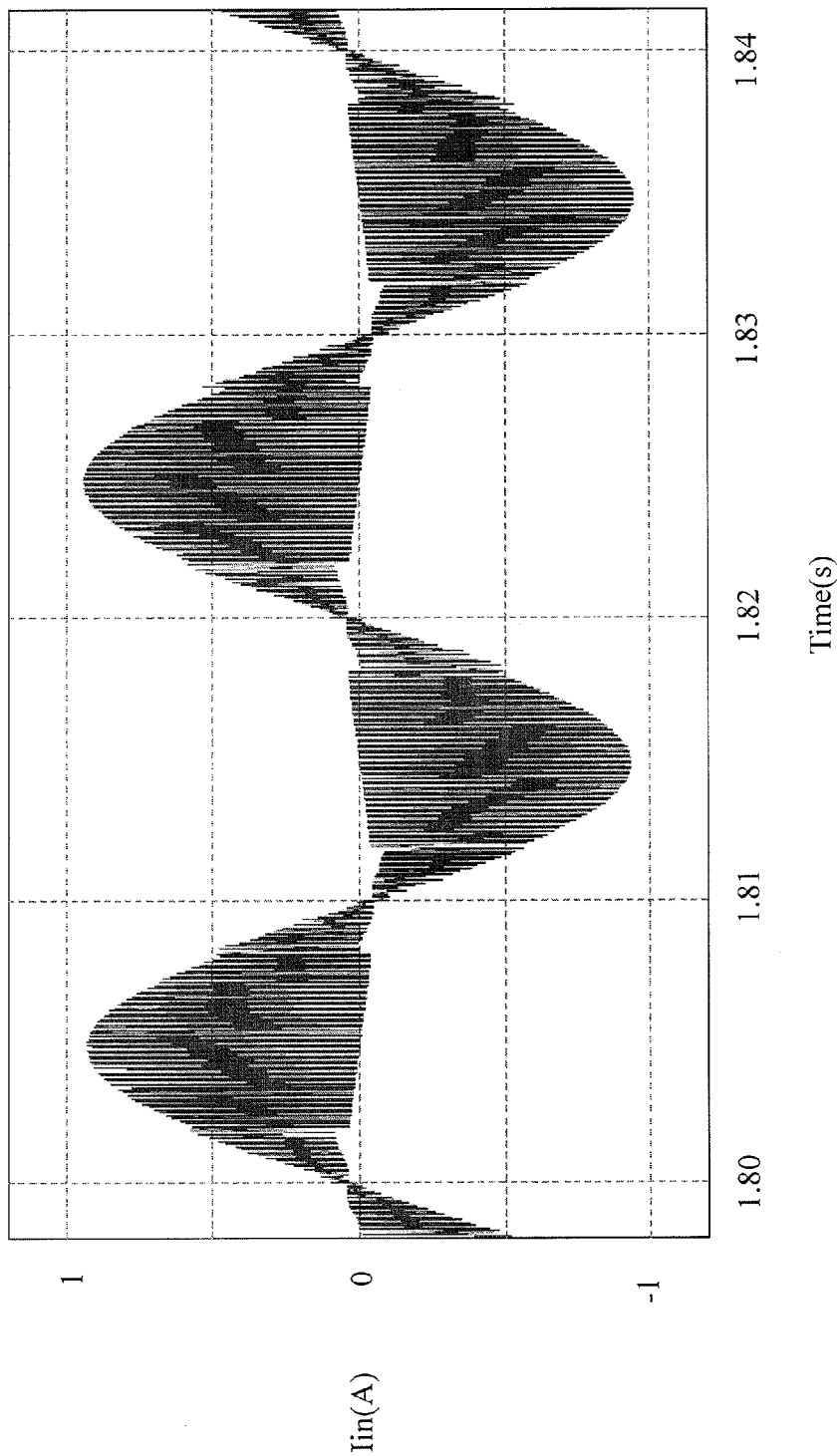
FIG. 20 is a diagram showing input electrical current.
Figure 21:
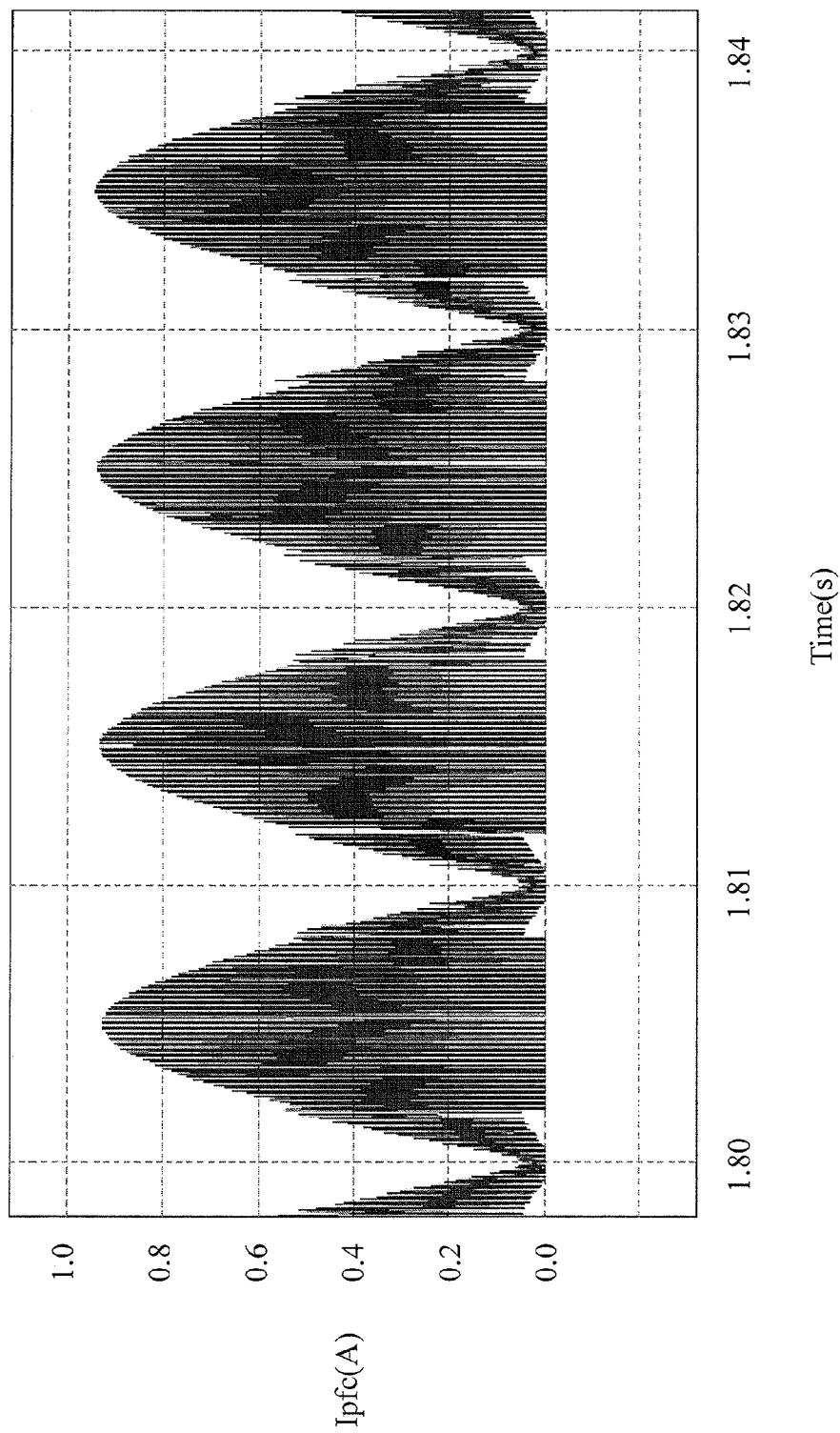
FIG. 21 is a diagram showing rectified electrical current.

An example of a step-up operation by the power supply device Ps shown in FIG. 15 will be described with reference to the drawings. FIG. 16 is a diagram showing input voltage; FIG. 17 is a diagram showing rectification voltage; FIG. 18 is a control signal input to the gate of a second switching element included in the power supply circuit shown in FIG. 15; FIG. 19 is a control signal input to the gate of a first switching element included in the power supply circuit shown in FIG. 15; FIG. 20 is a diagram showing input electrical current; FIG. 21 is a diagram showing rectified electrical current; and FIG. 15 is a diagram showing output voltage. In FIGS. 18 and 19, on the vertical axis, "1" indicates High level, and "0" indicates Low level.

As shown in FIG. 16, the alternating current power supply Pa inputs to the rectification circuit Rc alternating current voltage having a frequency f of 50 Hz, and an effective voltage Vrms of 100 V (peak value approximately 140 V). Full-wave rectification of this alternating current voltage by the rectification circuit Rc gives a positive voltage pulse wave like that shown in FIG. 17.

The control circuit Cont acquires the rectification voltage Vpfc from the rectification voltage detector Svp, and the output voltage Vout from the output voltage detector Svo. When the rectification voltage Vpfc is lower than the output voltage Vout, the control circuit Cont, while inputting a High level signal to the gate of the first switching element Tr1, inputs to the gate of the second switching element Tr2 a signal that toggles between High level and Low level for a short time period (switching signal, see FIG. 18).

With the first switching element Tr1 on, the second switching element Tr2 is switched, and therefore the power supply circuit A performs a step-up operation.

When the rectification voltage Vpfc rises and exceeds the output voltage Vout, the control circuit Cont, while inputting a Low level signal to the gate of the second switching element Tr2, inputs a switching signal to the gate of the first switching element Tr1 (see FIG. 19). In so doing, with the second switching element Tr2 off, the first switching element Tr1 is switched, and therefore the power supply circuit A performs a step-down operation.

Figure 22:
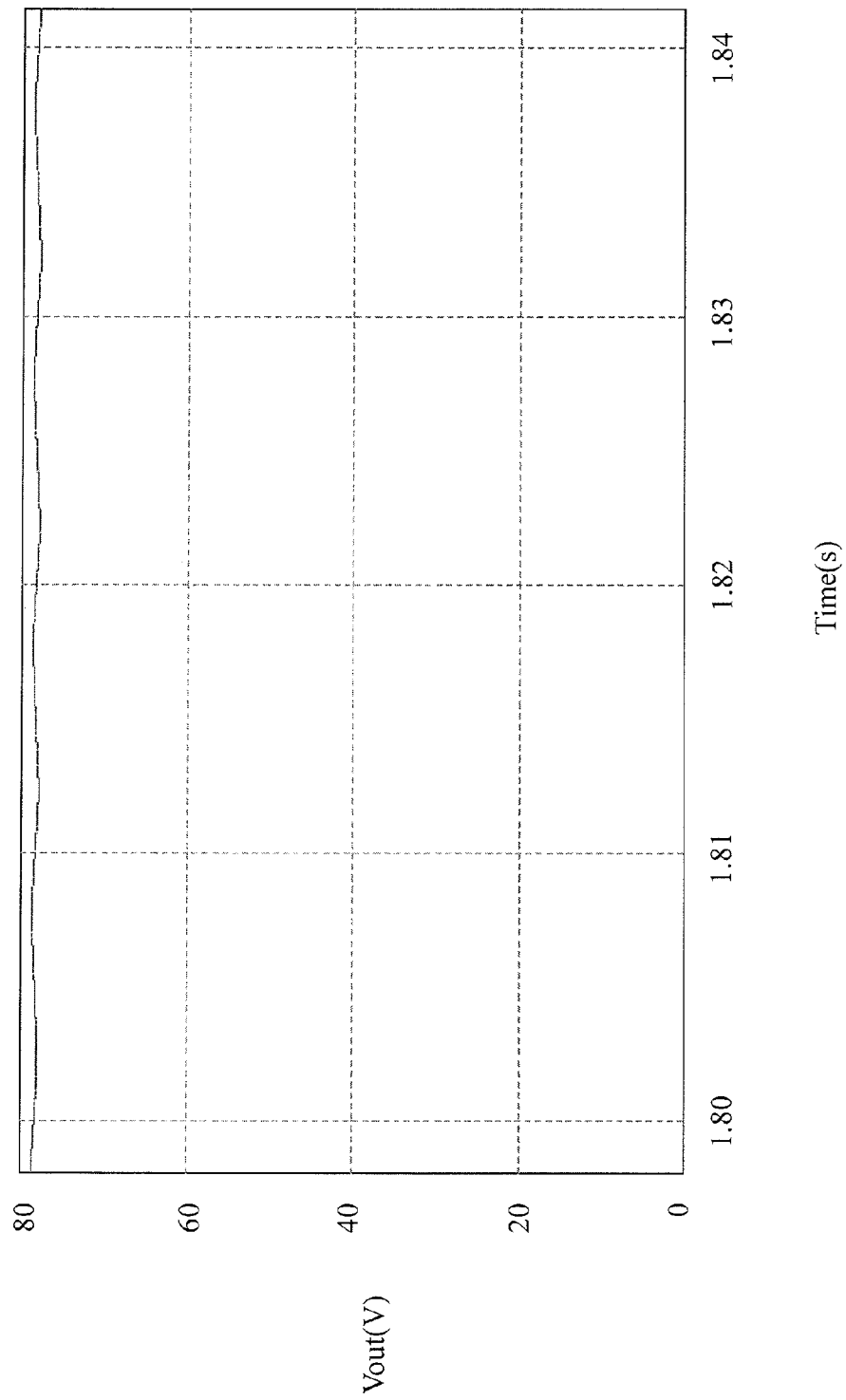
FIG. 22 is a diagram showing output voltage.

By stepping up or stepping down the rectification voltage Vpfc in the power supply circuit A in this way and smoothing it with the capacitor C1, a substantially constant output voltage can be output, as shown in FIG. 22. Moreover, by stepping up the rectification voltage Vpfc when small and stepping down when it is large, situations in which electrical current has difficulty flowing, or in which a large electrical current flows within a short period, are suppressed. In so doing, the input electrical current Iin from the alternating current power supply Pa and the rectified electrical current Ipfc from the rectification circuit Rc take on the waveforms shown respectively in FIGS. 20 and 21. The input electrical current Iin waveform shown in FIG. 20 has a shape similar to that of the input voltage Vin, and the waveform of the rectified electrical current Ipfc shown in FIG. 21 has a shape similar to that of the rectification voltage Vpfc, respectively, and it will be appreciated that that the power supply circuit A is a PFC circuit, and that the power factor can be improved.

Second Example

Figure 23:
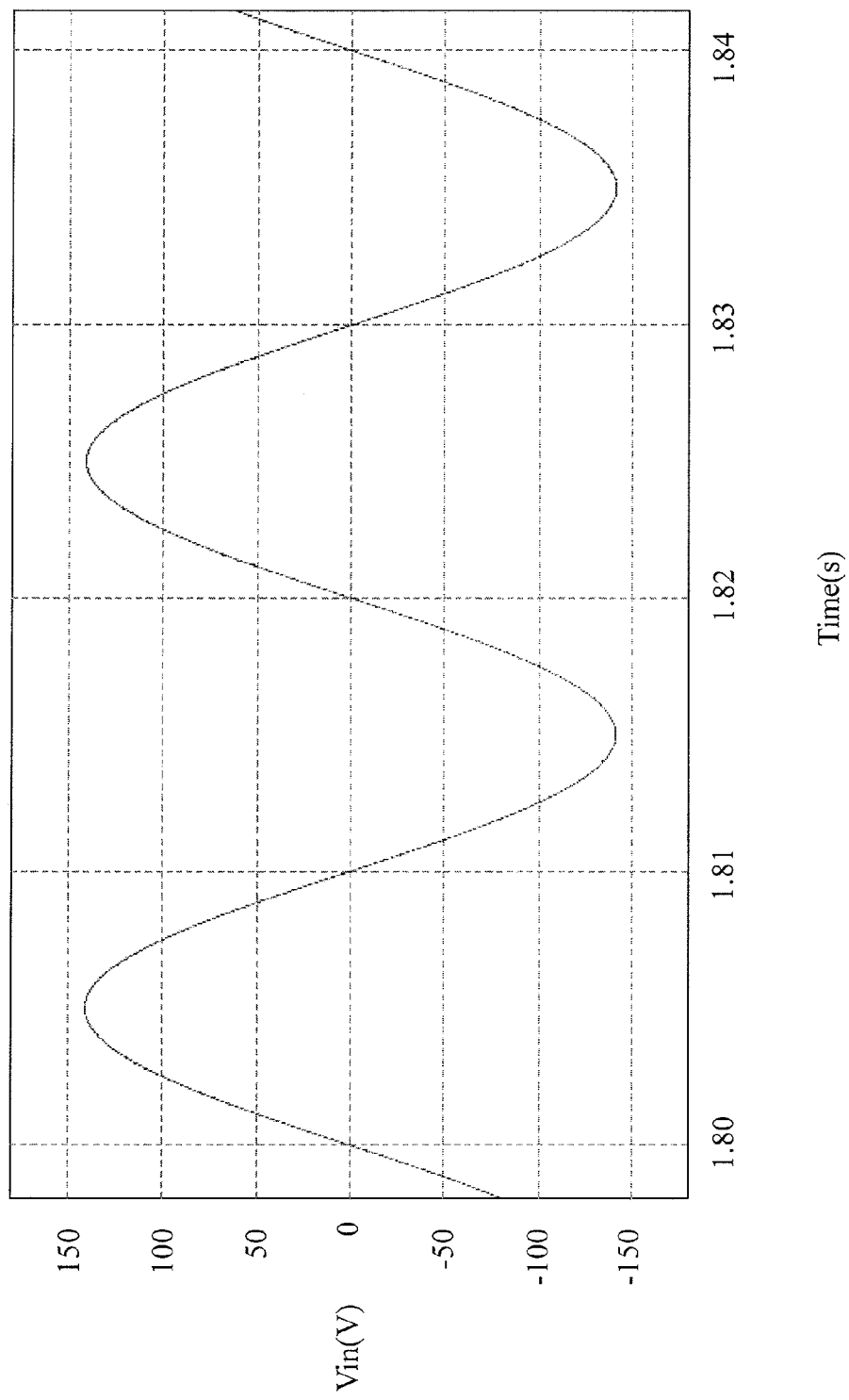
FIG. 23 is a diagram showing input voltage.
Figure 24:
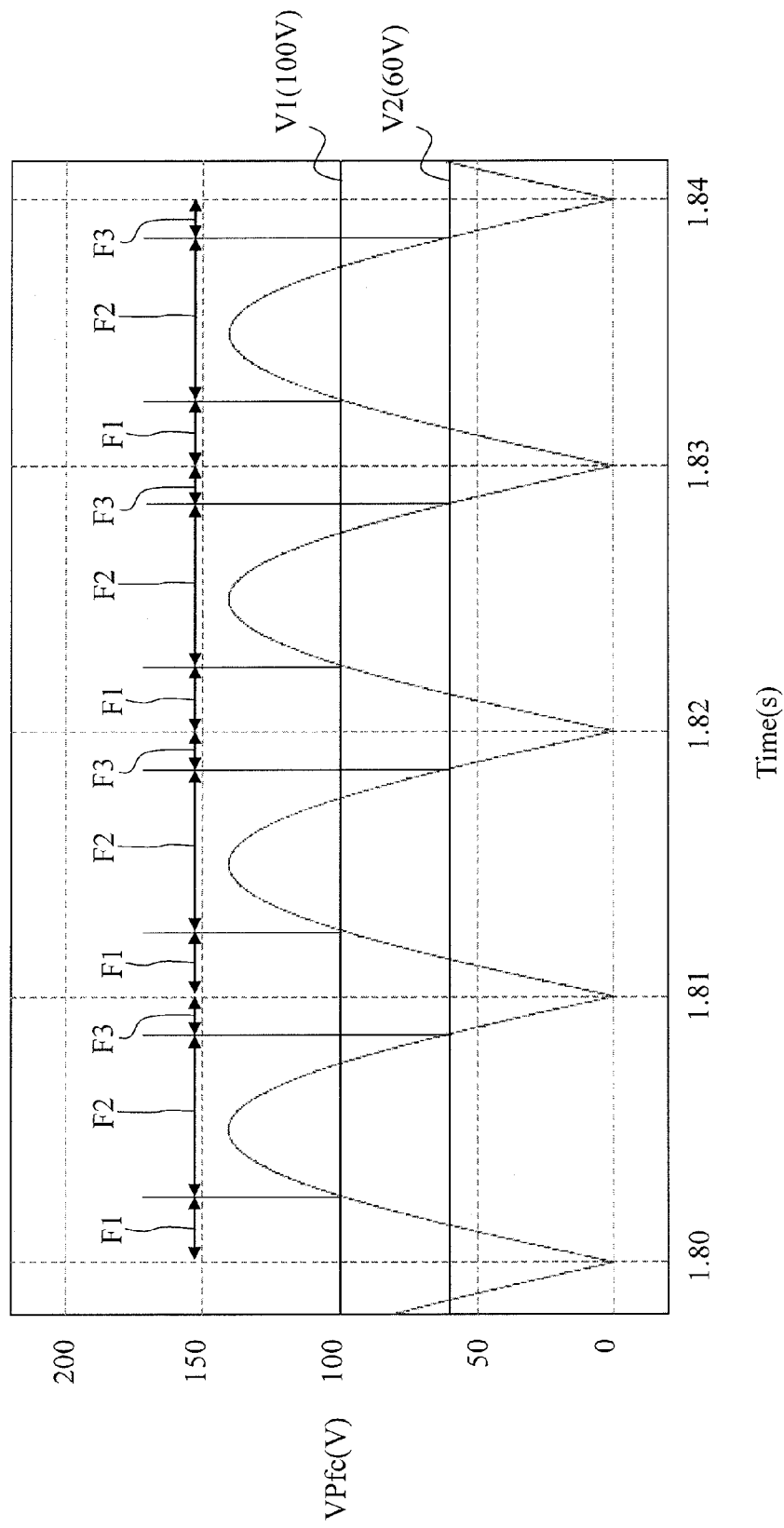
FIG. 24 is a diagram showing rectification voltage.
Figure 25:
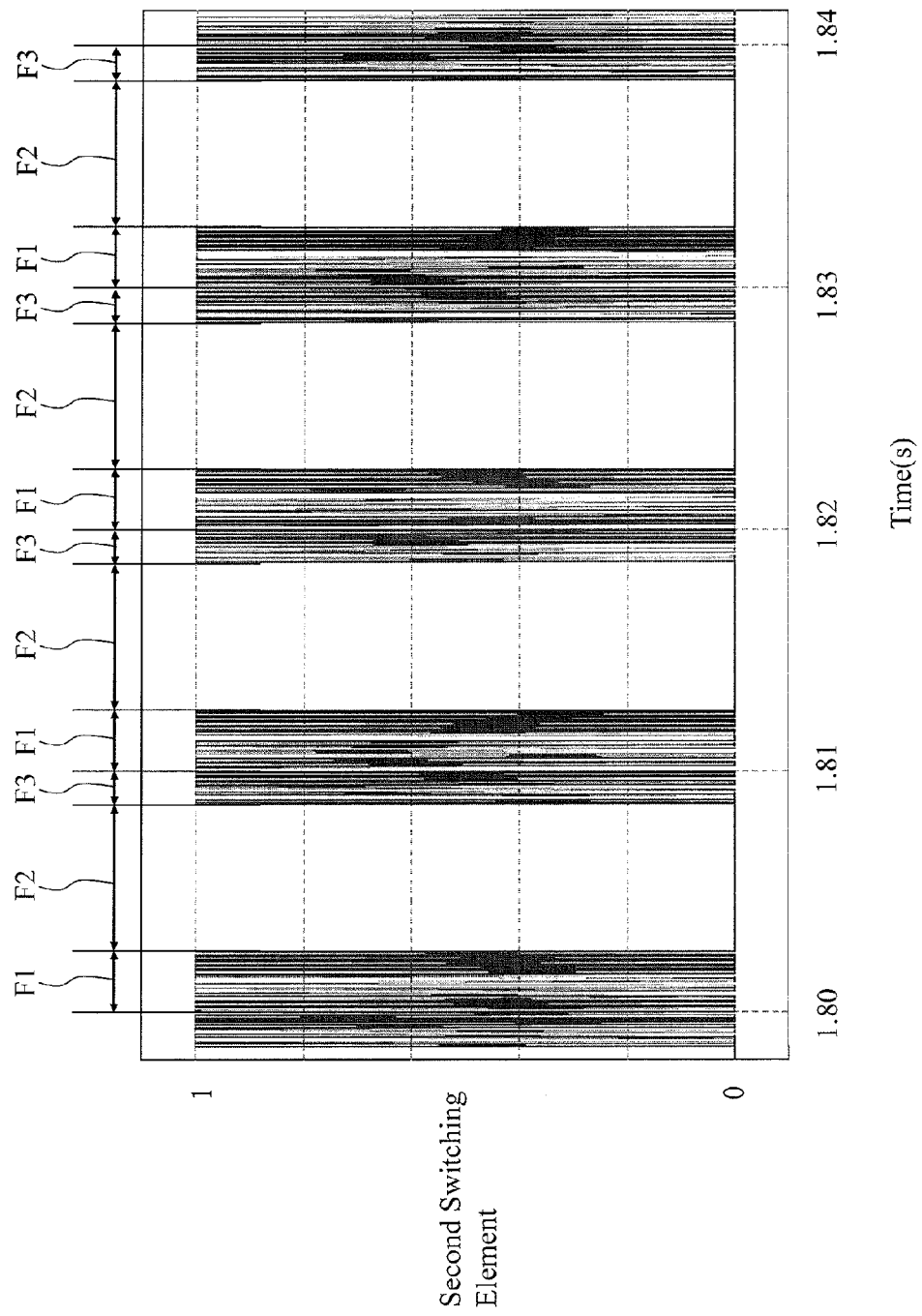
FIG. 25 is a control signal input to the gate of a second switching element included in the power supply circuit shown in FIG. 15.
Figure 26:
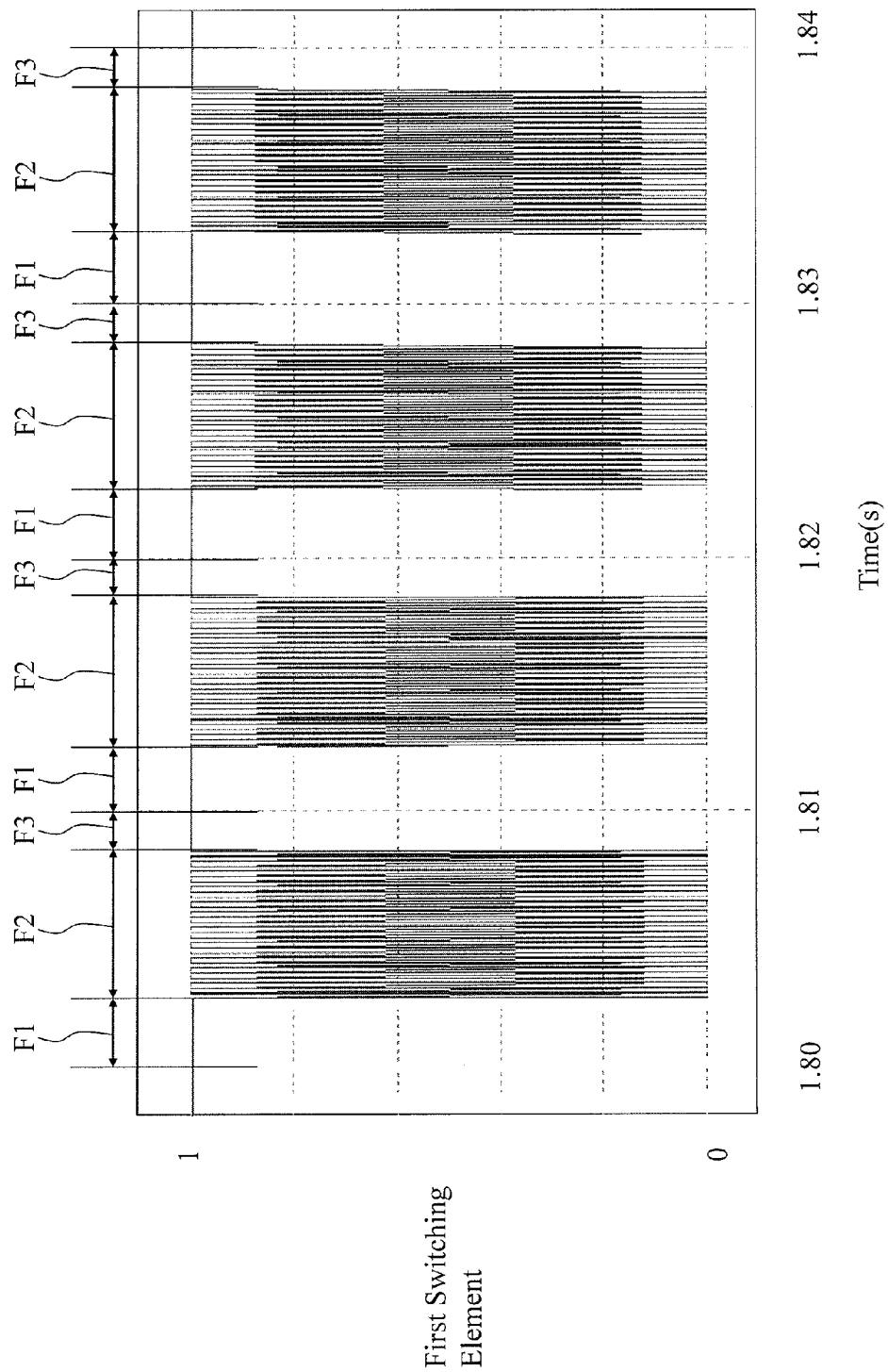
FIG. 26 is a control signal input to the gate of a first switching element included in the power supply circuit shown in FIG. 15.
Figure 27:
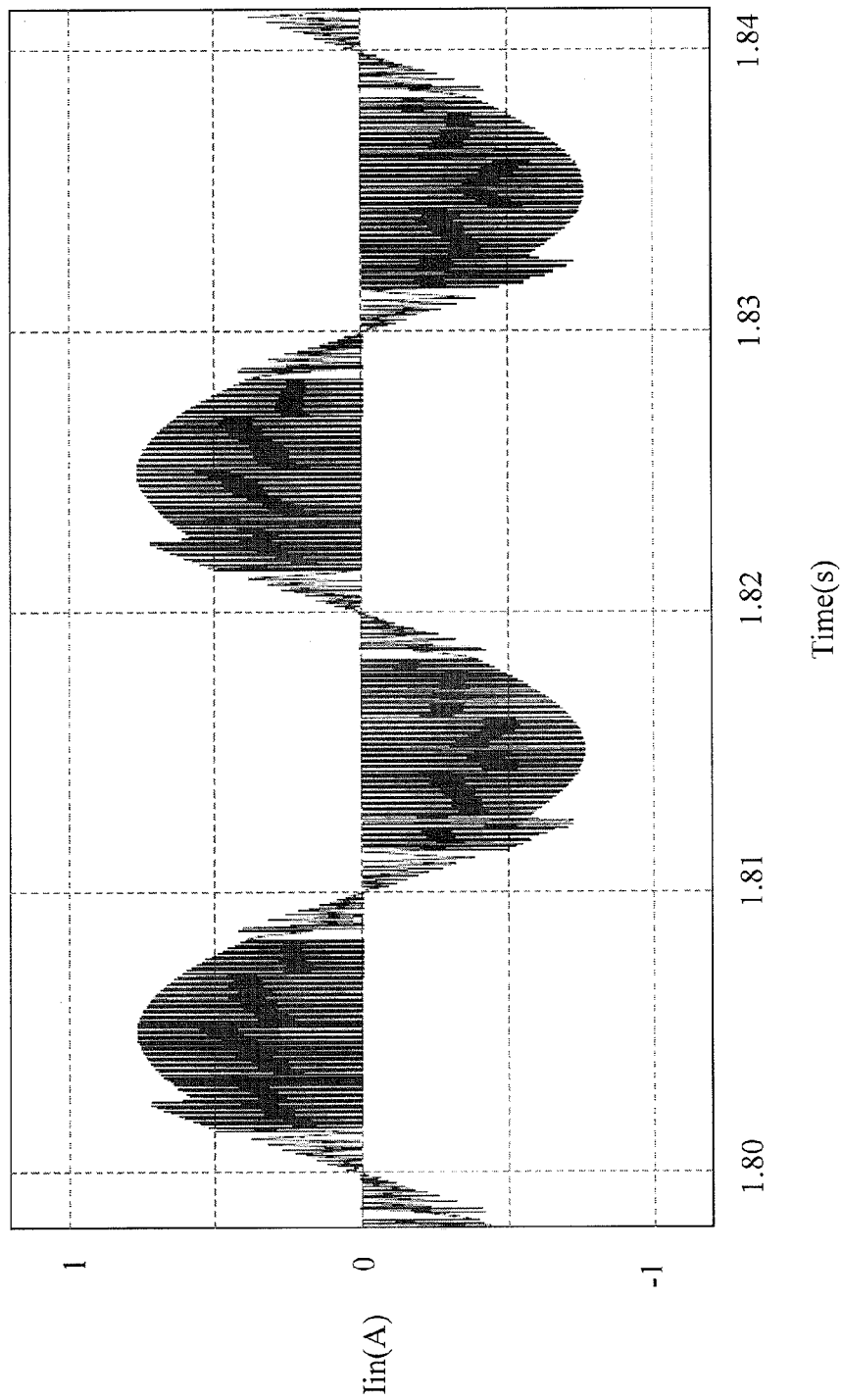
FIG. 27 is a diagram showing input electrical current.
Figure 28:
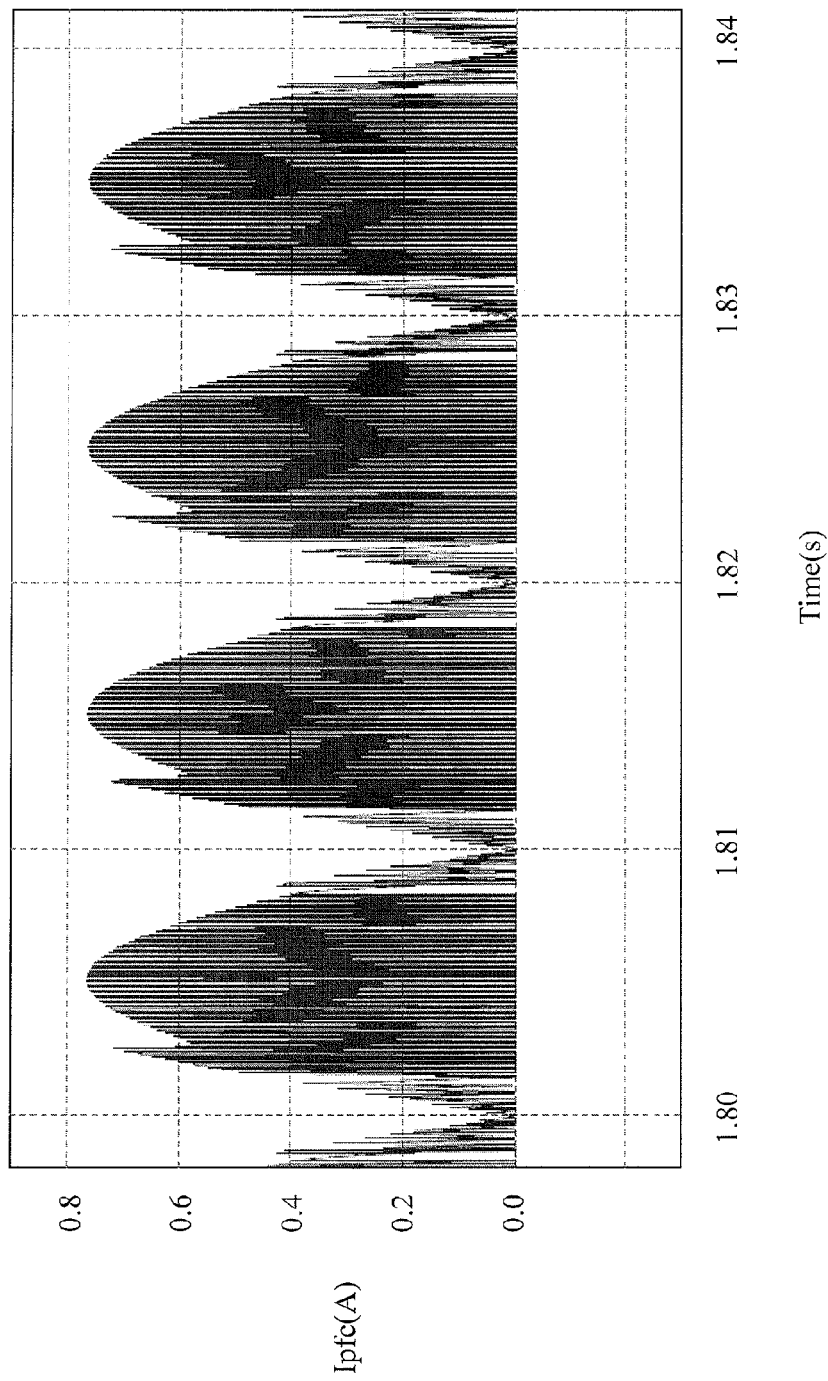
FIG. 28 is a diagram showing rectified electrical current.
Figure 29:
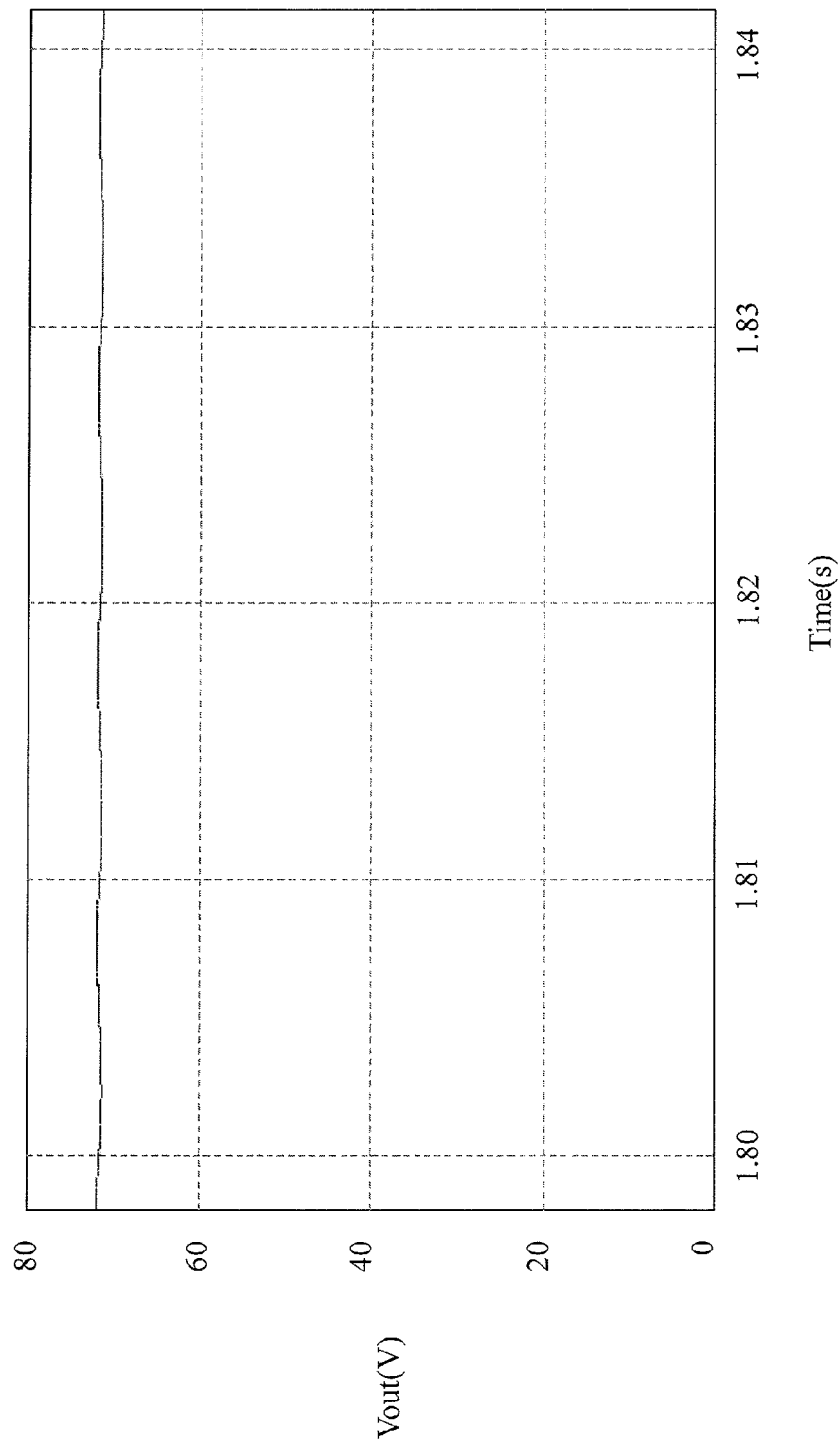
FIG. 29 is a diagram showing output voltage.

The second example is the same as the first example, except that the control method is different, and portions thereof that are substantially identical are assigned like reference symbols. An example of a step-up operation of the power supply device Ps shown in FIG. 15 will be described with reference to the drawings. FIG. 23 is a diagram showing input voltage; FIG. 24 is a diagram showing rectification voltage; FIG. 25 is a control signal input to the gate of a second switching element included in the power supply circuit shown in FIG. 15; FIG. 26 is a control signal input to the gate of a first switching element included in the power supply circuit shown in FIG. 15; FIG. 27 is a diagram showing input electrical current; FIG. 28 is a diagram showing rectified electrical current; and FIG. 29 is a diagram showing output voltage. In FIGS. 25 and 26, on the vertical axis, "1" indicates High level, and "0" indicates Low level.

The control circuit Cont acquires the rectification voltage Vpfc from the rectification voltage detector Svp. During an interval (the interval of the first region) in which the rectification voltage Vpfc changes from 0 V to 100 V (corresponding to the first voltage V1), the control circuit Cont, while inputting a High level signal to the gate of the first switching element Tr1, inputs to the gate of the second switching element Tr2 a signal that toggles between High level and Low level for a short time period (switching signal, see FIG. 25).

With the first switching element Tr1 on, the second switching element Tr2 is switched, and therefore the power supply circuit A performs a step-up operation.

When the rectification voltage Vpfc rises and exceeds 100 V (the first voltage V1), the control circuit Cont, while inputting a Low level signal to the gate of the second switching element Tr2, inputs a switching signal to the gate of the first switching element Tr1 (see FIG. 25). In so doing, with the second switching element Tr2 off, the first switching element Tr1 is switched, and therefore the power supply circuit A performs a step-down operation. The power supply circuit A performs the step-down operation during an interval until the rectification voltage Vpfc reaches 60 V (the interval of the second region).

Then, during an interval (the interval of the third region) in which the rectification voltage Vpfc changes from 60 V to 0 V, the control circuit Cont, while inputting a High level signal to the gate of the first switching element Tr1, inputs a signal that toggles between High level and Low level for a short time period (switching signal, see FIG. 25) to the gate of the second switching element Tr2.

By stepping up or stepping down the rectification voltage Vpfc in the power supply circuit A in this way and smoothing it with the capacitor C1, a substantially constant output voltage can be output, as shown in FIG. 29. Moreover, by stepping up the rectification voltage Vpfc when small and stepping down when it is large, situations in which electrical current has difficulty flowing, or in which a large electrical current flows within a short period, are suppressed. In so doing, the input electrical current Iin from the alternating current power supply Pa and the rectified electrical current Ipfc from the rectification circuit Rc take on the waveforms shown respectively in FIGS. 27 and 28. The input electrical current Iin waveform shown in FIG. 27 has a shape similar to that of the input voltage Vin, and the waveform of the rectified electrical current Ipfc shown in FIG. 28 has a shape similar to that of the rectification voltage Vpfc, respectively, and it will be appreciated that that the power supply circuit A is a PFC circuit, and that the power factor can be improved.

Third Example

Figure 30:
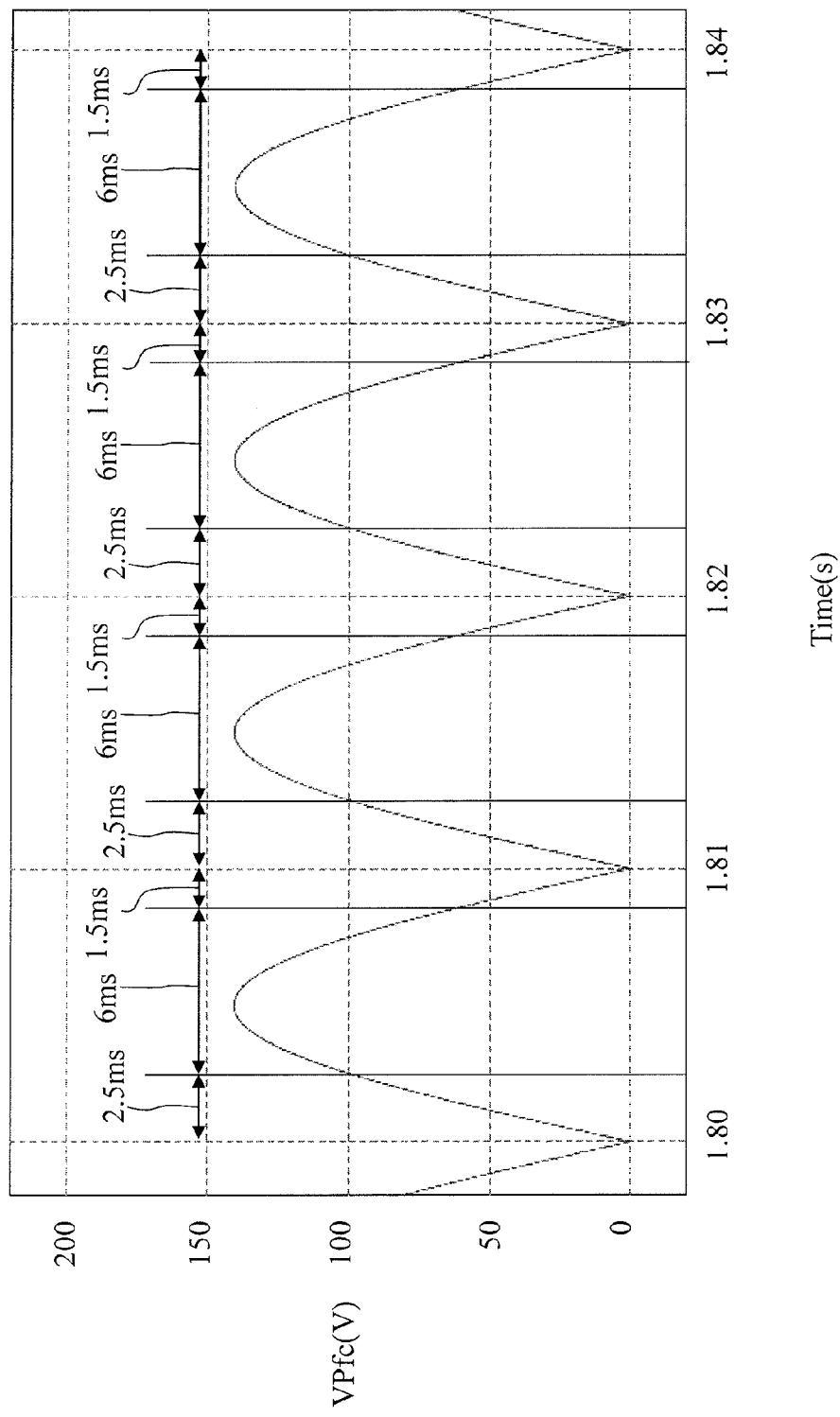
FIG. 30 is a diagram showing rectification voltage.
Figure 31:
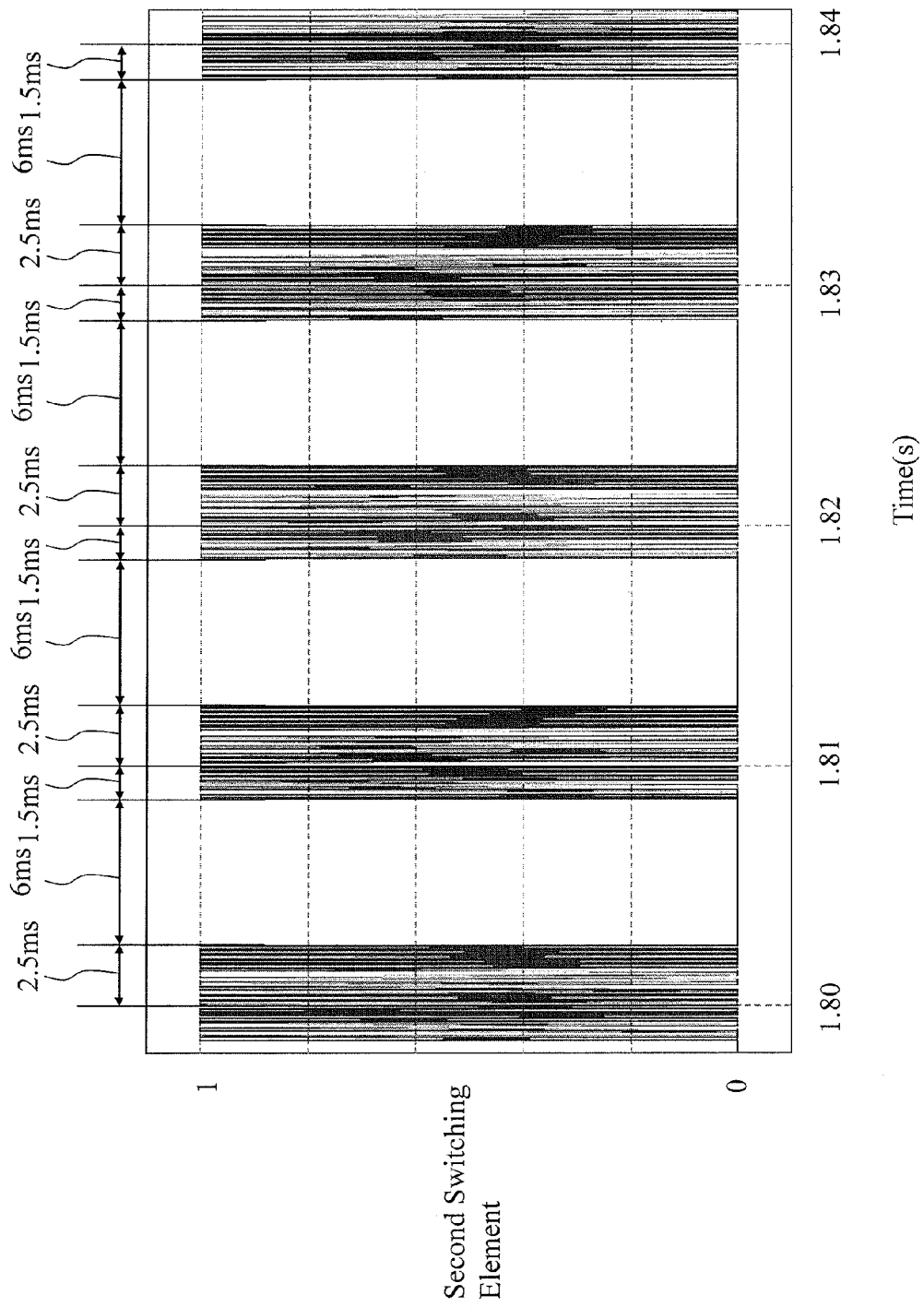
FIG. 31 is a control signal input to the gate of a second switching element included in the power supply circuit shown in FIG. 15.
Figure 32:
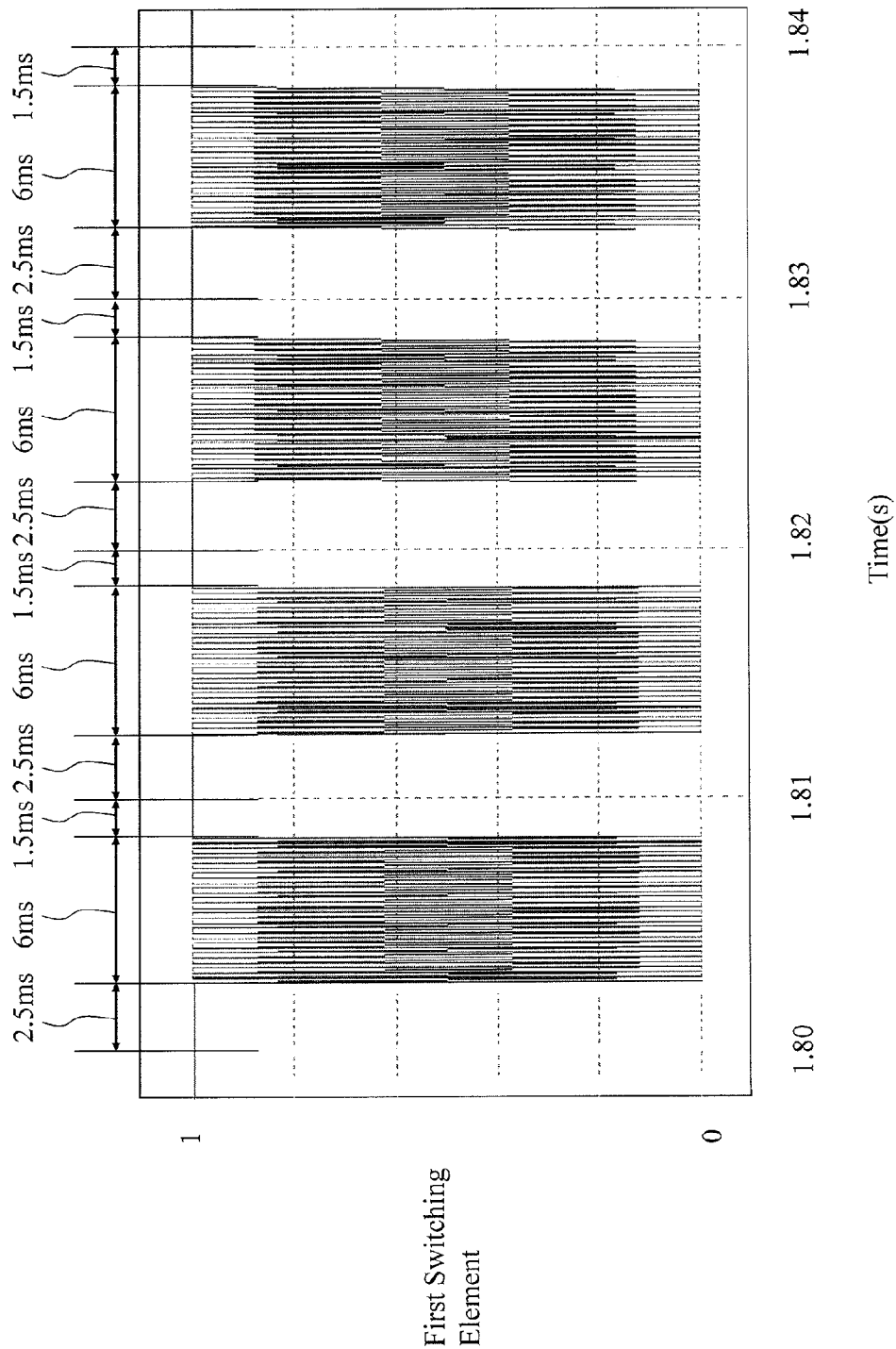
FIG. 32 is a control signal input to the gate of a first switching element included in the power supply circuit shown in FIG. 15.
Figure 33:
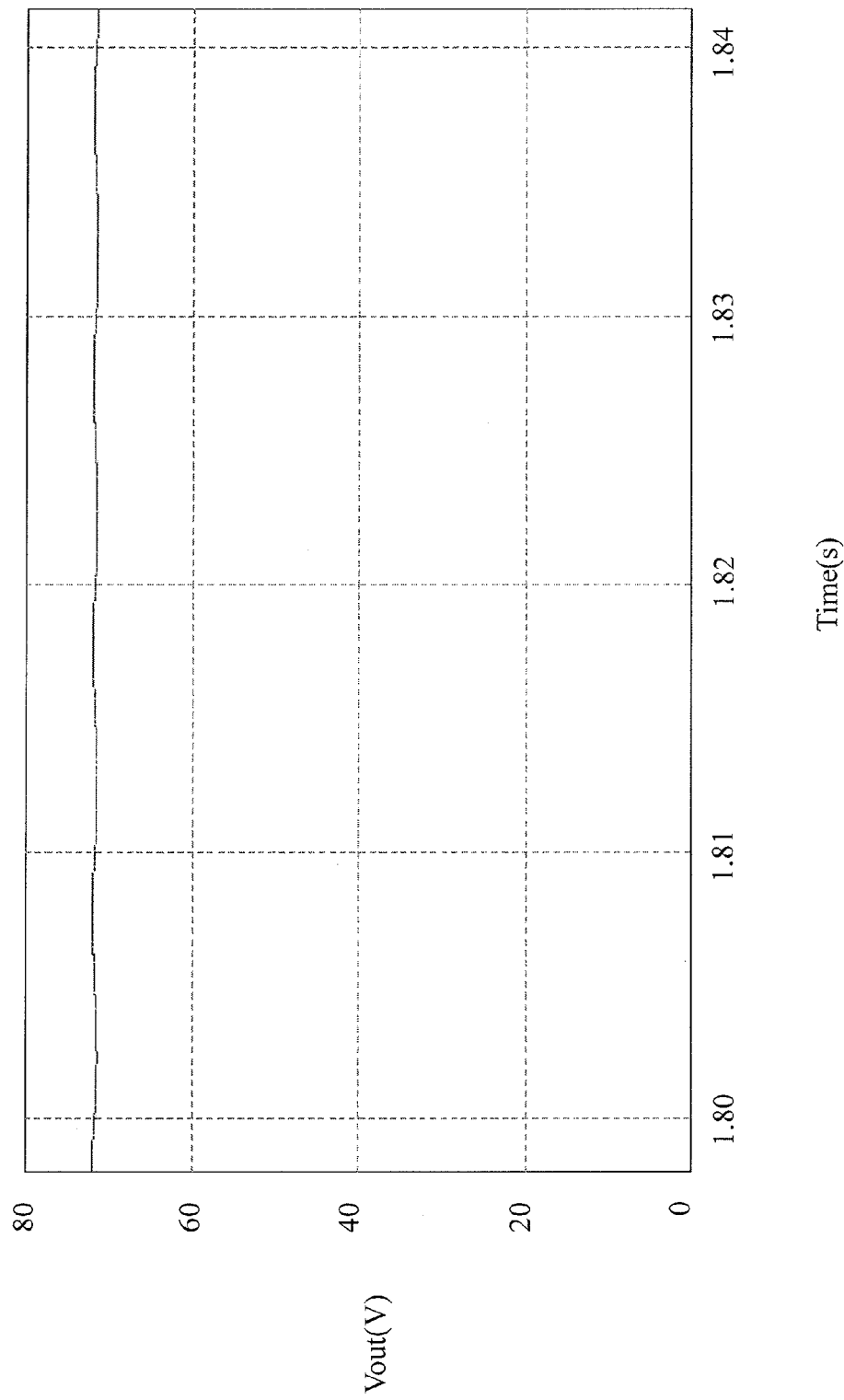
FIG. 33 is a diagram showing output voltage.

The third example is the same as the first example, except that the control method is different, and portions thereof that are substantially identical are assigned like reference symbols. FIG. 30 is a diagram showing rectification voltage; FIG. 31 is a control signal input to the gate of a second switching element included in the power supply circuit shown in FIG. 15; FIG. 32 is a control signal input to the gate of a first switching element included in the power supply circuit shown in FIG. 15; and FIG. 33 is a diagram showing output voltage.

In the third example, an alternating current voltage (as shown in FIG. 23) the same as that of the first example, having frequency f of 50 Hz, and effective voltage Vrms of 100 V (peak value approximately 140 V) is input to the rectification circuit Rc. Full-wave rectification of this alternating current voltage by the rectification circuit Rc gives a positive voltage pulse wave like that shown in FIG. 23.

The control circuit Cont acquires the rectification voltage Vpfc from the rectification voltage detector Svp. As shown in FIG. 30, during a 2.5 ms interval (the interval of the first region) in which the rectification voltage Vpfc begins to rise from 0 V, the control circuit Cont, while inputting a High level signal to the gate of the first switching element Tr1, inputs to the gate of the second switching element Tr2 a signal that toggles between High level and Low level for a short time period (see FIG. 31).

During an interval (the interval of the second region) from just after the 2.5 ms in which the rectification voltage Vpfc begins to rise from 0 V to the 8.5 ms point, the control circuit Cont, while inputting a Low level signal to the gate of the second switching element Tr2, inputs a switching signal to the gate of the first switching element Tr1 (see FIG. 32). In so doing, with the second switching element Tr2 off, the first switching element Tr1 is switched, and therefore the power supply circuit A performs a step-down operation.

During an interval (the interval of the third region) extending from just after the 8.5 ms in which the rectification voltage Vpfc begins to rise from 0 V to the 10 ms point, the control circuit Cont, while inputting a High level signal to the gate of the first switching element Tr1, inputs a signal that toggles between High level and Low level for a short time period (switching signal, see FIGS. 31 and 32) to the gate of the second switching element Tr2.

By controlling the power supply circuit A in this way, direct current voltage of approximately 72 V is output as shown in FIG. 33.

Figure 34:
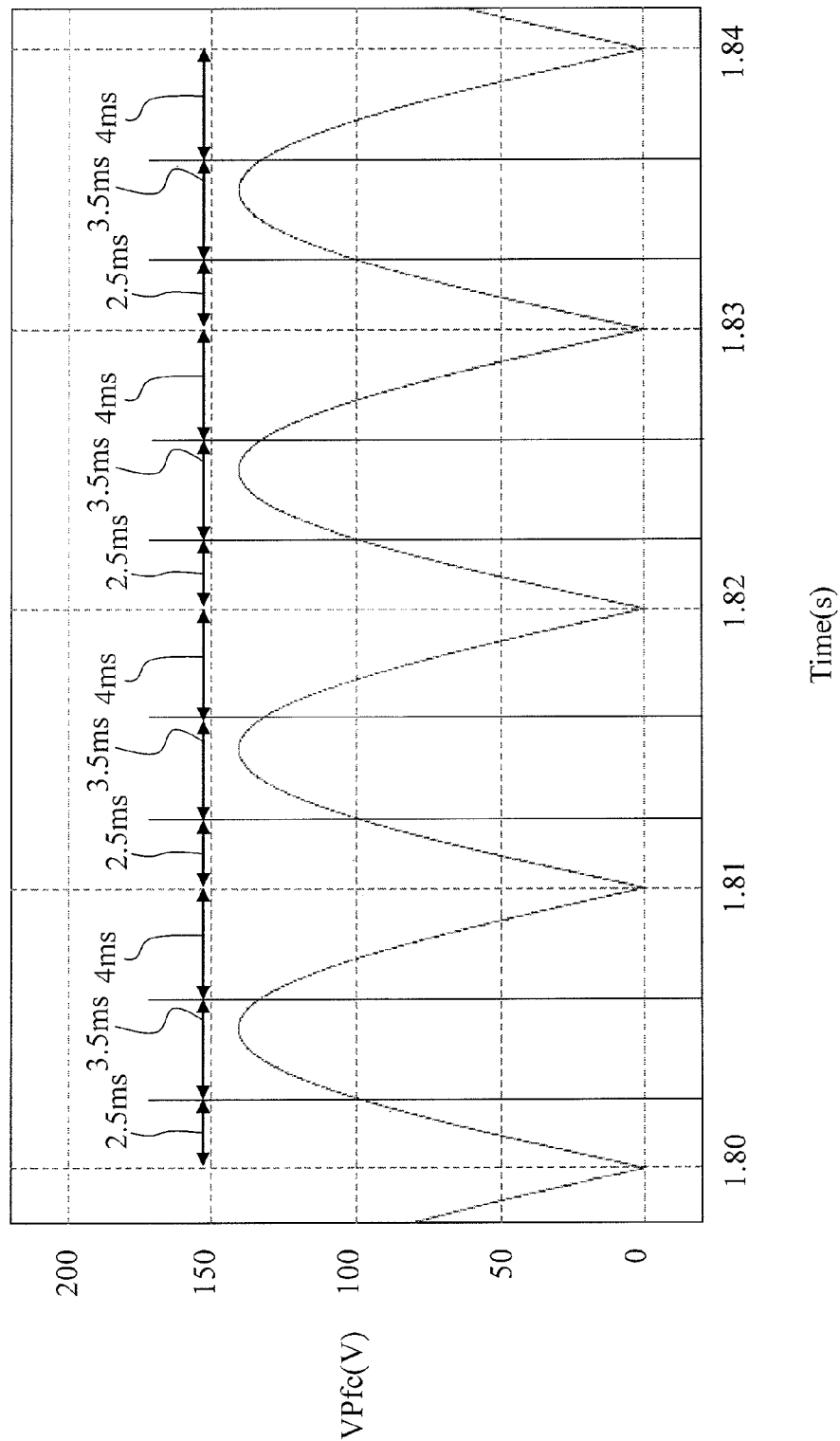
FIG. 34 is a diagram showing rectification voltage when the timing for toggling between step-up operation and step-down operation has been modified.
Figure 35:
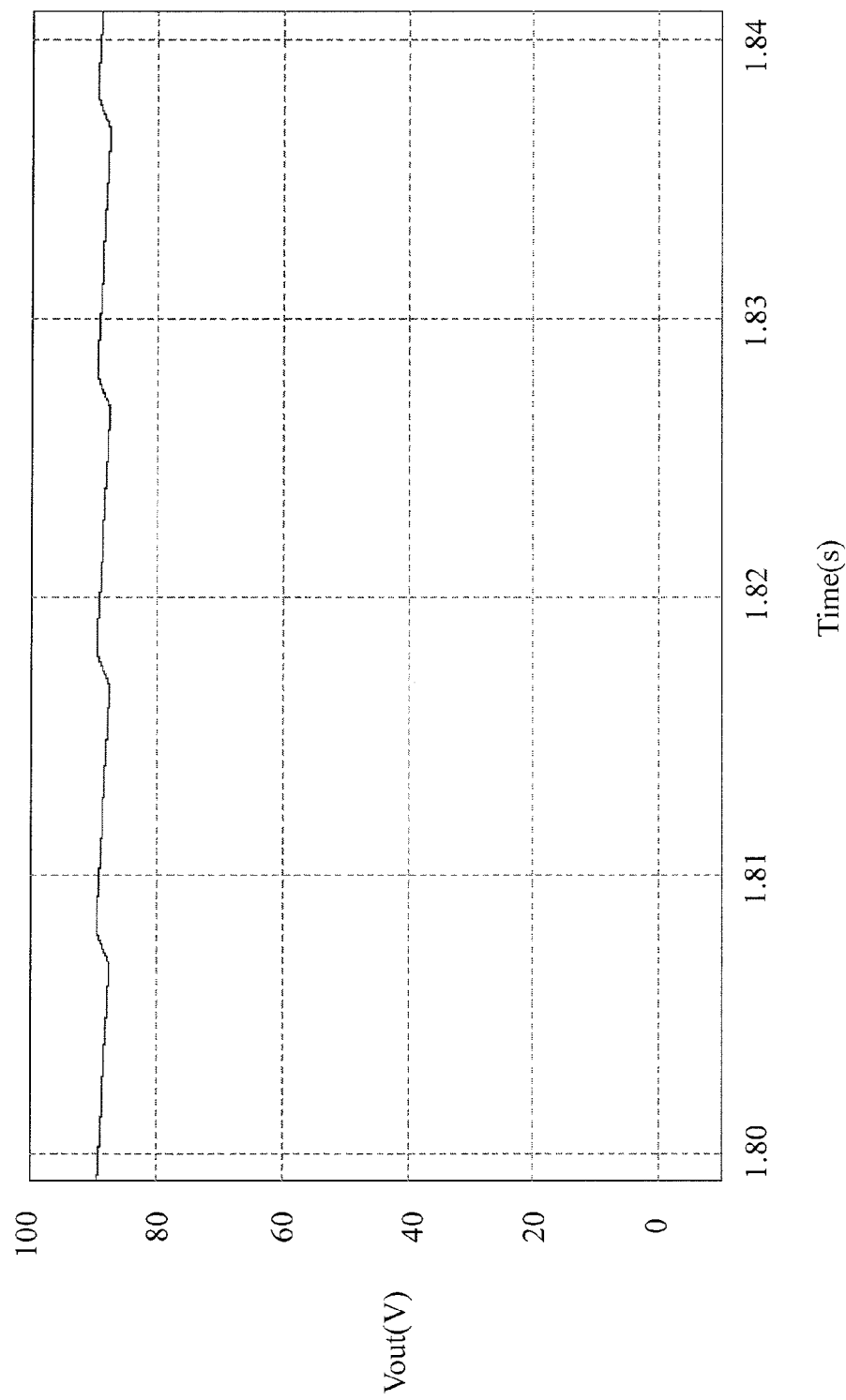
FIG. 35 is a diagram showing output voltage.

FIG. 34 is a diagram showing rectification voltage when the timing for toggling between a step-up operation and a step-down operation has been modified; and FIG. 35 is a diagram showing output voltage. As shown in FIG. 34, the second region is from 2.5 ms to 6.0 ms (a 3.5 ms interval); during this interval, the control circuit Cont, while inputting a Low level signal to the gate of the second switching element Tr2, inputs a switching signal to the gate of the first switching element Tr1. In so doing, with the second switching element Tr2 off, the first switching element Tr1 is switched, and therefore the power supply circuit A performs a step-down operation.

The third region is from 6.0 ms to 10 ms (4 ms), and during this interval the control circuit Cont, while inputting a High level signal to the gate of the first switching element Tr1, inputs a signal that toggles between High level and Low level for a short time period to the gate of the second switching element Tr2.

By controlling the power supply circuit A in this way, direct current voltage of approximately 90 V is output as shown in FIG. 35.

As a result of the above, by fixing the timing for toggling between the first region and the second region, while varying the timing for toggling between the second region and the third region, the output voltage can be modified. In the present example, the timing for toggling between the first region and the second region is fixed; however, it would be acceptable in analogous fashion to modify the timing for toggling between the first region and the second region, and to fix the timing for toggling between the second region and the third region.

In a case in which the alternating current waveform from the alternating current power supply Pa is always constant, it would be possible to provide a look-up table for the first region, the second region, and the third region, according to output voltage, and to read out from the table according to the desired output voltage.

Fourth Example

Figure 36:
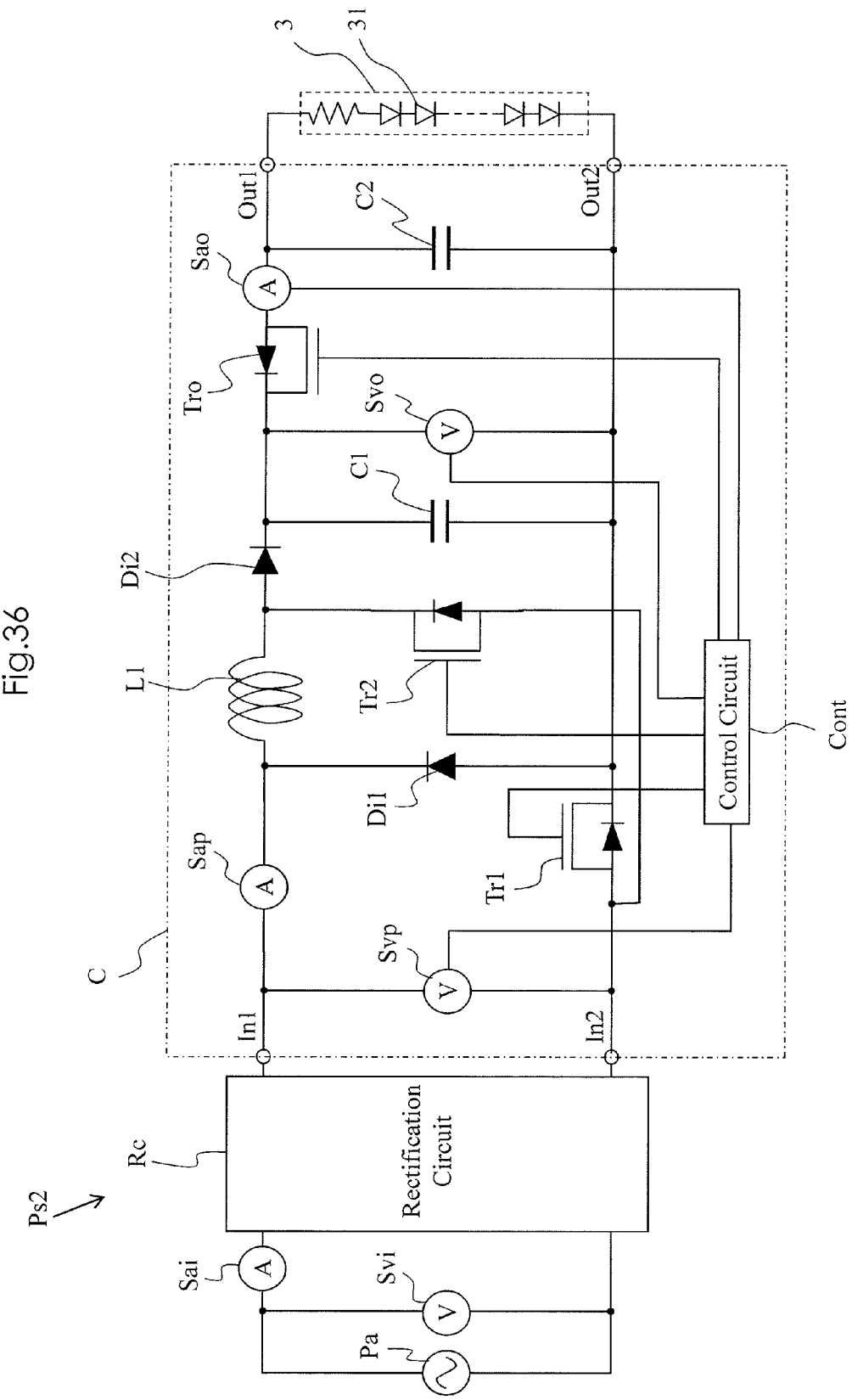
FIG. 36 is a diagram of a power supply device employing the power supply circuit shown in FIG. 9.

Another example employing the power supply circuit according to the present invention such as those shown previously will be described with reference to the drawings. FIG. 36 is a diagram of a power supply device employing the power supply circuit shown in FIG. 9. A power supply circuit C according to the present invention is a circuit that converts AC to DC for output.

A power supply device Ps2 has the same configuration as the power supply device Ps shown in FIG. 15, except for employing the power supply circuit C, and including an output electrical current detector Sao for detecting output electrical current Aout; portions that are substantially identical are assigned like reference symbols, omitting detailed description of these identical portions.

The control circuit Cont detects the output electrical current detected by the output electrical current detector Sao, as well as toggling on and off the anti-flicker switching element Tro based on the output electrical current. To describe in more detail, the anti-flicker switching element Tro is controlled with reference to the electrical current detected by the output electrical current detector Sao, doing so in such a way that an average electrical current is constant within a very short time period.

A case in which the anti-flicker switching element Tro is operated at 10 kHz will be described. For example, when the electrical current value detected by the output electrical current detector Sao is 10 A, and the average value of the electrical current supplied to the LED lamp 3 is 1 A, the control circuit Cont drives the anti-flicker switching element Tro at on duty of 0.1 (an on time of 0.1 ms and an off time of 0.9 ms for the anti-flicker switching element Tro).

At this time, the anti-flicker capacitor C2 charges for an 0.1 ms interval, and discharges for a 0.9 ms interval, whereby the LED lamp 3 is supplied with electrical current, and the LED 31 light up. Due to lighting up of the LED 31, the anti-flicker capacitor C2 discharges, the electrical current value changes, and the luminance of the LED 31 drops (in a case in which the capacity of C2 is small, discharge occurs within 0.9 ms, and electrical current ceases to be supplied to the LED lamp 3). At this time, the frequency is 10 kHz and is not noticeable to the human eye, making it possible to suppress flicker of the LED 31.

Analogously, when the output electrical current detector Sao detects 2 A, the anti-flicker switching element Tro is driven at on duty of 0.5, and electrical current averaging 1 A is supplied to the LED lamp 3. In this case as well, the LED 31 repeatedly go on and off at high speed, and flicker of the LED 31 is not noticeable to the human eye.

In the example shown above, an example in which the anti-flicker switching element Tro is driven at 10 kHz is described; however, there is no limitation thereto, and operation at 200 Hz or above, which is not possible for the human eye to notice, is acceptable as well. In consideration of ease of control, an upper limit of about 1 MHz is preferred.

The first switching element Tr1 and the second switching element Tr2 are controlled in such a manner that the output electrical current of the power supply circuit is higher than the average value of the electrical current supplied to the LED lamp 3. The reason is that, for example, in a case in which the output electrical current of the power supply circuit is the same as the average value of the electrical current supplied to the LED lamp 3, the on duty of the anti-flicker switching element Tro is 1, specifically, the anti-flicker switching element Tro is normally-on, and the anti-flicker effect declines.

As a result of the preceding, by utilizing the power supply circuit according to the present invention, switching control can be simplified, and the configuration of the control circuit can be simplified. Moreover, there is no need for step-up by a PFC circuit as in a conventional circuit, and the drop in efficiency during voltage conversion can be suppressed to a commensurate extent. Furthermore, when driving two switching elements, synchronous switching is unnecessary, and it is therefore possible to minimize losses due to synchronous switching of the switching elements, and to suppress the drop in efficiency during voltage conversion.

Fifth Example

Figure 37:
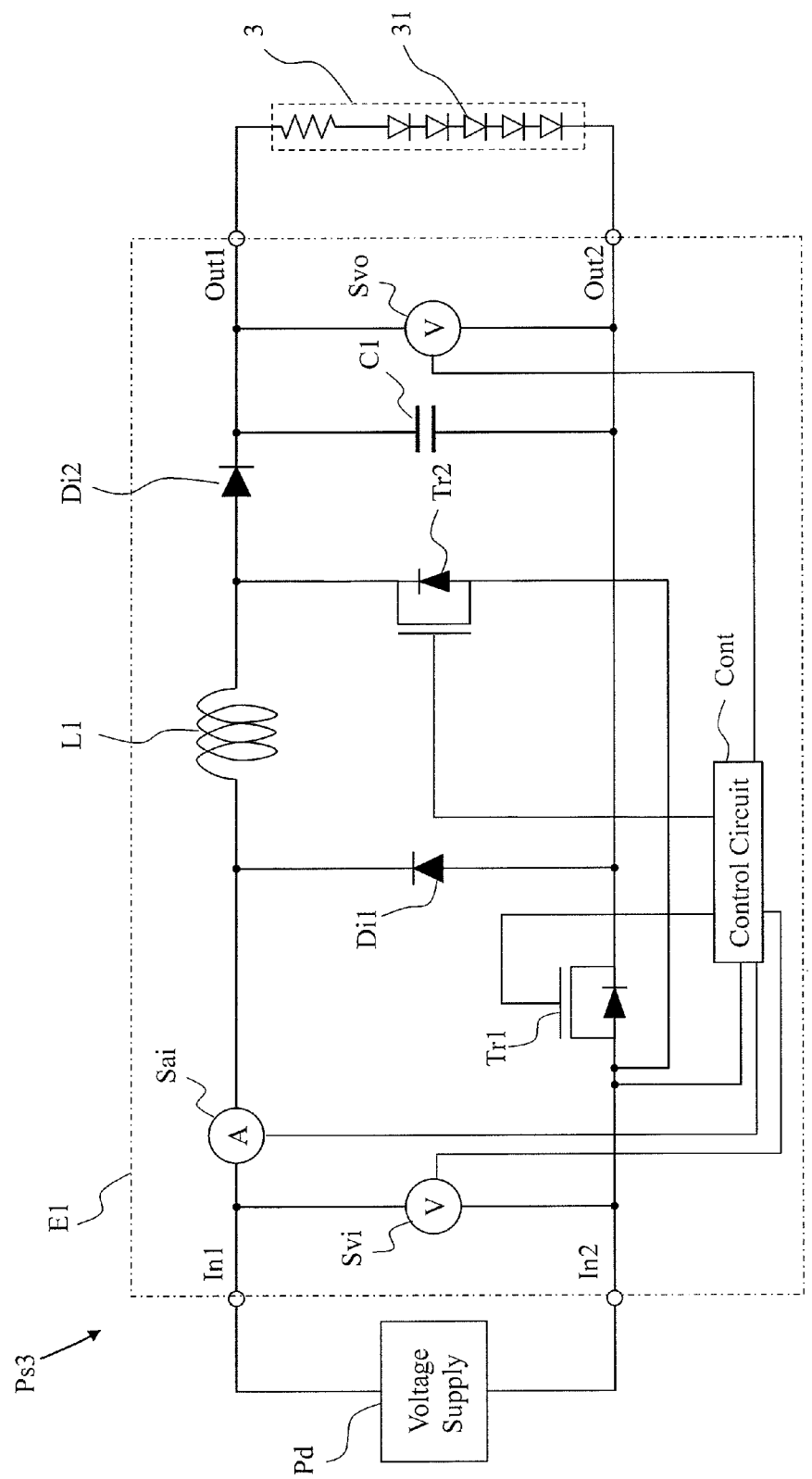
FIG. 37 is a diagram of a power supply device employing the power supply circuit according to the present invention.

In the first to fourth examples discussed above, the power supply circuit of the present invention was employed for conversion from alternating current to direct current; however, employment for conversion from direct current to direct current is possible as well. FIG. 37 is a diagram of a power supply device employing the power supply circuit according to the present invention. As shown in FIG. 37, a power supply device Ps3 is provided with a direct current power supply Pd;

a power supply circuit E1 constituted such that the control circuit Cont and the second input terminal In2 are grounded; an input voltage detector Svi for detecting voltage of the direct current power supply Pd (input voltage Vi); an input electrical current detector Sai for detecting electrical current flowing to the first input terminal In1 (input electrical current Ii); and an output voltage detector Svo for detecting output voltage Vo of the power supply circuit E1. The power supply circuit E1 has the same configuration as the power supply circuit E shown in FIG. 14, except that the wiring that connects the source of the switching element Tr1 and the source of the switching element Tr2 is grounded.

Figure 38:
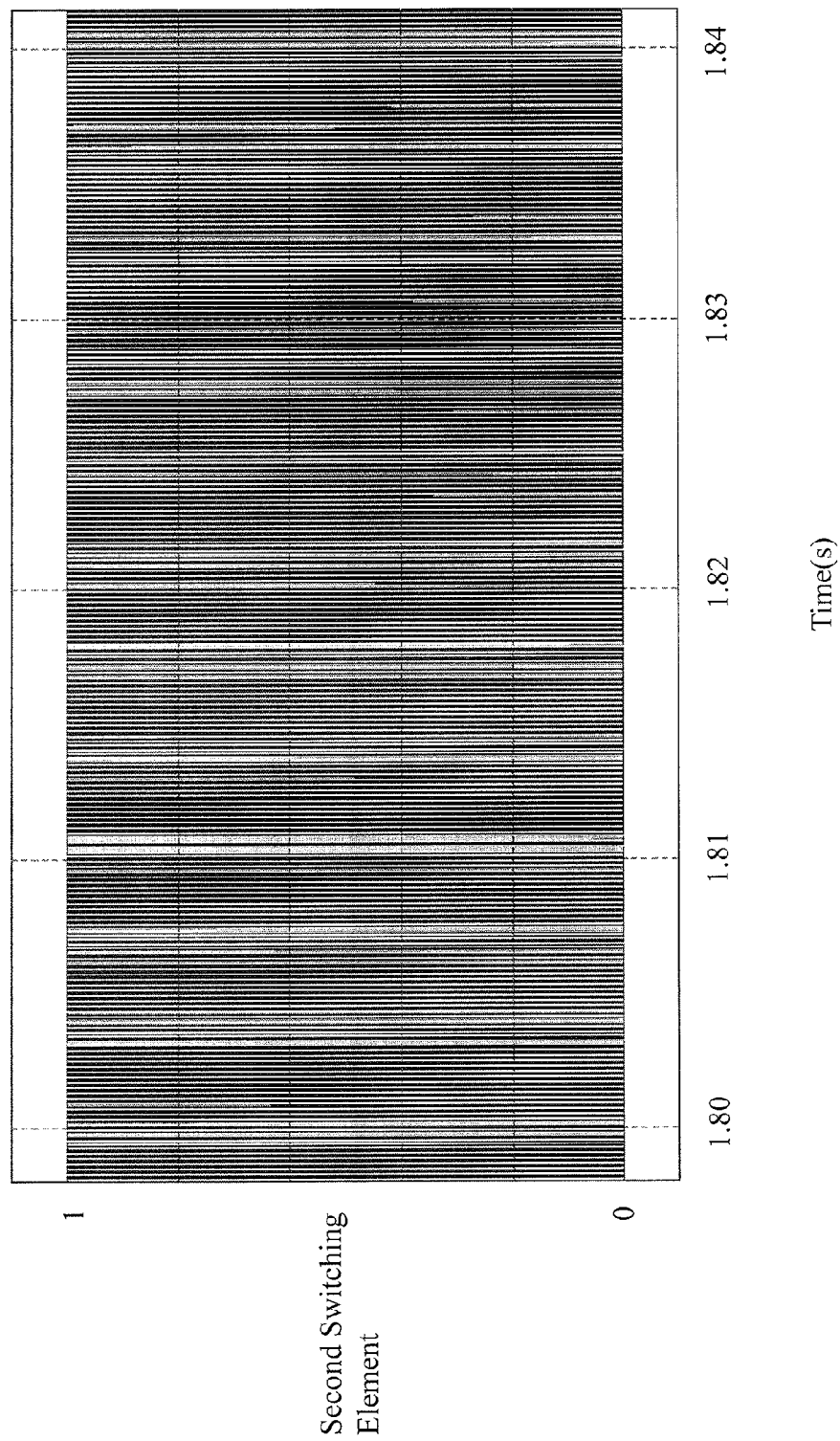
FIG. 38 is a control signal supplied to a second switching element when performing step-up operation.
Figure 39:
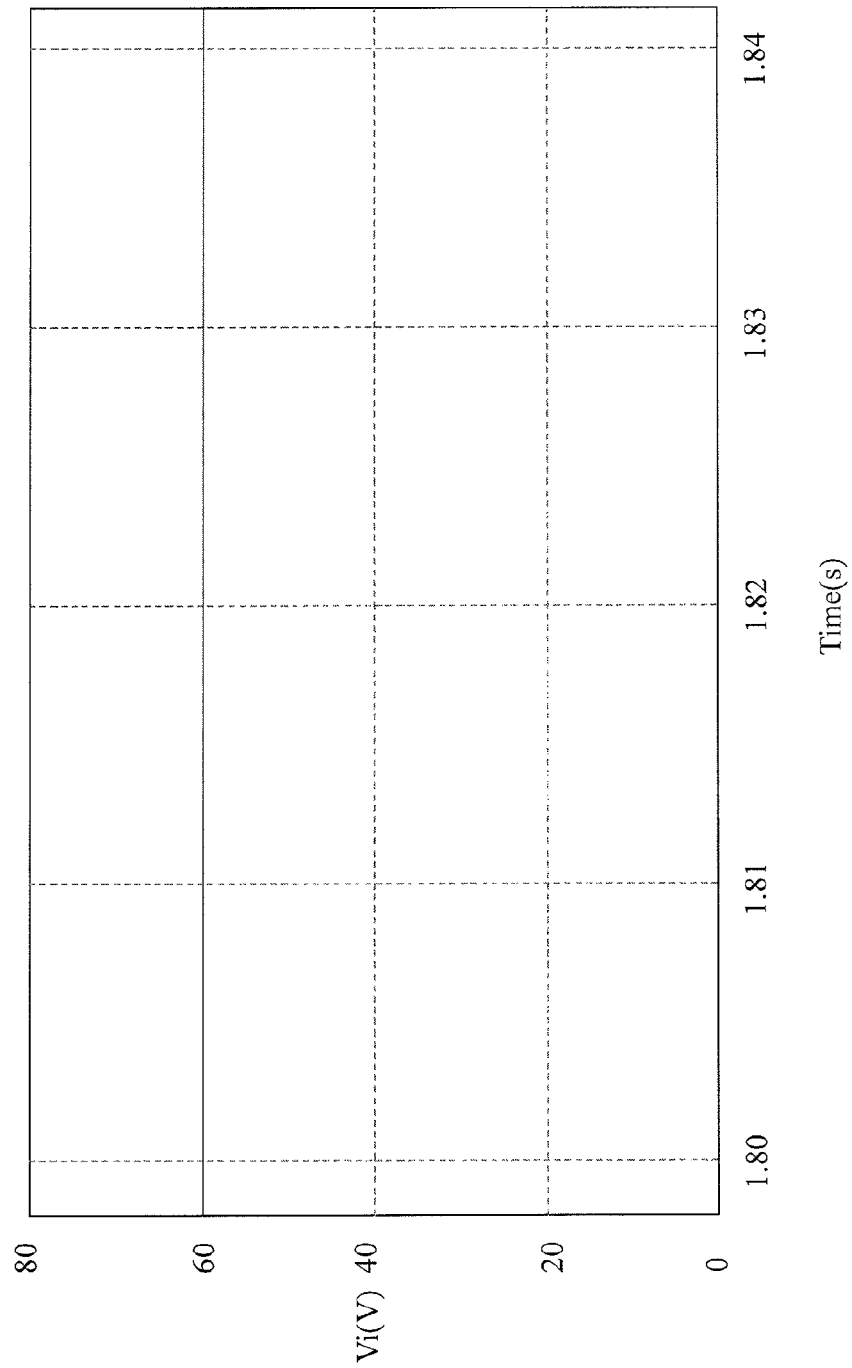
FIG. 39 is a diagram showing input voltage.
Figure 40:
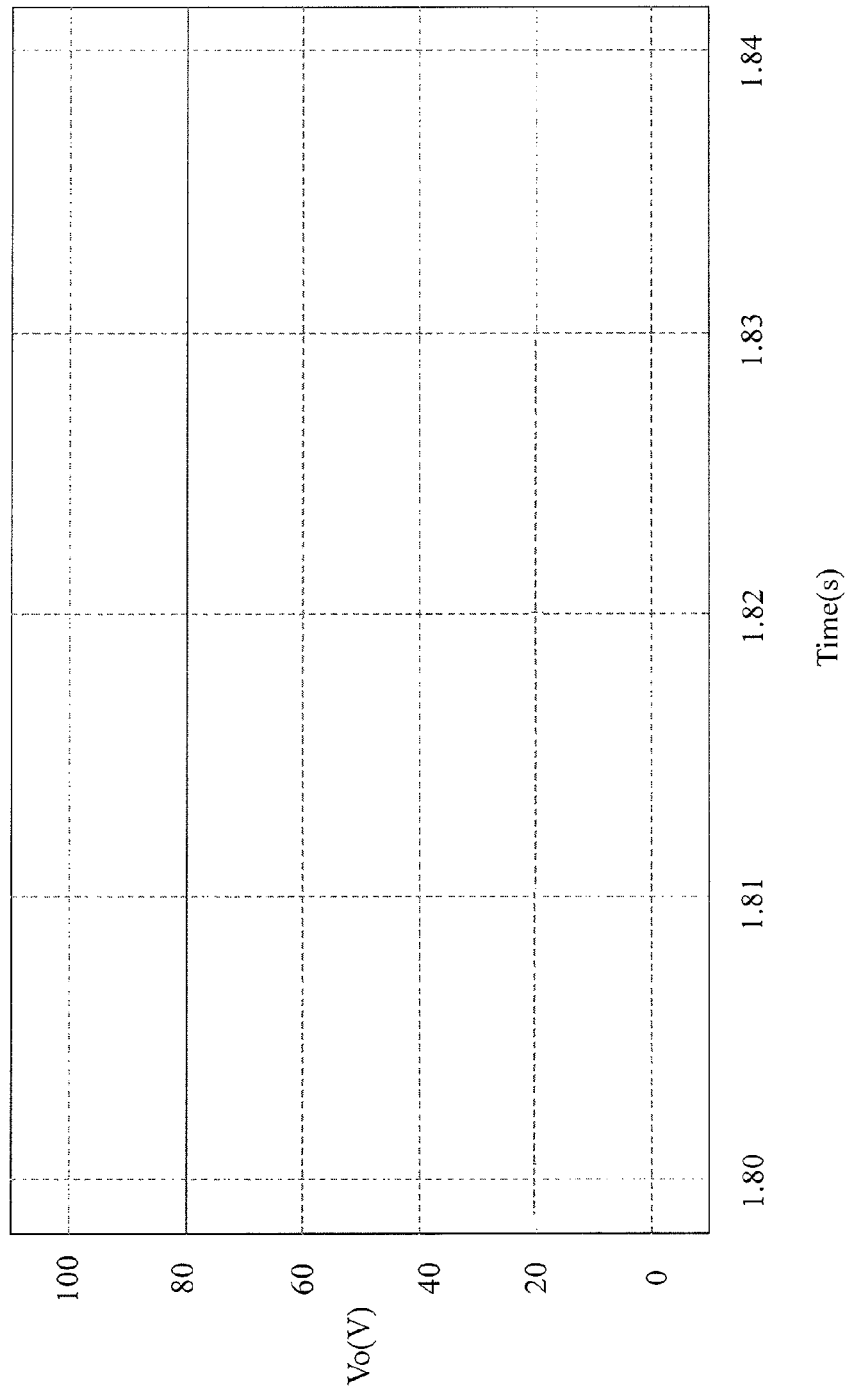
FIG. 40 is a diagram showing output voltage.
Figure 41:
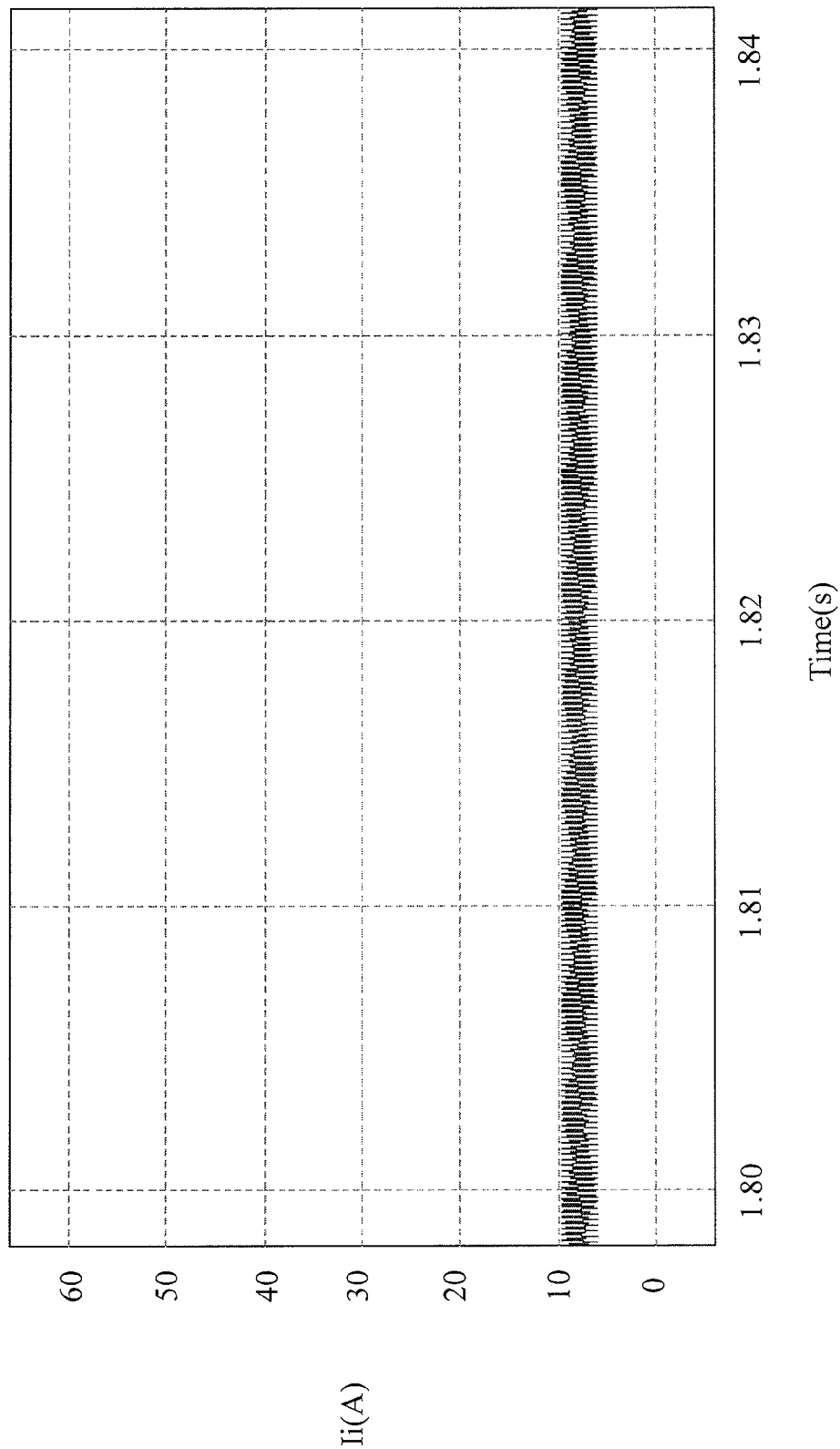
FIG. 41 is a diagram showing input electrical current.

An example of a step-up operation of the power supply device Ps3 shown in FIG. 37 will be described with reference to the drawings. FIG. 38 is a control signal supplied to a second switching element when performing a step-up operation; FIG. 39 is a diagram showing input voltage; FIG. 40 is a diagram showing output voltage; and FIG. 41 is a diagram showing input electrical current. In FIG. 38, on the vertical axis, "1" indicates High level, and "0" indicates Low level. Specifically, the graph in FIG. 38 shows a signal alternately toggling between High level and Low level within a short time period.

As shown in FIG. 39, the input voltage Vi is 60 V, and as shown in FIG. 40, the output voltage Vo is 80 V. Specifically, the power supply circuit E1 is operated as a step-up converter, and steps up the 60 V input voltage Vi to an 80 V output voltage Vo.

As mentioned above, in a case in which the power supply circuit E1 is prompted for a step-up operation, the control circuit Cont puts the first switching element Tr1 in the normally-on state and performs switching control of the second switching element Tr2. While omitted from the drawing, the control circuit Cont transmits a High level signal as a control signal to the gate of the first switching element Tr1. As shown in FIG. 38, the control circuit Cont transmits a 25%-on duty switching signal as a control signal to the gate of the second switching element Tr2. 25%-on duty means that the length of the time period for which the element is on in a predetermined time period is 25%, when the switching element is toggled on and off. That is, the proportion for which the switching signal shown in FIG. 38 is High level is 25%.

In this way, with the first switching element Tr1 in the normally-on state, the second switching element Tr2 is switched, whereby the input voltage Vi (60 V) can be stepped up to the output voltage Vo (80 V). The output voltage Vo is changed by modifying the on duty ratio. Moreover, as shown in FIG. 11, the input electrical current Ii changes in tandem with operation of the second switching element Tr2. The maximum value of the input electrical current Ii is approximately 10 A.

Sixth Example

Figure 42:
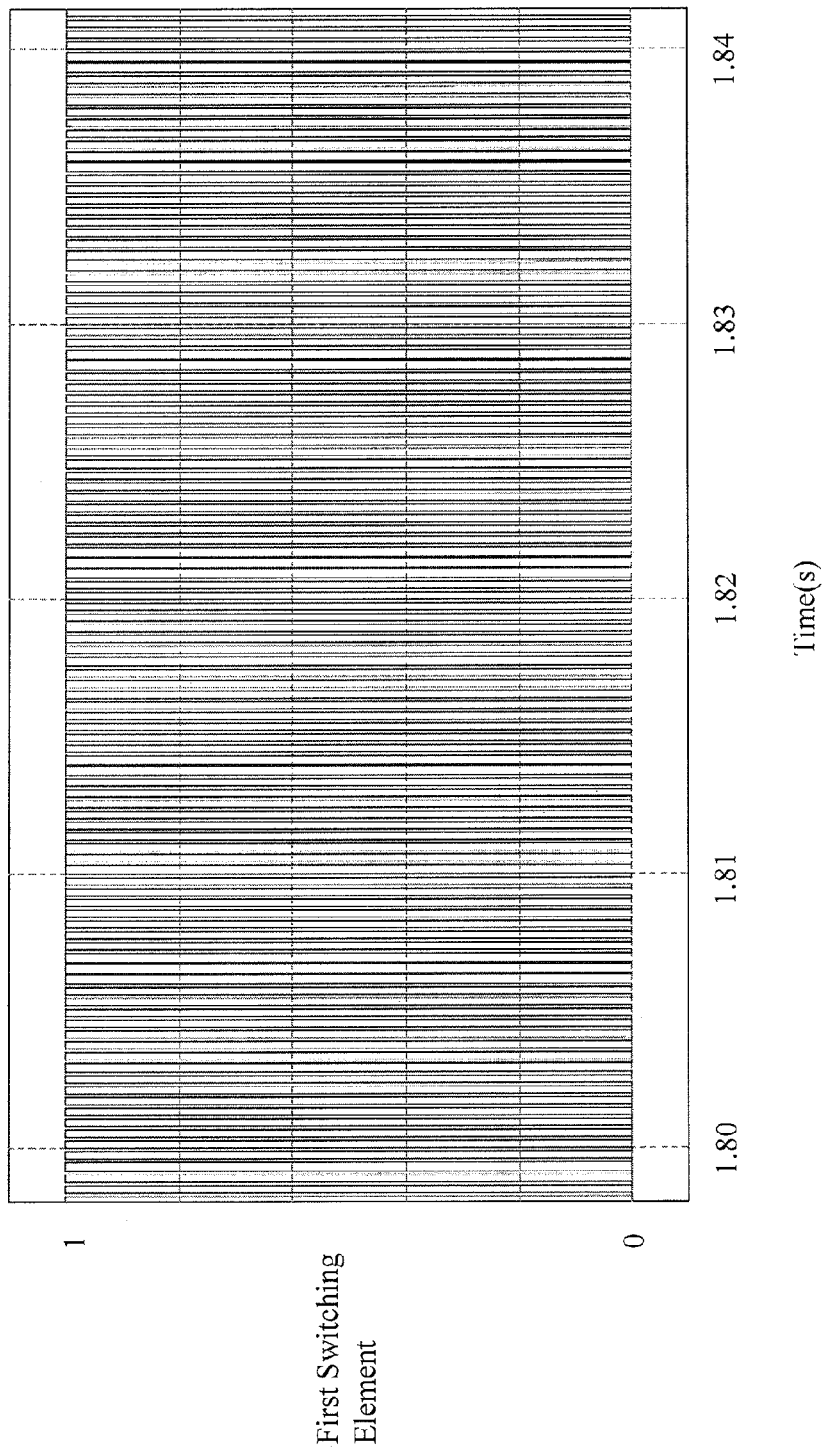
FIG. 42 is a control signal supplied to a first switching element when performing step-down operation.
Figure 43:
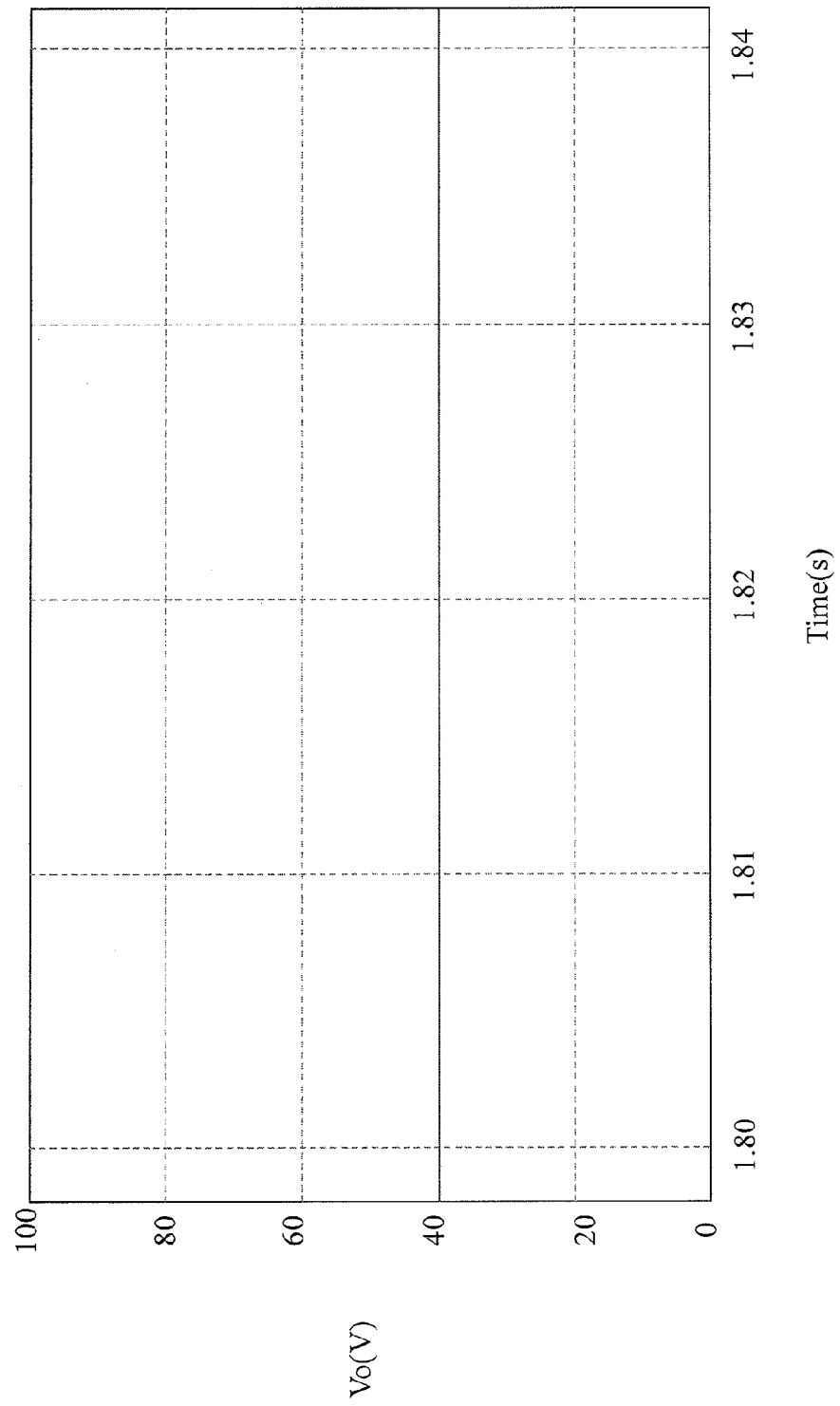
FIG. 43 is a diagram showing output voltage.
Figure 44:
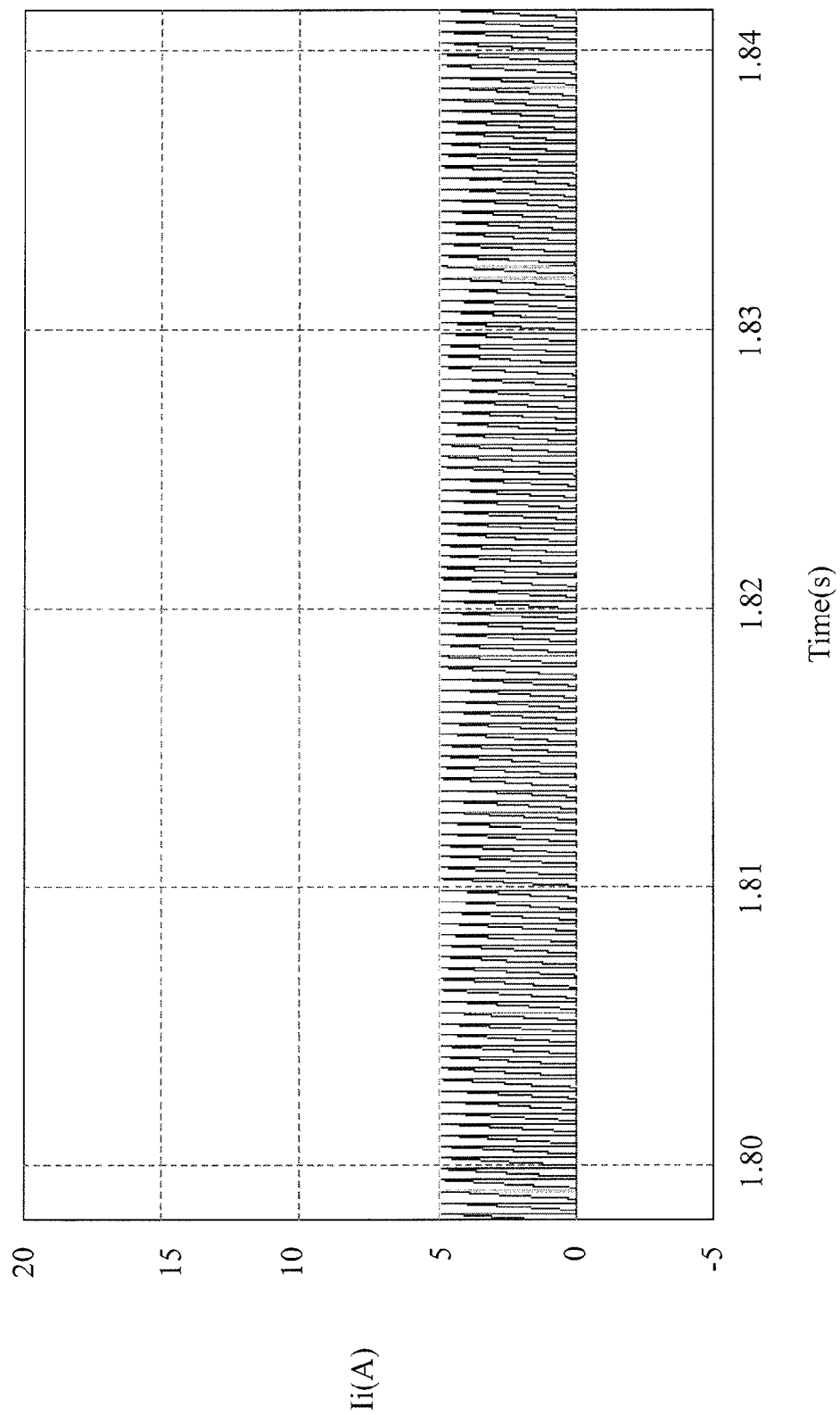
FIG. 44 is a diagram showing input electrical current.

An example of a step-down operation of the power supply device Ps3 shown in FIG. 37 will be described with reference to the drawings. FIG. 42 is a control signal supplied to a first switching element when performing a step-down operation; FIG. 43 is a diagram showing output voltage; and FIG. 44 is a diagram showing input electrical current. Like FIG. 38, FIG. 42 shows a switching signal. The input voltage Vi is the same as that shown in FIG. 39.

As shown in FIG. 39, the input voltage Vi is 60 V, and as shown in FIG. 40, the output voltage Vo is 80 V. Specifically, the power supply circuit E1 is operated as a step-up converter, and steps up the 60 V input voltage Vi to an 80 V output voltage Vo.

As mentioned above, in a case in which the power supply circuit E1 is prompted for a step-down operation, the control circuit Cont puts the second switching element Tr2 in the normally-off state and switches the first switching element Tr1. While omitted from the drawing, the control circuit Cont transmits a Low level signal as a control signal to the gate of the second switching element Tr2. As shown in FIG. 42, the control circuit Cont transmits a 67%-on duty switching signal as a control signal to the gate of the first switching element Tr1. That is, the proportion for which the switching signal shown in FIG. 42 is High level is 67%.

In this way, with the second switching element Tr2 in the normally-off state, the first switching element Tr1 is switched, whereby the input voltage Vi (60 V) can be stepped down to the output voltage Vo (40 V). The output voltage Vo is changed by modifying the on duty ratio. Moreover, as shown in FIG. 44, the input electrical current Ii changes in tandem with operation of the second switching element Tr2. The maximum value of the input electrical current Ii is approximately 5 A, which is half that when stepped up.

As shown in the preceding fifth and sixth examples, the power supply circuit according to the present invention employs two switching elements, and can perform step up and step down by maintaining one of them on or off, while switching the other. At this time, because the voltage at the source of the first switching element Tr1 and the voltage at the source of the second switching element Tr2 can be brought to the same voltage in simple fashion, the circuitry for generating the control signals to drive the switching elements from the control circuit can be simpler, and to a commensurate extent, the production cost of the power supply circuit can be reduced.

Whereas MOSFETs have been employed as the preceding switching elements, there is no limitation thereto, and a wide range of other switching elements, for example, bipolar transistors, MOS transistors, IGBT, and the like, can be adopted.

While the present invention has been described hereinabove in terms of the presently preferred embodiments, the present invention is not limited to the particulars thereof. Various modifications to the embodiments of the present invention are possible insofar as there is no departure from the spirit of the invention.

It is possible for the power supply circuit according to the present invention to be employed as a power supply circuit in a lighting device that is lit by direct current electrical current, such as an LED, organic EL, or the like; or in an electronic instrument that requires being driven by a constant voltage.

What is claimed is:

1. A power supply circuit for converting alternating current to direct current of any output voltage, comprising:
    rectification circuit for rectification of alternating current and conversion thereof to direct current;
    a step-down section for stepping down the direct current voltage converted by the rectification circuit, the step-down section including a first switching element, a coil, and a first diode;
    a step-up section for stepping up the direct current voltage converted by the rectification circuit, the step-up section including a second switching element, the coil, and a second diode; and
    control section for on/off control of the first switching element and the second switching element,
    based on the rectification voltage rectified by the rectification circuit, the control section outputting to the first switching element and the second switching element a control signal for either step-up control by turning on the first switching element and switching the second switching element, or step-down control by turning off the second switching element and switching the first switching element, the control section dividing a half-wave of a rectified wave outputted by the rectification circuit into a first region that is part of a portion in which voltage rises from 0 V, a second region beginning after the first region and ending in a portion in which the voltage falls after passing the maximum value of the rectified wave, and a third region beginning after the second region and continuing until the voltage reaches 0 V, and outputting a control signal in the first region and the third region to bring about step-up control and outputting a control signal in the second region to bring about step-down control, and the control section assigning a point in time at which the rectified wave has reached a predetermined first voltage as a timing for toggling between the first region and the second region, and assigning a point in time at which the rectified wave has reached a predetermined second voltage as a timing for toggling between the second region and the third region, wherein the predetermined first voltage is set to be greater than the predetermined second voltage.

2. The power supply circuit of claim 1, the control section comparing the rectified direct current voltage rectified by the rectification circuit to a given target voltage, and outputting a control signal to bring about step-up control when the rectification voltage is lower than the target voltage, or outputting a control signal to bring about step-down control when the rectification voltage is higher than the target voltage.

3. The power supply circuit of claim 2, the control section acquiring the output voltage and making the target voltage the output voltage.

4. The power supply circuit of claim 1, the control section managing the timing of toggling between the first region and the second region and the timing of toggling between the second region and the third region based on the time elapsed since the half-wave of the rectified wave starts to rise from 0 V.

5. The power supply circuit of claim 1, the first switching element being arranged between the anode of the first diode and a low-voltage-side terminal of the rectification circuit, and one output-side electrode of the second switching element is connected to a connection point to which an electrode of the first switching element that is connected to the low-voltage side of the rectification circuit is connected.

6. The power supply circuit of claim 5, having a third switching element in place of the first diode, and a fourth switching element in place of the second diode;

the control section sending a control signal to the first switching element, the second switching element, the third switching element, and the fourth switching element; and the control section, when switching the first switching element, outputting a control signal to turn on the fourth switching element, and turn on and off the third switching element in alternation with the first switching element, and when switching the second switching element, outputting a control signal to turn off the third switching element, and turn on and off the fourth switching element in alternation with the second switching element.

7. The power supply circuit of claim 1 further comprising:

a capacitor charged by a voltage stepped-down by the step-down section or a voltage stepped-up by the step-up section; and a switching element for toggling the capacitor between discharging and charging.

8. A power supply circuit adapted to step down or step up, and to supply as an output voltage to a load, a direct current input voltage inputted from a power supply, and provided with:

a step-down section for stepping down direct current voltage inputted from a power supply, the step-down section including a first switching element, a coil, and a first diode;

a step-up section for stepping up direct current voltage inputted from a power supply, the step-up section including a second switching element, the coil, and a second diode; and a control section for on/off control of the first switching element and the second switching element;

a first input terminal connected to a high-voltage side of the power supply, a second input terminal connected to a low-voltage side of the power supply, a first output terminal connected to a high-voltage side of the load, and a second output terminal connected to a low-voltage side of the load, the first switching element being connected between an anode side of the first diode and the second input terminal, such that when on, electrical current flows in the first switching element from a first side thereof connected to the anode side of the first diode to a second side thereof connected to the second input terminal, the second switching element being connected between the anode side of the second diode and the second input terminal, such that when on, electrical current flows in the second switching element from a first side thereof connected to the anode side of the second diode to a second side thereof connected to the second input terminal, a cathode of the first diode being connected to the first input terminal, one electrode of the coil being connected to the first input terminal, the other electrode of the coil being connected to the anode of the second diode and to the other electrode of the second switching element, a cathode of the second diode being connected to the first output terminal.

9. The power supply circuit of claim 8, the control section acquiring the voltage at the low-voltage side of the power supply of the first switching element.

10. The power supply circuit of claim 8, the low-voltage side of the power supply being grounded.

11. The power supply circuit of claim 8, the power supply being a direct current power supply.

12. The power supply circuit of claim 8, the first switching element and the second switching element being n-MOS-FETs, and the source of the first switching element and the source of the second switching element being connected to the second input terminal.

13. The power supply circuit of claim 9, the control section outputting a drive signal to turn off the second switching element and activate switching of the first switching element, when the input voltage is larger than the output voltage; and outputting a drive signal to turn on the first switching element and activate switching of the second switching element, when the input voltage is smaller than the output voltage.

14. An illumination apparatus comprising:

the power supply circuit of claim 1; and a lighting device receiving power from the power supply circuit.

15. An illumination apparatus comprising:
the power supply circuit of claim 8; and
a lighting device receiving power from the power supply circuit.

* * * * *